US011876910B2

(12) United States Patent
Padmanabhan

(10) Patent No.: US 11,876,910 B2
(45) Date of Patent: Jan. 16, 2024

(54) SYSTEMS, METHODS, AND APPARATUSES FOR IMPLEMENTING A MULTI TENANT BLOCKCHAIN PLATFORM FOR MANAGING EINSTEIN PLATFORM DECISIONS USING DISTRIBUTED LEDGER TECHNOLOGY (DLT)

(71) Applicant: Salesforce, Inc., San Francsico, CA (US)

(72) Inventor: Prithvi Krishnan Padmanabhan, San Ramon, CA (US)

(73) Assignee: Salesforce, Inc., San Francisco, CA (US)

( * ) Notice: Subject to any disclaimer, the term of this patent is extended or adjusted under 35 U.S.C. 154(b) by 419 days.

(21) Appl. No.: 16/776,236

(22) Filed: Jan. 29, 2020

(65) Prior Publication Data

US 2020/0252205 A1    Aug. 6, 2020

Related U.S. Application Data

(63) Continuation of application No. 16/264,645, filed on Jan. 31, 2019.
(Continued)

(51) Int. Cl.
*G06F 16/20* (2019.01)
*H04L 9/32* (2006.01)
(Continued)

(52) U.S. Cl.
CPC ............ *H04L 9/3239* (2013.01); *G06F 9/466* (2013.01); *G06F 16/24564* (2019.01);
(Continued)

(58) Field of Classification Search
None
See application file for complete search history.

(56) References Cited

U.S. PATENT DOCUMENTS 5,634,053 A    5/1997   Noble et al.
6,333,929 B1   12/2001  Drottar et al.
(Continued)

FOREIGN PATENT DOCUMENTS

CN   108021986 A   5/2018
CN   109173261 A   1/2019
(Continued)

OTHER PUBLICATIONS

Jackson, "Understanding the Implication of Blockchain Technology on the Audit Profession;" 2018, Honors Undergraduate Theses; 421; https://stars.library.ucf.edu/honorstheses/421 (Year: 2018).*
(Continued)

*Primary Examiner* — Belix M Ortiz Ditren
(74) *Attorney, Agent, or Firm* — Polygon IP, LLP

(57) ABSTRACT

Exemplary systems, implement a multi-tenant blockchain platform for managing the Einstein cloud platform's decisions using Distributed Ledger Technology (DLT) in conjunction with a cloud based computing environment. The system operates a blockchain interface to a blockchain on behalf of a plurality of tenants of the host organization, configures the blockchain to share a training data set between two or more tenants pursuant to a consent agreement, trains an AI model to make recommendations based on the training data set, receives a request to register the AI model with an audit record keeping service, receives a transaction at the blockchain, issues a decision by the AI model to accept or reject the transaction; and then proceeds to transact a new asset onto the blockchain recording the decision to accept or reject the transaction and the data set utilized to train the AI model with a version of the AI model.

23 Claims, 42 Drawing Sheets

Related U.S. Application Data

(60) Provisional application No. 62/839,521, filed on Apr. 26, 2019.

(51) Int. Cl.

| | |
|---|---|
| *H04L 9/06* | (2006.01) |
| *G06N 20/00* | (2019.01) |
| *G06F 16/2455* | (2019.01) |
| *G06F 9/46* | (2006.01) |
| *G06F 16/2457* | (2019.01) |
| *G06F 18/214* | (2023.01) |
| *H04L 9/00* | (2022.01) |

(52) U.S. Cl.
CPC ...... *G06F 16/24573* (2019.01); *G06F 18/214* (2023.01); *G06N 20/00* (2019.01); *H04L 9/0643* (2013.01); *G05B 2219/33002* (2013.01); *G05B 2219/35291* (2013.01); *H04L 9/50* (2022.05)

(56) References Cited

U.S. PATENT DOCUMENTS

| | | | |
|---|---|---|---|
| 7,587,348 | B2 | 9/2009 | Liao et al. |
| 8,095,463 | B1 | 1/2012 | Hartmaier |
| 9,027,094 | B1 | 5/2015 | Balazs et al. |
| 9,569,700 | B1 | 2/2017 | Santos et al. |
| 9,690,822 | B2 | 6/2017 | Roy-Faderman |
| 9,978,067 | B1 | 5/2018 | Sadaghiani et al. |
| 10,042,636 | B1 | 8/2018 | Srivastava et al. |
| 10,311,230 | B2 | 6/2019 | Jagadeesan et al. |
| 10,373,129 | B1 | 8/2019 | James et al. |
| 10,425,399 | B2 | 9/2019 | Kravitz et al. |
| 10,482,466 | B1 | 11/2019 | Walters et al. |
| 10,505,726 | B1 | 12/2019 | Andon et al. |
| 10,521,196 | B1 | 12/2019 | Wang et al. |
| 10,521,780 | B1 | 12/2019 | Hopkins, III et al. |
| 10,541,821 | B2 | 1/2020 | Toll et al. |
| 10,701,054 | B2 | 6/2020 | Padmanabhan et al. |
| 10,728,283 | B1 | 7/2020 | Dobrek et al. |
| 10,762,506 | B1 | 9/2020 | Cash et al. |
| 10,831,935 | B2 * | 11/2020 | Vijayasankar .......... H04L 69/04 |
| 10,885,567 | B2 | 1/2021 | Bhattacherjee et al. |
| 10,929,866 | B1 | 2/2021 | Qi et al. |
| 11,038,771 | B2 | 6/2021 | Padmanabhan |
| 11,068,389 | B2 * | 7/2021 | Gao ...................... G06F 3/0688 |
| 11,184,394 | B1 | 11/2021 | Dobrek et al. |
| 11,244,313 | B2 | 2/2022 | Padmanabhan et al. |
| 2005/0102159 | A1 | 5/2005 | Mondshine |
| 2006/0118611 | A1 | 6/2006 | Michelsen et al. |
| 2006/0259361 | A1 | 11/2006 | Barhydt et al. |
| 2008/0066165 | A1 | 3/2008 | Rosenoer |
| 2009/0037949 | A1 | 2/2009 | Birch |
| 2011/0289140 | A1 | 11/2011 | Pletter et al. |
| 2013/0041934 | A1 | 2/2013 | Annamalaisami et al. |
| 2013/0226682 | A1 | 8/2013 | Grossman |
| 2013/0346173 | A1 | 12/2013 | Chandoor |
| 2014/0039990 | A1 | 2/2014 | Georgi |
| 2014/0278894 | A1 | 9/2014 | Toumayan et al. |
| 2015/0026061 | A1 | 1/2015 | Siegel et al. |
| 2016/0027229 | A1 | 1/2016 | Spanos et al. |
| 2016/0042383 | A1 | 2/2016 | Joshi et al. |
| 2016/0092872 | A1 | 3/2016 | Prakash et al. |
| 2016/0148251 | A1 | 5/2016 | Thomas et al. |
| 2016/0350860 | A1 | 12/2016 | Dintenfass et al. |
| 2016/0358267 | A1 | 12/2016 | Arjomand et al. |
| 2016/0364743 | A1 | 12/2016 | St. Lawrence et al. |
| 2017/0005804 | A1 | 1/2017 | Zinder |
| 2017/0046698 | A1 | 2/2017 | Haldenby et al. |
| 2017/0085545 | A1 | 3/2017 | Lohe et al. |
| 2017/0103167 | A1 | 4/2017 | Shah |
| 2017/0132625 | A1 | 5/2017 | Kennedy |
| 2017/0132630 | A1 | 5/2017 | Castinado et al. |
| 2017/0140145 | A1 | 5/2017 | Shah |
| 2017/0161833 | A1 * | 6/2017 | Porth ...................... H04W 4/14 |
| 2017/0200157 | A1 | 7/2017 | Bergeon et al. |
| 2017/0206603 | A1 | 7/2017 | Al-Masoud |
| 2017/0236215 | A1 | 8/2017 | Eisen et al. |
| 2017/0289111 | A1 | 10/2017 | Voell et al. |
| 2017/0295021 | A1 | 10/2017 | Gutiérrez et al. |
| 2017/0295023 | A1 | 10/2017 | Madhavan et al. |
| 2017/0300627 | A1 * | 10/2017 | Giordano ............ G06F 21/6245 |
| 2017/0300872 | A1 | 10/2017 | Brown et al. |
| 2017/0300876 | A1 | 10/2017 | Musiala, Jr. et al. |
| 2017/0337534 | A1 | 11/2017 | Goeringer et al. |
| 2017/0344988 | A1 | 11/2017 | Cusden et al. |
| 2017/0353309 | A1 | 12/2017 | Gray |
| 2017/0364549 | A1 | 12/2017 | Abalos |
| 2017/0372300 | A1 | 12/2017 | Dunlevy et al. |
| 2018/0005186 | A1 | 1/2018 | Hunn |
| 2018/0006831 | A1 | 1/2018 | Toll et al. |
| 2018/0019879 | A1 | 1/2018 | Kravitz et al. |
| 2018/0026505 | A1 | 1/2018 | Galmiche et al. |
| 2018/0041345 | A1 | 2/2018 | Maim |
| 2018/0082256 | A1 | 3/2018 | Tummuru et al. |
| 2018/0088928 | A1 | 3/2018 | Smith et al. |
| 2018/0123779 | A1 | 5/2018 | Zhang |
| 2018/0139186 | A1 | 5/2018 | Castagna |
| 2018/0144042 | A1 | 5/2018 | Sheng et al. |
| 2018/0158162 | A1 | 6/2018 | Ramasamy |
| 2018/0165416 | A1 | 6/2018 | Saxena et al. |
| 2018/0189100 | A1 | 7/2018 | Nemoto et al. |
| 2018/0191503 | A1 | 7/2018 | Alwar et al. |
| 2018/0204111 | A1 * | 7/2018 | Zadeh .................. G06N 3/0436 |
| 2018/0204213 | A1 | 7/2018 | Zappier et al. |
| 2018/0218176 | A1 | 8/2018 | Voorhees et al. |
| 2018/0225611 | A1 | 8/2018 | Daniel et al. |
| 2018/0232644 | A1 | 8/2018 | Acharya et al. |
| 2018/0232659 | A1 | 8/2018 | Ranatunga et al. |
| 2018/0239897 | A1 | 8/2018 | Ventura |
| 2018/0247191 | A1 | 8/2018 | Katz et al. |
| 2018/0253661 | A1 | 9/2018 | Strauss |
| 2018/0260125 | A1 * | 9/2018 | Botes ...................... G06F 3/065 |
| 2018/0262505 | A1 | 9/2018 | Ligatti |
| 2018/0268401 | A1 | 9/2018 | Ortiz et al. |
| 2018/0268506 | A1 | 9/2018 | Wodetzki et al. |
| 2018/0276553 | A1 | 9/2018 | Redkar et al. |
| 2018/0276626 | A1 | 9/2018 | Laiben |
| 2018/0285839 | A1 * | 10/2018 | Yang ...................... G06Q 20/40 |
| 2018/0285996 | A1 * | 10/2018 | Ma .......................... H04L 9/3297 |
| 2018/0307990 | A1 | 10/2018 | Chawla et al. |
| 2018/0315143 | A1 * | 11/2018 | Rang ...................... G06Q 50/186 |
| 2018/0365686 | A1 | 12/2018 | Kondo |
| 2018/0367528 | A1 | 12/2018 | Schwarz et al. |
| 2019/0012249 | A1 | 1/2019 | Mercuri et al. |
| 2019/0012595 | A1 | 1/2019 | Beser et al. |
| 2019/0019090 | A1 | 1/2019 | Chacko et al. |
| 2019/0028276 | A1 | 1/2019 | Pierce et al. |
| 2019/0034404 | A1 | 1/2019 | Anderson et al. |
| 2019/0035018 | A1 | 1/2019 | Nolan et al. |
| 2019/0050855 | A1 | 2/2019 | Martino et al. |
| 2019/0052454 | A1 | 2/2019 | Wright et al. |
| 2019/0058709 | A1 | 2/2019 | Kempf et al. |
| 2019/0081796 | A1 | 3/2019 | Chow et al. |
| 2019/0086988 | A1 | 3/2019 | He et al. |
| 2019/0087598 | A1 | 3/2019 | Adkins et al. |
| 2019/0087892 | A1 | 3/2019 | Pinski et al. |
| 2019/0102409 | A1 | 4/2019 | Shi et al. |
| 2019/0102423 | A1 | 4/2019 | Little et al. |
| 2019/0108543 | A1 | 4/2019 | Chan et al. |
| 2019/0109702 | A1 | 4/2019 | Maggu et al. |
| 2019/0109713 | A1 | 4/2019 | Clark et al. |
| 2019/0122186 | A1 | 4/2019 | Kano et al. |
| 2019/0147532 | A1 | 5/2019 | Singh et al. |
| 2019/0149325 | A1 | 5/2019 | Garagiola et al. |
| 2019/0149334 | A1 | 5/2019 | Velden |
| 2019/0158270 | A1 | 5/2019 | Berti |
| 2019/0164156 | A1 | 5/2019 | Lindemann |
| 2019/0164220 | A1 | 5/2019 | Raj et al. |
| 2019/0172282 | A1 | 6/2019 | Patel |
| 2019/0182047 | A1 | 6/2019 | Andreina et al. |
| 2019/0188706 | A1 | 6/2019 | McCurtis |
| 2019/0215149 | A1 | 7/2019 | Ramasamy et al. |

(56) References Cited

U.S. PATENT DOCUMENTS

| | | |
|---|---|---|
| 2019/0228006 A1 | 7/2019 | Tormasov et al. |
| 2019/0236559 A1 | 8/2019 | Padmanabhan |
| 2019/0236562 A1 | 8/2019 | Padmanabhan |
| 2019/0236598 A1 | 8/2019 | Padmanabhan |
| 2019/0236606 A1 | 8/2019 | Padmanabhan et al. |
| 2019/0238316 A1 | 8/2019 | Padmanabhan |
| 2019/0238525 A1 | 8/2019 | Padmanabhan et al. |
| 2019/0287026 A1 | 9/2019 | Calmon et al. |
| 2019/0287116 A1 | 9/2019 | Karantzis |
| 2019/0295114 A1 | 9/2019 | Pavletic et al. |
| 2019/0303121 A1 | 10/2019 | Padmanabhan |
| 2019/0303445 A1 | 10/2019 | Padmanabhan |
| 2019/0303579 A1 | 10/2019 | Reddy et al. |
| 2019/0306235 A1 | 10/2019 | Veale et al. |
| 2019/0334716 A1 | 10/2019 | Kocsis et al. |
| 2019/0370634 A1 | 12/2019 | Moreno et al. |
| 2019/0370866 A1 | 12/2019 | Lawbaugh et al. |
| 2019/0377806 A1 | 12/2019 | Padmanabhan et al. |
| 2019/0385160 A1 | 12/2019 | Safak et al. |
| 2019/0386834 A1 | 12/2019 | Furukawa |
| 2020/0019923 A1 | 1/2020 | Santhar et al. |
| 2020/0027005 A1 | 1/2020 | Harrison et al. |
| 2020/0027090 A1 | 1/2020 | Braundmeier |
| 2020/0050613 A1 | 2/2020 | Gauvreau, Jr. |
| 2020/0057860 A1 | 2/2020 | Patil et al. |
| 2020/0074477 A1 | 3/2020 | Lamba et al. |
| 2020/0074515 A1 | 3/2020 | Ghatage et al. |
| 2020/0076574 A1 | 3/2020 | Austin et al. |
| 2020/0089672 A1 | 3/2020 | Velisetti et al. |
| 2020/0089895 A1 | 3/2020 | Gollogly |
| 2020/0104636 A1 | 4/2020 | Halevi et al. |
| 2020/0118011 A1 | 4/2020 | Kaiser et al. |
| 2020/0119906 A1* | 4/2020 | Das .................... H04L 9/0894 |
| 2020/0133955 A1 | 4/2020 | Padmanabhan et al. |
| 2020/0134656 A1 | 4/2020 | Padmanabhan |
| 2020/0143267 A1 | 5/2020 | Gidney |
| 2020/0169546 A1 | 5/2020 | Padmanabhan |
| 2020/0186338 A1 | 6/2020 | Andon et al. |
| 2020/0234386 A1 | 7/2020 | Blackman et al. |
| 2020/0250174 A1 | 8/2020 | Padmanabhan et al. |
| 2020/0250176 A1 | 8/2020 | Padmanabhan |
| 2020/0250177 A1 | 8/2020 | Padmanabhan |
| 2020/0250295 A1 | 8/2020 | Padmanabhan |
| 2020/0250683 A1 | 8/2020 | Padmanabhan et al. |
| 2020/0250747 A1 | 8/2020 | Padmanabhan |
| 2020/0252205 A1 | 8/2020 | Padmanabhan |
| 2020/0252404 A1 | 8/2020 | Padmanabhan |
| 2020/0252406 A1 | 8/2020 | Padmanabhan et al. |
| 2020/0336475 A1 | 10/2020 | Padmanabhan et al. |
| 2020/0344132 A1 | 10/2020 | Padmanabhan |
| 2020/0357084 A1 | 11/2020 | Hunn et al. |
| 2021/0152535 A1 | 5/2021 | Padmanabhan et al. |
| 2021/0152536 A1 | 5/2021 | Padmanabhan et al. |
| 2021/0182423 A1 | 6/2021 | Padmanabhan |
| 2021/0226774 A1 | 7/2021 | Padmanabhan |
| 2021/0243193 A1 | 8/2021 | Padmanabhan |
| 2022/0006705 A1 | 1/2022 | Padmanabhan |

FOREIGN PATENT DOCUMENTS

| | | |
|---|---|---|
| CN | 2019800219289 | 9/2020 |
| EP | 197071681 | 8/2020 |
| JP | 2020541893 | 7/2020 |
| WO | 2016161073 A1 | 10/2016 |
| WO | 2018007827 A1 | 1/2018 |
| WO | 2018007828 A2 | 1/2018 |
| WO | 2018194707 A1 | 10/2018 |
| WO | 2018230581 A1 | 12/2018 |
| WO | 2019152750 A1 | 8/2019 |

OTHER PUBLICATIONS

Salah et al., "Blockchain for AI: Review and Open Research Challenges;" Jan. 1, 2019, https://ieeexplore.ieee.org/stamp/stamp.jsp?arnumber=8598784 (Year: 2019).*

U.S. Appl. No. 17/153,872, filed Jan. 20, 2021, Prithvi Krishnan Padmanabhan.

U.S. Appl. No. 17/163,547, filed Jan. 31, 2021, Prithvi Krishnan Padmanabhan.

U.S. Appl. No. 17/348,286, filed Jun. 15, 2021, Prithvi Krishnan Padmanabhan.

Bendor-Samuel, P. (2017) Blockchain-enabled "smart-contracts" solve problems in administering IT ecosystem services, CIO, 3 pages.

Final Office Action for U.S. Appl. No. 15/932,099 dated Jun. 1, 2020, 27 pages.

Final Office Action for U.S. Appl. No. 16/177,305 dated Feb. 2, 2021, 47 pages.

Final Office Action for U.S. Appl. No. 16/264,657 dated May 17, 2021, 36 pages.

Non-final Office Action for U.S. Appl. No. 16/177,305 dated Jul. 23, 2020, 52 pages.

Normans Media Ltd., Smart Contracts: Blockchain-based contracts that don't require lawyers. 2016, 4 pages.

Notice of Allowance for U.S. Appl. No. 16/264,653 dated Jun. 7, 2021, 21 pages.

Notice of Allowance for U.S. Appl. No. 16/683,945, dated Feb. 10, 2021, 14 pages.

Office Action for U.S. Appl. No. 15/885,803, dated Apr. 14, 2021, 31 pages.

Office Action for U.S. Appl. No. 15/932,092 dated Mar. 17, 2021, 23 pages.

Office Action for U.S. Appl. No. 16/177,300 dated Jun. 16, 2021, 80 pages.

Office Action for U.S. Appl. No. 16/683,945, dated Sep. 14, 2020, 18 pages.

Shukla, A., et al., "Smart Contracts for Multiagent Plan Execution in Untrusted Cyber-physical Systems," 2018 IEEE 25th International Conference on High Performance Computing Workshops (HiPCW), 10 pages.

Final Office Action for U.S. Appl. No. 15/885,803 dated Nov. 17, 2021, 28 pages.

Final Office Action for U.S. Appl. No. 15/885,811, dated Feb. 3, 2022, 38 pages.

Final Office Action for U.S. Appl. No. 15/932,092 dated Sep. 27, 2021, 25 pages.

Final Office Action for U.S. Appl. No. 15/932,099 dated Nov. 1, 2021, 35 pages.

Mandal, S., "A Framework for Modular Norm Extraction, Modeling, and Reasoning," [Doctoral dissertation, University of Nebraska], 2017, 151 pages, ProQuest Dissertations Publishing.

Non-final Office Action for U.S. Appl. No. 16/399,920, dated Feb. 17, 2022, 66 pages.

Non-final Office Action for U.S. Appl. No. 16/777,409 dated Oct. 4, 2021, 42 pages.

Non-final Office Action for U.S. Appl. No. 16/917,506, dated Oct. 4, 2021, 44 pages.

Norta, A. et al., "Self-Aware Agent Supported Contract Management on Blockchains for Legal Accountability," 2017, 37 pages.

Notice of Allowance for U.S. Appl. No. 16/177,300, dated Oct. 6, 2021, 14 pages.

Notice of Allowance for U.S. Appl. No. 16/264,653 dated Sep. 29, 2021, 17 pages.

Notice of Allowance for U.S. Appl. No. 16/683,932 dated Dec. 3, 2021, 9 pages.

Office Action for U.S. Appl. No. 15/885,811 dated Aug. 4, 2021, 26 pages.

Office Action for U.S. Appl. No. 16/177,305 dated Sep. 16, 2021, 42 pages.

Office Action for U.S. Appl. No. 16/264,645 dated Oct. 27, 2021, 46 pages.

(56) References Cited

OTHER PUBLICATIONS

Office Action for U.S. Appl. No. 16/399,913, dated Dec. 24, 2021, 51 pages.
"BigchainDB 2.0 the Blockchain Database," Berlin Germany dated May 2018, 14 pages.
Azaria, A., et al "MedRec: Using Blockchain for Medical Data Access and Permission Management," 2016 2nd Int'l Conference on Open and Big Data, IEEE, (Aug. 22, 2016), pp. 25-30.
Genestier, P., et al, "Blockchain for Consent Management in the eHealth Environment: A Nugget for Privacy and Security Challenges," Journal of the Int'l Society for Telemedicine and eHealth, (Jan. 1, 2017), 4 pages.
International Search Report and Written Opinion for Application No. PCT/US2019/036103, dated Aug. 1, 2019, 12 pages.
International Search Report and Written Opinion for International Patent Application No. PCT/US2019/016199, dated Apr. 2, 2019, 12 pages.
McConaghy et al., "BigchainDB: A Scalable Blockchain Database (DRAFT)" dated Jun. 8, 2016.
Notice of Allowance for U.S. Appl. No. 15/932,100 dated Feb. 20, 2020, 5 pages.
Notice of Allowance for U.S. Appl. No. 15/940,646, dated Oct. 31, 2019, 8 pages.
Office Action for U.S. Appl. No. 15/885,803 dated Jan. 8, 2020, 47 pages.
Office Action for U.S. Appl. No. 15/885,811 dated Jan. 17, 2020, 40 pages.
Office Action for U.S. Appl. No. 15/932,092 dated Jan. 22, 2020, 36 pages.
Office Action for U.S. Appl. No. 15/932,100, dated Nov. 8, 2019, 9 pages.
Office Action for U.S. Appl. No. 15/940,646, dated Apr. 29, 2019, 7 pages.
Office Action for U.S. Appl. No. 15/932,099, dated Oct. 3, 2019, 26 pages.
Ojha, "Chaincode for Go Developers, Part 1: Writing Blockchain Chaincode in Go for Hyperledger Fabric v0.6," 2017, 15 pages.
Peterson, K., et al, "A Blockchain-Based Approach to Health Information Exchange Networks," (Aug. 8, 2016), Retrieved from the Internet: URL: http://kddlab.zjgsu.edu.cn:7200/research/blockchain/huyiyang-reference/A%20Blockchain-Based%20Approach%20to%20Health%20Information%20Exchange.pdf, Retrieved on Mar. 21, 2019), 10 pages.
Salesforce, "Force.com Apex Code Developer's Guide," version 34.0, 2015, 1000 pages.
Sandgaard, J., et al, "MedChain White Paper V1.1," (Oct. 1, 2017), Retrieved from the Internet: URL:https://www.medchain.global/doc/Medchain%20Whitepaper%20v1.1.pdf, Retrieved on Mar. 21, 2019, 54 pages.
Using Sawtooth with Docker: Configuring the List of Transaction Families, Apr. 6, 2018, 13 pages.
Wikipedia, "Federate database system," Jun. 8, 2016, https://en.wikipedia.org/w/index.php/?title=Federated%20database%20system&oldid=808166410, 6 pages.
Wikipedia, "Solidity," Feb. 2, 2017, https://web.archive.org/web/2017020202304/https://en.wikipeida.org/wiki/Solidity (Year: 2017), 3 pages.
Zyskind, G., et al, "Decentralizing Privacy: Using Blockchain to Protect Personal Data," 2015 IEEE Security and Privacy Workshops (May 1, 2015), 5 pages.
"Deloitte IoT Powered by Blockchain", dated May 2017, 20 pages.
"How Creating Digital Twins in Blockchain Will Protect Brands?", dated Nov. 15, 2018, 4 pages.
"How Smart Certificates of Authenticity Improve Asset Management", Jan. 17, 2019, 4 pages.
"Nasdaq, Using Blockchain Track Assets Proof Ownership", dated Nov. 30, 2016, 30 pages.
Final Office Action for U.S. Appl. No. 15/885,803, dated Jul. 20, 2020, 29 pages.
Final Office Action for U.S. Appl. No. 15/885,811, dated Aug. 5, 2020, 45 pages.
Final Office Action for U.S. Appl. No. 15/932,092 dated Jun. 22, 2020, 42 pages.
Final Office Action for U.S. Appl. No. 15/932,099 dated Jun. 1, 2020, 26 pages.
International Search Report and Written Opinion for Application No. PCT/US2020/01561B dated May 11, 2020, 13 pages.
Notice of allowance for U.S. Appl. No. 16/264,653 dated Nov. 23, 2020, 16 pages.
Office Action for U.S. Appl. No. 16/177,305 dated Jul. 23, 2020, 41 pages.
Office Action for U.S. Appl. No. 16/264,657, dated Sep. 18, 2020, 33 pages.
Office Action for U.S. Appl. No. 16/683,945 dated Sep. 14, 2020, 26 Pages.
Office Action for EP Application No. 19707168.1 dated Sep. 24, 2020, 3 pages.

* cited by examiner

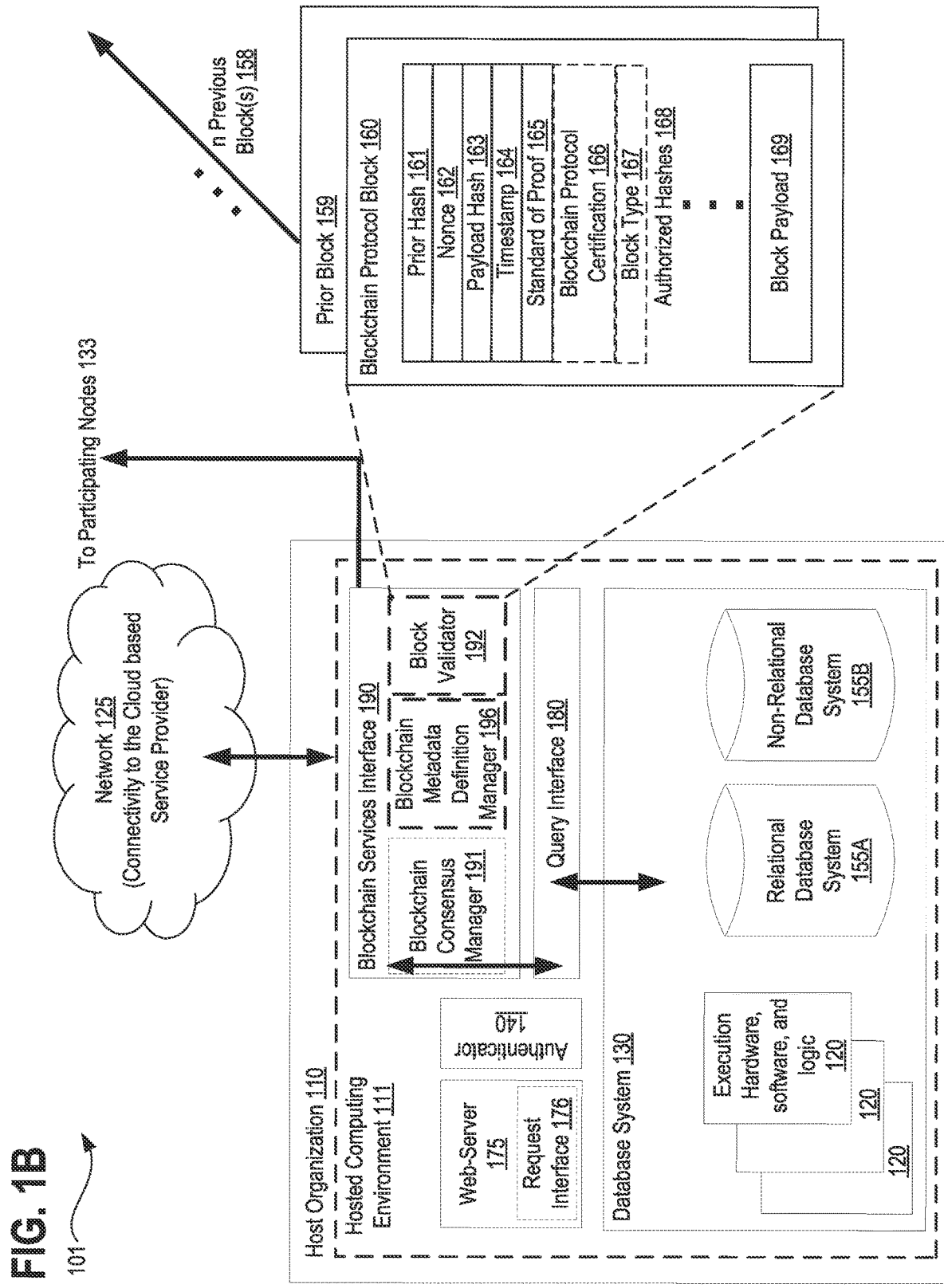

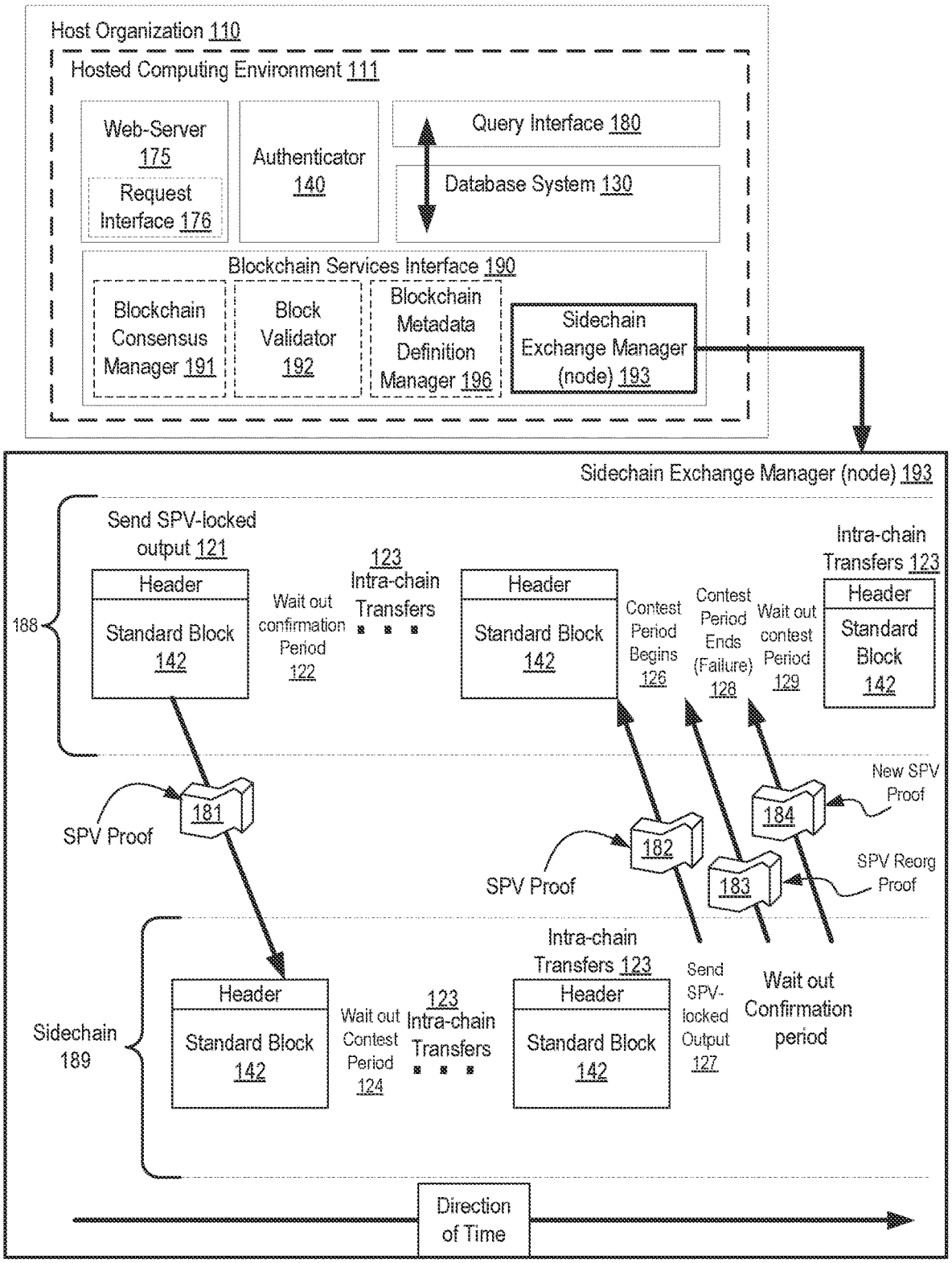

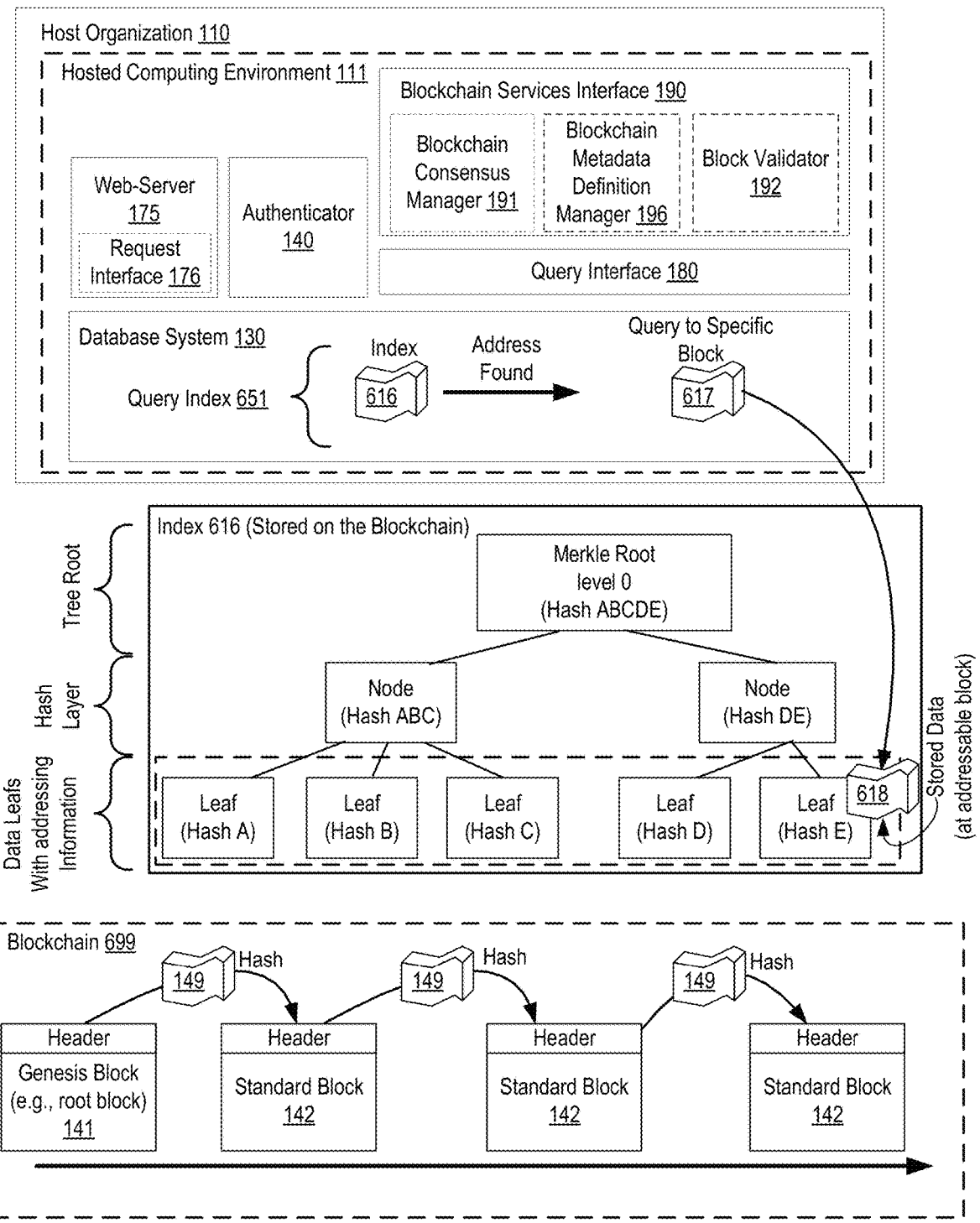

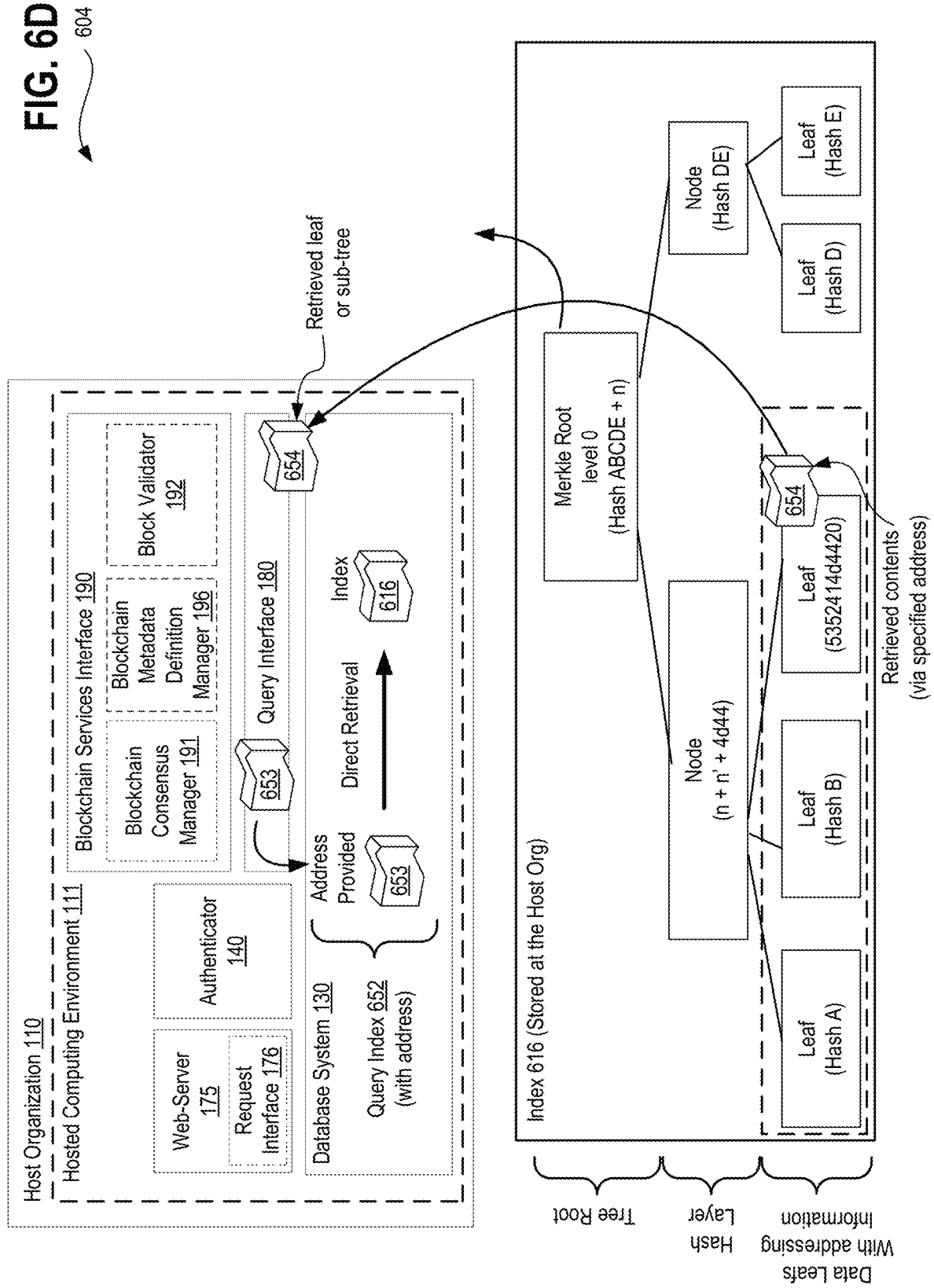

703

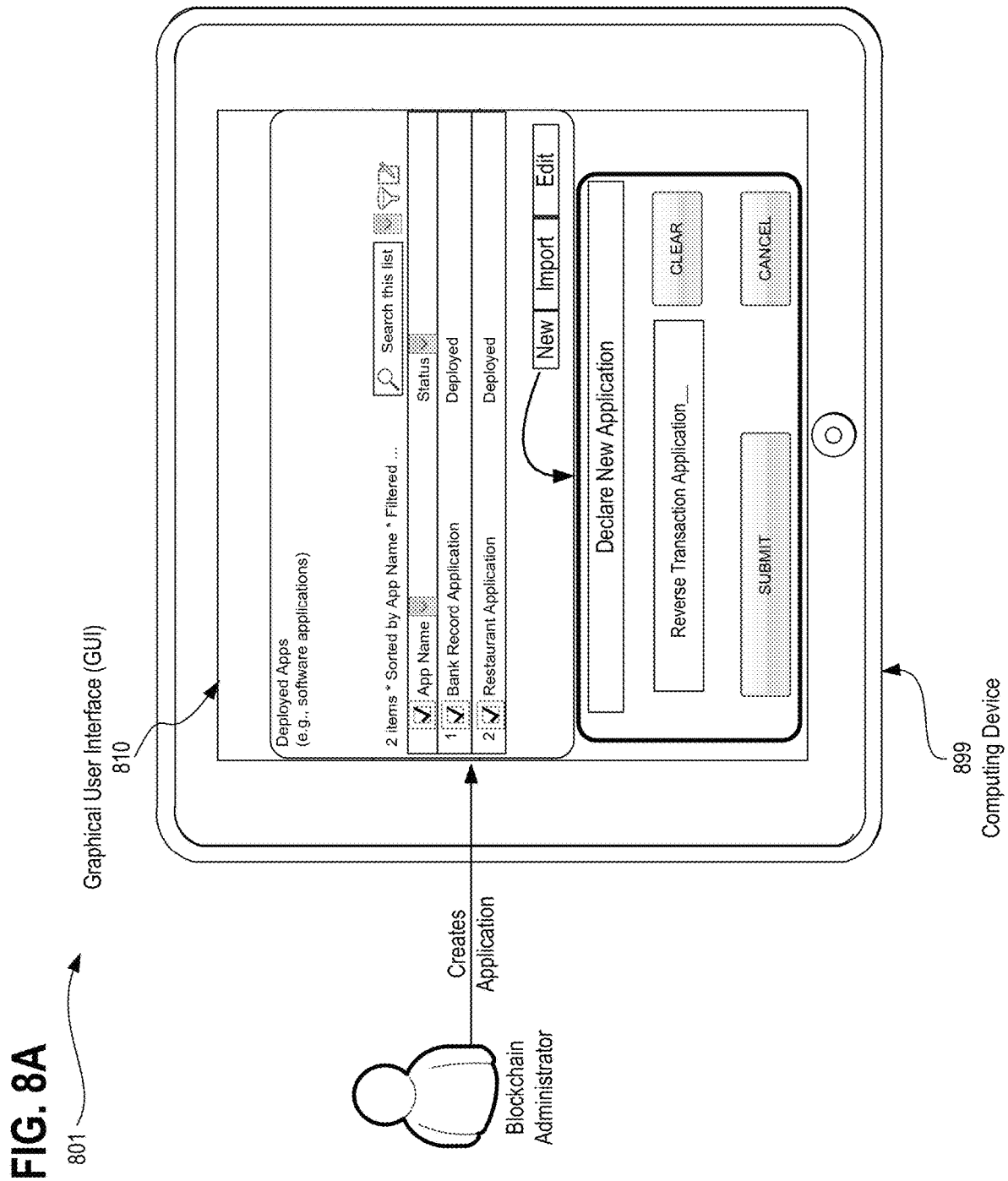

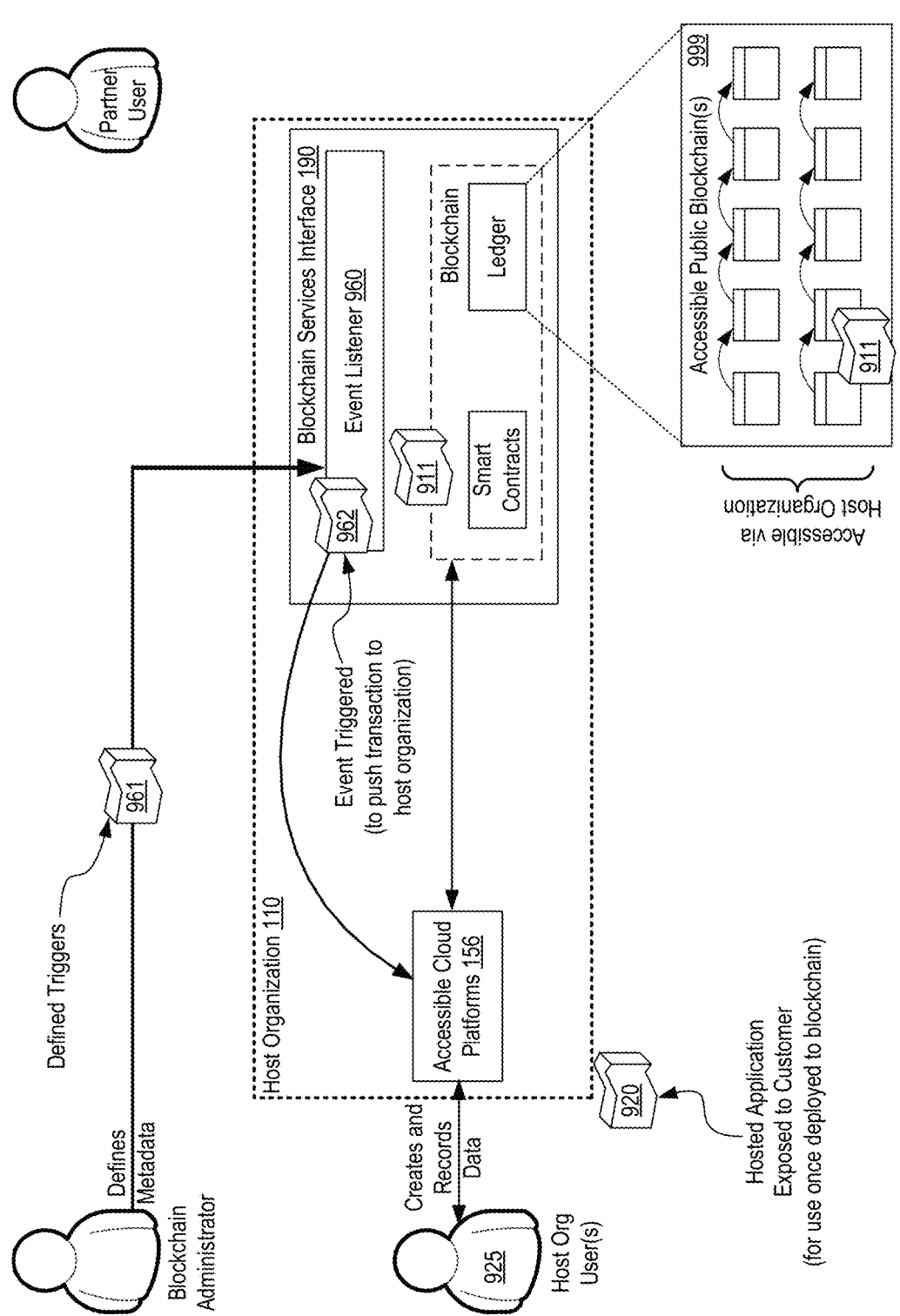

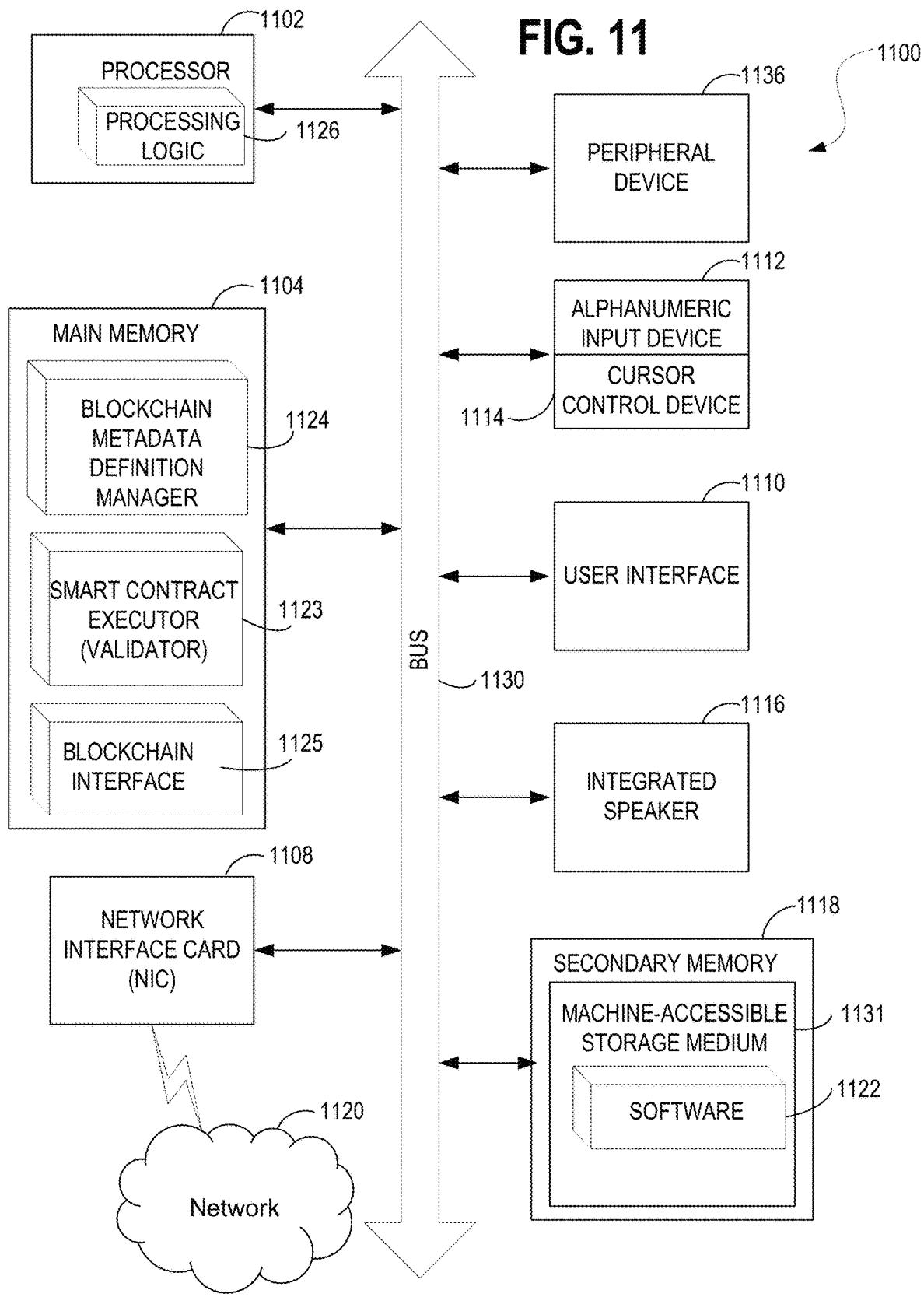

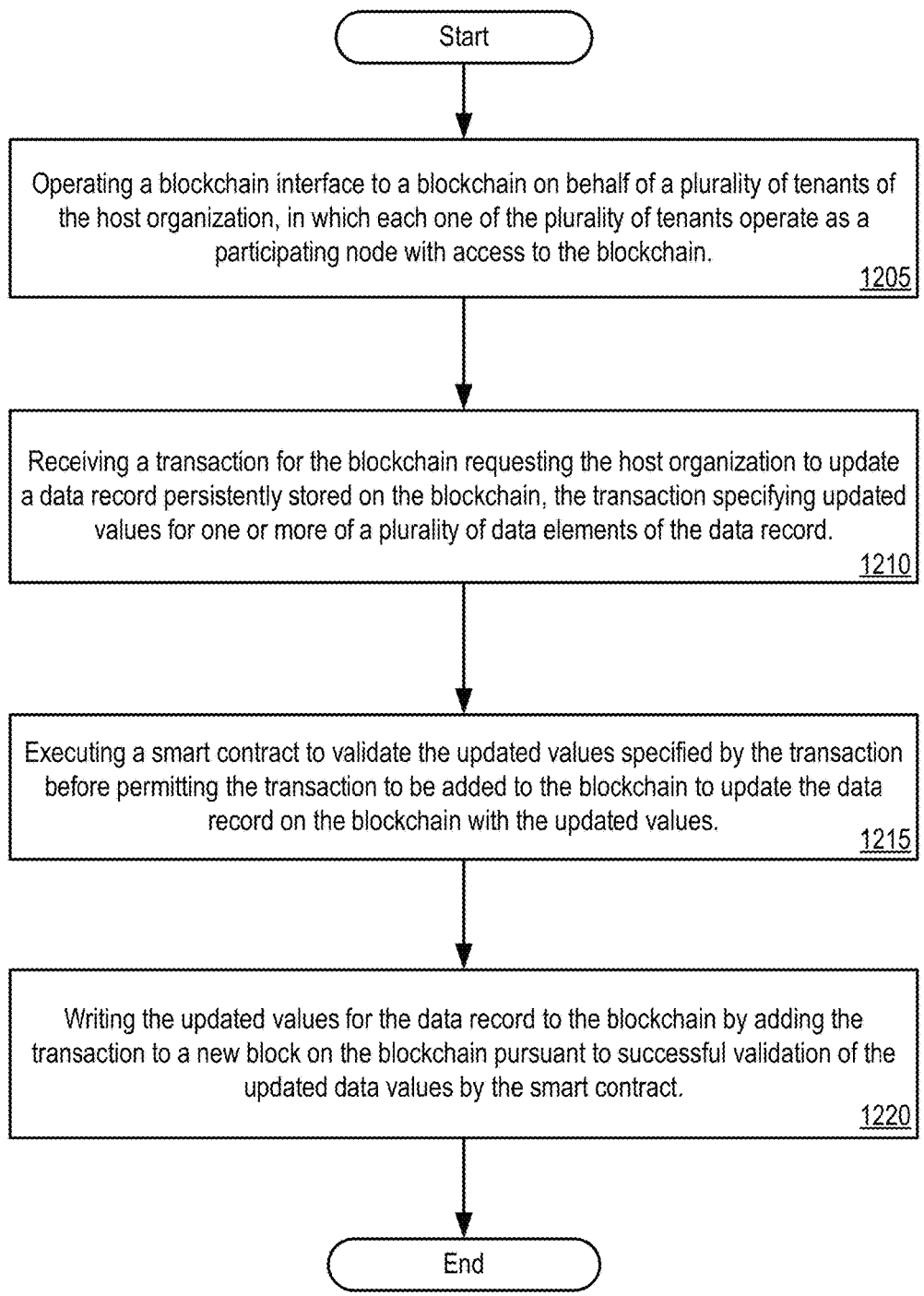

US 11,876,910 B2

SYSTEMS, METHODS, AND APPARATUSES FOR IMPLEMENTING A MULTI TENANT BLOCKCHAIN PLATFORM FOR MANAGING EINSTEIN PLATFORM DECISIONS USING DISTRIBUTED LEDGER TECHNOLOGY (DLT)

CLAIM OF PRIORITY

This United States CONTINUATION IN PART (CIP) patent application is related to, and claims priority to, the non-provisional U.S. Utility patent application entitled "SYSTEMS, METHODS, AND APPARATUSES FOR IMPLEMENTING EFFICIENT STORAGE AND VALIDATION OF DATA AND METADATA WITHIN A BLOCKCHAIN USING DISTRIBUTED LEDGER TECHNOLOGY (DLT)," filed Jan. 31, 2019, having an application Ser. No. 16/264,645 and, and is further related to, and claims priority to, the United States Provisional patent application entitled "Systems, Methods, and Apparatuses for Implementing a Multi Tenant Blockchain Platform for Managing Einstein Platform Decisions Using Distributed Ledger Technology (DLT)," filed Apr. 26, 2019, having an application number of 62/839,521, the entire contents of each being fully incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of distributed ledger technology and blockchain platforms. More particularly, disclosed embodiments relate to systems, methods, and apparatuses for implementing a multi tenant blockchain platform for managing the Einstein cloud platform's decisions using Distributed Ledger Technology (DLT) in conjunction with a cloud based computing environment.

BACKGROUND

The subject matter discussed in the background section should not be considered prior art merely because of its mention in the background section. Similarly, a problem mentioned in the background section or associated with the subject matter of the background section should not be considered to have been previously recognized in the prior art. The subject matter in the background section merely represents different approaches, which in and of themselves, may also correspond to claimed embodiments.

In modern financial systems, assets such as currencies, or securities, are typically held and traded electronically. Transferring assets often requires point-to-point interaction between multiple intermediaries, and reconciliation of duplicated ledgers. This system has some disadvantages, such as the time required for settlement of asset transfers or payments, which often takes days. Moreover, transfers often involve fee payments to multiple intermediaries, and reconciliation involves expensive overhead. Further still, it may be difficult to determine the status of a pending transfer or the current owner of an asset. Other potential problems include transfers that fail to complete, leading to uncertainty within such a system. Still further, such systems are very often restricted insomuch that it is difficult or infeasible to make one transfer conditional on another. Lastly the complexity of such systems makes it difficult to prevent fraud or theft, and, whether transactions are reversible depends on the transfer mechanism, rather than the business requirements of the transacting party.

Many of these problems are fixable if asset ownership were to be recorded on a single shared ledger. However, a combination of practical and technological constraints have made such ledgers difficult to adopt. Such a shared ledger tends to require trust in a single party. That party needs to have the computational capacity and bandwidth to process every transaction in real time. Additionally, to address the disadvantages discussed above, the ledger needs to support more sophisticated logic than simple ownership changes. In 2009, a person or group of persons operating under the pseudonym Satoshi Nakamoto introduced Bitcoin, the first implementation of a protocol that enables issuance of a digital bearer instrument without a trusted third party, using an electronic ledger replication system known as a blockchain. Bitcoin solves the problem of implementing decentralized digital cash, but its security model limits its efficiency and throughput, its design only supports a single asset, and the platform provides only limited support for custom programs that determine asset movement, sometimes called smart contracts, without any mechanism by which to customize the underlying functions or the associated smart contracts.

Distributed Ledger Technology (DLT) helps to address and overcome many of these types of shortcomings of conventional financial systems, however, the technology may nevertheless be expanded to introduce even further benefits to those utilizing such DLT and related blockchain platforms.

Ethereum, introduced in 2015, generalizes the concept of a blockchain to a fully programmable state replication mechanism. While it includes a much more powerful programming language, the Ethereum platform nevertheless presents its own unique challenges for scalability and efficiency, such as the inability to handle high-frequency updates and data streams (such as those generated by Internet of Things devices (IoT devices) or the ability to index location information for assets and stored records persistently stored to the blockchain platform.

Unfortunately, presently available Distributed Ledger Technology (DLT) and blockchains utilizing such DLT technologies store data in a fixed, immutable, and static manner. Thus, once you write the data into the blockchain, it is fixed there, wholly absent of context, metadata, or any other information which describes the stored data, describes the shape of the data, describes the type of the data, etc. Consequently, it may prove extremely difficult to transform data retrieved from the blockchain back into a format which is acceptable for the business objectives due to the lack of context of other metadata describing that stored data.

Further still, presently available Distributed Ledger Technology (DLT) and blockchains utilizing such DLT technologies permit various entities to write information into the blockchain in a non-standardized manner, which results in the possibility that identical data is not only saved multiple times, but persisted onto the blockchain utilizing different formats, different data structures, and different data types, resulting in wasted storage space and inefficient use of available computational resources. More problematically, the saving of identical data in non-standardized formats and structures results in a problem of non-transferability of such data between entities and non-transferability of such data amongst various applications, due to the simple fact that the non-standardized data cannot be understood by non-originating entities and applications.

The present state of the art may therefore benefit from the systems, methods, and apparatuses for improving upon, modifying, and expanding upon blockchain and related distributed ledger technologies by providing means for implementing a multi tenant blockchain platform for managing the Einstein cloud platform's decisions using Distributed Ledger Technology (DLT) in conjunction with a cloud based computing environment as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 1B depicts another exemplary architecture, with additional detail of a blockchain protocol block operating in conjunction with a block validator, in accordance with described embodiments.

FIG. 2B depicts another exemplary architecture with additional detail for sidechains, in accordance with described embodiments.

FIG. 6A depicts another exemplary architecture for retrieving stored records from addressable blocks using an indexing scheme, in accordance with described embodiments.

FIG. 6D depicts another exemplary architecture for utilizing an address to retrieve information from the index, in accordance with described embodiments.

FIG. 8A depicts another exemplary architecture in accordance with described embodiments.

FIG. 9C depicts another exemplary architecture in accordance with described embodiments;

FIG. 11 illustrates a diagrammatic representation of a machine in the exemplary form of a computer system, in accordance with one embodiment;

FIG. 12 depicts a flow diagram illustrating a method for implementing efficient storage and validation of data and metadata within a blockchain using Distributed Ledger Technology (DLT) in conjunction with a cloud based computing environment in accordance with described embodiments;

DETAILED DESCRIPTION

Figure 1A:
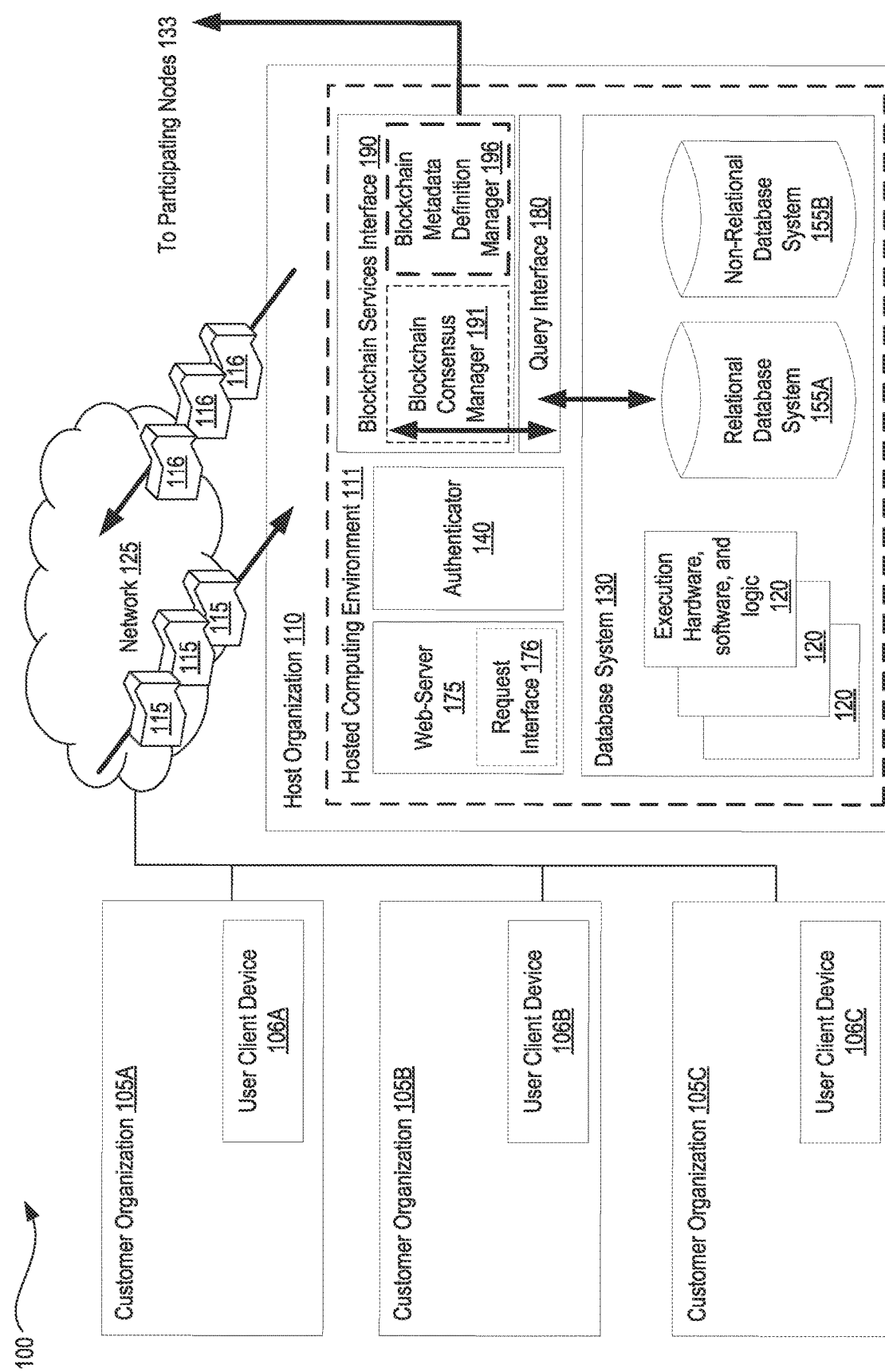
FIG. 1A depicts an exemplary architecture in accordance with described embodiments.

Described herein are systems, methods, and apparatuses for implementing a multi tenant blockchain platform for managing the Einstein cloud platform's decisions using Distributed Ledger Technology (DLT) in conjunction with a cloud based computing environment.

For instance, according to a particular embodiment, there is a system having at least a processor and a memory therein, wherein the system includes means for operating a blockchain interface to a blockchain on behalf of a plurality of tenants of the host organization, in which each one of the plurality of tenants operate as a participating node with access to the blockchain; configuring the blockchain to share a training data set between two or more of the plurality of tenants pursuant to a consent agreement to share the training data set; training an AI model to make recommendations based on the training data set shared between the two or more of the plurality of tenants; receiving a request to register the AI model with an audit record keeping service; receiving a transaction at the blockchain; issuing a decision by the AI model to accept or reject the transaction; and transacting a new asset onto the blockchain recording the decision to accept or reject the transaction and the data set utilized to train the AI model and a version of the AI model.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well-known materials or methods have not been described in detail in order to avoid unnecessarily obscuring the disclosed embodiments.

In addition to various hardware components depicted in the figures and described herein, embodiments further include various operations described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1A depicts an exemplary architecture 100 in accordance with described embodiments.

In one embodiment, a hosted computing environment 111 is communicably interfaced with a plurality of user client devices 106A-C (e.g., such as mobile devices, smart phones, tablets, PCs, etc.) through host organization 110. In one embodiment, a database system 130 includes databases 155A and 155B, for example, to store application code, object data, tables, datasets, and underlying database records comprising user data on behalf of customer organizations 105A-C (e.g., users of such a database system 130 or tenants of a multi-tenant database type database system or the affiliated users of such a database system). Such databases include various database system types including, for example, a relational database system 155A and a non-relational database system 155B according to certain embodiments.

In certain embodiments, a client-server computing architecture may be utilized to supplement features, functionality, or computing resources for the database system 130 or alternatively, a computing grid, or a pool of work servers, or some combination of hosted computing architectures may provide some or all of computational workload and processing demanded of the host organization 110 in conjunction with the database system 130.

The database system 130 depicted in the embodiment shown includes a plurality of underlying hardware, software, and logic elements 120 that implement database functionality and a code execution environment within the host organization 110.

In accordance with one embodiment, database system 130 utilizes the underlying database system implementations 155A and 155B to service database queries and other data interactions with the database system 130 that communicate with the database system 130 via the query interface 180. The hardware, software, and logic elements 120 of the database system 130 are separate and distinct from the customer organizations (105A, 105B, and 105C) which utilize web services and other service offerings as provided by the host organization 110 by communicably interfacing to the host organization 110 via network 125. In such a way, host organization 110 may implement on-demand services, on-demand database services or cloud computing services to subscribing customer organizations 105A-C.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

Further depicted is the host organization 110 receiving input and other requests 115 from customer organizations 105A-C via network 125 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155 or the query interface 180, pursuant to which results 116 are then returned to an originator or requestor, such as a user of one of a user client device 106A-C at a customer organization 105A-C.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 on behalf of the query interface 180 and for providing a web-based interface or other graphical displays to an end-user user client device 106A-C or machine originating such data requests 115.

Certain requests 115 received at the host organization may be directed toward a blockchain for which the blockchain services interface 190 of the host organization 110 operates as an intermediary.

The query interface 180 is capable of receiving and executing requested queries against the databases and storage components of the database system 130 and returning a result set, response, or other requested data in furtherance of the methodologies described. The query interface 180 additionally provides functionality to pass queries from web-server 175 into the database system 130 for execution against the databases 155 for processing search queries, or into the other available data stores of the host organization's computing environment 111. In one embodiment, the query interface 180 implements an Application Programming Interface (API) through which queries may be executed against the databases 155 or the other data stores. Additionally, the query interface 180 provides interoperability with the blockchain services interface 190, thus permitting the host organization 110 to conduct transactions with either the database system 130 via the query interface 180 or to transact blockchain transactions onto a connected blockchain for which the host organization 110 is a participating node or is in communication with the participating nodes 133, or the host organization 110 may conduct transactions involving both data persisted by the database system 130 (accessible via the query interface 180) and involving data persisted by a connected blockchain (e.g., accessible from a participating node 133 or from a connected blockchain directly, where the host organization operates a participating node on such a blockchain).

In certain embodiments, the Application Programming Interface (API) of the query interface 180 provides an API model through which programmers, developers, and administrators may interact with the blockchain services interface 190 or the database system 130, or both, as the needs and particular requirements of the API caller dictate.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C. Authenticator 140 operates on behalf of the host organization to verify, authenticate, and otherwise credential users attempting to gain access to the host organization.

Further depicted within host organization 110 is the blockchain services interface 190 having included therein both a blockchain consensus manager 191 which facilitates consensus management for private and public blockchains upon which tenants, customer organizations, or the host organization itself 110 operate as a participating node on a supported blockchain. Additionally depicted is the blockchain metadata definition manager 196, which enables the blockchain services interface 190 to define and create metadata which is then pushed to and transacted onto a blockchain which is interfaced via the blockchain services interface. For instance, via the blockchain metadata definition manager 196, it is possible to for any customer organization 105A-C of the host organization to define and create metadata which is then recorded or transacted onto the blockchain for use by that customer organization 105A-C and for use by other participating nodes on the blockchain, regardless of whether or not those participating nodes 133 are also customer organizations 105A-C with the host organization 110. For example, once metadata is defined and created via the blockchain metadata definition manager 196 and pushed onto the blockchain, any participating node 133 with access to the blockchain where that metadata definition resides can then create data records and store information onto the blockchain which adopts the defined metadata definition and thus complies with the newly created metadata definition. In such a way, all participating nodes can utilize information which is stored in compliance with the newly created metadata definition, as there is a standardized (albeit customized) manner for storing such data.

As shown here, the blockchain services interface 190 communicatively interfaces the host organization 110 with other participating nodes 133 (e.g., via the network 125) so as to enable the host organization 110 to participate in available blockchain protocols by acting as a blockchain protocol compliant node, which in turn, permits the host organization 110 to access information within such a blockchain as well as enabling the host organization 110 to provide blockchain services to other participating nodes 133 for any number of blockchain protocols supported by, and offered to customers and subscribers by the host organization 110. In certain embodiments, the host organization 110 both provides the blockchain protocol upon which the host organization then also operates as participating node. In other embodiments, the host organization merely operates as a participating node so as to enable the host organization 110 to interact with the blockchain protocol(s) provided by others.

According to certain embodiments, the blockchain metadata definition manager 196 additionally permits non-subscribers (e.g., entities which are not customer organizations 105A-C) of the host organization to nevertheless utilize the blockchain metadata definition manager 196 and GUIs associated with the blockchain metadata definition manager 196 via an exposed API interface for such non-subscribing customers which may then create and define metadata definitions which are then pushed onto the blockchain via the host organization's blockchain services interface 190.

A blockchain is a continuously growing list of records, grouped in blocks, which are linked together and secured using cryptography. Each block typically contains a hash pointer as a link to a previous block, a timestamp and transaction data. By design, blockchains are inherently resistant to modification of the data. A blockchain system essentially is an open, distributed ledger that records transactions between two parties in an efficient and verifiable manner, which is also immutable and permanent. A distributed ledger (also called a shared or common ledger, or referred to as distributed ledger technology (DLT)) is a consensus of replicated, shared, and synchronized digital data geographically spread across multiple nodes. The nodes may be located in different sites, countries, institutions, user communities, customer organizations, host organizations, hosted computing environments, or application servers. There is no central administrator or centralized data storage.

Blockchain systems use a peer-to-peer (P2P) network of nodes, and consensus algorithms ensure replication of digital data across nodes. A blockchain system may be either public or private. Not all distributed ledgers necessarily employ a chain of blocks to successfully provide secure and valid achievement of distributed consensus: a blockchain is only one type of data structure considered to be a distributed ledger.

P2P computing or networking is a distributed application architecture that partitions tasks or workloads between peers. Peers are equally privileged, equally capable participants in an application that forms a peer-to-peer network of nodes. Peers make a portion of their resources, such as processing power, disk storage or network bandwidth, directly available to other network participants, without the need for central coordination by servers or hosts. Peers are both suppliers and consumers of resources, in contrast to the traditional client-server model in which the consumption and supply of resources is divided. A peer-to-peer network is thus designed around the notion of equal peer nodes simultaneously functioning as both clients and servers to the other nodes on the network.

For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. In this manner, blockchains are secure by design and are an example of a distributed computing system with high Byzantine fault tolerance. Decentralized consensus has therefore been achieved with a blockchain. This makes blockchains potentially suitable for the recording of events, medical records, insurance records, and other records management activities, such as identity management, transaction processing, documenting provenance, or voting.

A blockchain database is managed autonomously using a peer-to-peer network and a distributed timestamping server. Records, in the form of blocks, are authenticated in the blockchain by collaboration among the nodes, motivated by collective self-interests. As a result, participants' uncertainty regarding data security is minimized. The use of a blockchain removes the characteristic of reproducibility of a digital asset. It confirms that each unit of value, e.g., an asset, was transferred only once, solving the problem of double spending.

Blocks in a blockchain each hold batches ("blocks") of valid transactions that are hashed and encoded into a Merkle tree. Each block includes the hash of the prior block in the blockchain, linking the two. The linked blocks form a chain. This iterative process confirms the integrity of the previous block, all the way back to the first block in the chain, sometimes called a genesis block or a root block.

By storing data across its network, the blockchain eliminates the risks that come with data being held centrally and controlled by a single authority. Although the host organization 110 provides a wide array of data processing and storage services, including the capability of providing vast amounts of data with a single responsible agent, such as the host organization 110, blockchain services differ insomuch that the host organization 110 is not a single authority for such services, but rather, via the blockchain services interface 190, is merely one of many nodes for an available blockchain protocol or operates as blockchain protocol manager and provider, while other participating nodes 133 communicating with the host organization 110 via blockchain services interface 190 collectively operate as the repository for the information stored within a blockchain by implementing compliant distributed ledger technology (DLT) in accordance with the available blockchain protocol offered by the host organization 110.

The decentralized blockchain may use ad-hoc message passing and distributed networking. The blockchain network lacks centralized points of vulnerability that computer hackers may exploit. Likewise, it has no central point of failure. Blockchain security methods include the use of public-key cryptography. A public key is an address on the blockchain. Value tokens sent across the network are recorded as belonging to that address. A private key is like a password that gives its owner access to their digital assets or the means to otherwise interact with the various capabilities that blockchains support. Data stored on the blockchain is generally considered incorruptible. This is where blockchain has its advantage. While centralized data is more controllable, information and data manipulation are common. By decentralizing such data, blockchain makes data transparent to everyone involved.

Every participating node 133 for a particular blockchain protocol within a decentralized system has a copy of the blockchain for that specific blockchain protocol. Data quality is maintained by massive database replication and computational trust. No centralized official copy of the database exists and, by default, no user and none of the participating nodes 133 are trusted more than any other, although this default may be altered via certain specialized blockchain protocols as will be described in greater detail below. Blockchain transactions are broadcast to the network using software, via which any participating node 133, including the host organization 110 when operating as a node, receives such transaction broadcasts. Broadcast messages are delivered on a best effort basis. Nodes validate transactions, add them to the block they are building, and then broadcast the completed block to other nodes. Blockchains use various time-stamping schemes, such as proof-of-work, to serialize changes. Alternate consensus may be utilized in conjunction with the various blockchain protocols offered by and supported by the host organization, with such consensus mechanisms including, for example proof-of-stake, proof-of-authority and proof-of-burn, to name a few.

Open blockchains are more user friendly than conventional traditional ownership records, which, while open to the public, still require physical access to view. Because most of the early blockchains were permissionless, there is some debate about the specific accepted definition of a so called "blockchain," such as, whether a private system with verifiers tasked and authorized (permissioned) by a central authority is considered a blockchain. Proponents of permissioned or private chains argue that the term blockchain may be applied to any data structure that groups data into time-stamped blocks. These blockchains serve as a distributed version of multiversion concurrency control (MVCC) in databases. Just as MVCC prevents two transactions from concurrently modifying a single object in a database, blockchains prevent two transactions from spending the same single output in a blockchain. Regardless of the semantics or specific terminology applied to the varying types of blockchain technologies, the methodologies described herein with respect to a "blockchain" expand upon conventional blockchain protocol implementations to provide additional flexibility, open up new services and use cases for the described blockchain implementations, and depending upon the particular blockchain protocol offered or supported by the blockchain services interface 190 of the host organization 110, both private and public mechanisms are described herein and utilized as needed for different implementations supported by the host organization 110.

An advantage to an open, permissionless, or public, blockchain network is that guarding against bad actors is not required and no access control is needed. This means that applications may be added to the network without the approval or trust of others, using the blockchain as a transport layer. Conversely, permissioned (e.g., private) blockchains use an access control layer to govern who has access to the network. In contrast to public blockchain networks, validators on private blockchain networks are vetted, for example, by the network owner, or one or more members of a consortium. They rely on known nodes to validate transactions. Permissioned blockchains also go by the name of "consortium" or "hybrid" blockchains. Today, many corporations are using blockchain networks with private blockchains, or blockchain-based distributed ledgers, independent of a public blockchain system.

FIG. 1B depicts another exemplary architecture 101, with additional detail of a blockchain protocol block 160 operating in conjunction with a block validator 192, in accordance with described embodiments.

In particular, a blockchain protocol block 160 is depicted here to be validated by the block validator 192 of the host organization 110, with the blockchain protocol block including addition detail of its various sub-components, and certain optional elements which may be utilized in conjunction with the blockchain protocol block 160 depending on the particular blockchain protocol being utilized via the blockchain services interface 190.

In accordance with a particular embodiment, the blockchain protocol block 160 depicted here defines a particular structure for how the fundamental blocks of any given blockchain protocol supported by the host organization 110 is organized.

According to certain embodiments, blockchain metadata definition manager 196 as shown here may utilize a specific blockchain implementation which is provided by the host organization 110 and thus, for which the applicable blockchain protocol is defined by the host organization 110 or alternatively, the blockchain metadata definition manager 196 may utilize any publicly accessible blockchain for which the host organization operates as a participating node so as to establish access or the blockchain metadata definition manager 196 may utilize a private blockchain, including those which are not provided by the host organization 110, so long as the host organization is able to authenticate with such a private blockchain and access the blockchain by operating as a participating node on the private blockchain.

As will be described in greater detail below, the blockchain metadata definition manager 196 implements a specialized metadata definition and creation scheme which may include the use of GUIs and other user-friendly interfaces which are provided by the host organization either via an API or via an interface of the host organization, such as the web-server 175 via which users and customer organizations may interact with the host organization and more particularly, with the services and applications provided by the host organization, including use of GUIs provided by the blockchain metadata definition manager 196 which is made accessible to tenants of the host organization via the cloud computing platform and in certain embodiments made available to non-tenants and non-subscribers of the host organization 110, either of which may then utilize the GUIs and functionality provided by the blockchain metadata definition manager 196.

It may be necessary in accordance with certain embodiments that a customized blockchain protocol implementation be provided by the host organization to support use of the specialized metadata definition and creation scheme as implemented by the blockchain metadata definition manager 196, however, in embodiments where the metadata may permissibly be defined and stored onto a blockchain by the host organization 110, then any blockchain utilized to store such data will be otherwise unaffected as the blockchain is agnostic as to what types of metadata is defined or created and transacted onto the blockchain by the host organization. Stated differently, while the host organization 110 facilitates the definition and creation of such metadata and transacts that information onto a blockchain, it is immaterial to the blockchain as to what applications elect to utilize such data, whereas the host organization facilitates a platform in which applications may elect to only utilize data which is in compliance with the defined and created metadata, thus permitting transferability of such data, as well as many other benefits.

With respect to the blockchain protocol 160 (regardless of whether it is an existing and already available blockchain protocol or a custom implemented blockchain protocol), the prior hash 161 is the result of a non-reversible mathematical computation using data from the prior block 159 as the input. The prior block 159 in turn utilized data from the n previous block(s) 158 to form the non-reversible mathematical computation forming the prior hash for those respective blocks. For instance, according to one embodiment, the non-reversible mathematical computation utilized is a SHA256 hash function, although other hash functions may be utilized. According to such an embodiment, the hash function results in any change to data in the prior block 159 or any of the n previous blocks 158 in the chain, causing an unpredictable change in the hash of those prior blocks, and consequently, invalidating the present or current blockchain protocol block 160. Prior hash 161 creates the link between blocks, chaining them together to form the current blockchain protocol block 160.

When the block validator 192 calculates the prior hash 161 for the prior block 159, the hash must meet certain criteria defined by data stored as the standard of proof 165. For instance, in one embodiment, this standard of proof 165 is a number that the calculated hash must be less than. Because the output of the hashing function is unpredictable, it cannot be known before the hash is calculated what input will result in an output that is less than the standard of proof 165. The nonce 162 is used to vary the data content of the block, allowing for a large number of different outputs to be produced by the hash function in pursuit of an output that meets the standard of proof 165, thus making it exceedingly computationally expensive (and therefore statistically improbable) of producing a valid block with a nonce 162 that results in a hash value meeting the criteria of the standard of proof 165.

Payload hash 162 provides a hash of the data stored within the block payload 169 portion of the blockchain protocol block 160 and need not meet any specific standard of proof 165. However, the payload hash is included as part of the input when the hash is calculated for the purpose of storing it as the prior hash 161 for the next or subsequent block. Timestamp 164 indicates what time the blockchain protocol block 160 was created within a certain range of error. According to certain blockchain protocol implementations provided via the blockchain services interface 190, the distributed network of users (e.g., blockchain protocol nodes) checks the timestamp 164 against their own known time and will reject any block having a time stamp 164 which exceeds an error threshold, however, such functionality is optional and may be required by certain blockchain protocols and not utilized by others.

The blockchain protocol certification 166 defines the required size and/or data structure of the block payload 169 as well as certifying compliance with a particular blockchain protocol implementation, and thus, certifies the blockchain protocol block subscribes to, implements, and honors the particular requirements and configuration options for the indicated blockchain protocol. The blockchain protocol certification 166 may also indicate a version of a given blockchain protocol and the blockchain protocol may permit limited backward and forward compatibility for blocks before nodes will begin to reject new blockchain protocol blocks for non-compliance.

Block type 167 is optional depending on the particular blockchain protocol utilized. Where required for a specific blockchain protocol exposed via the blockchain services interface 190, a block type 167 must be indicated as being one of an enumerated list of permissible block types 167 as will be described in greater detail below. Certain blockchain protocols use multiple different block types 167, all of which may have varying payloads, but have a structure which is known a priori according to the blockchain protocol utilized, the declared block type 167, and the blockchain protocol certification 166 certifying compliance with such requirements. Non-compliance or an invalid block type or an unexpected structure or payload for a given declared block type 167 will result in the rejection of that block by network nodes.

Where a variable sized block payload 169 is utilized, the block type 167 may indicate permissibility of such a variable sized block payload 169 as well as indicate the index of the first byte in the block payload 169 and the total size of the block payload 169. The block type 167 may be utilized store other information relevant to the reading, accessing, and correct processing and interpretation of the block payload 169.

Block payload 169 data stored within the block may relate to any number of a wide array of transactional data depending on the particular implementation and blockchain protocol utilized, including payload information related to, for example, financial transactions, ownership information, data access records, document versioning, medical records, voting records, compliance and certification, educational transcripts, purchase receipts, digital rights management records, or literally any kind of data that is storable via a payload of a blockchain protocol block 160, which is essentially any data capable of being digitized. Depending on the particular blockchain protocol chosen, the payload size may be a fixed size or a variable size, which in either case, will be utilized as at least part of the input for the hash that produces the payload hash 163.

Various standard of proofs 165 may utilized pursuant to the particular blockchain protocol chosen, such as proof of work, hash value requirements, proof of stake, a key, or some other indicator such as a consensus, or proof of consensus. Where consensus-based techniques are utilized, the blockchain consensus manager 191 provides consensus management on behalf of the host organization 110, however, the host organization 110 may be operating only as one of many nodes for a given blockchain protocol which is accessed by the host organization 110 via the blockchain services interface 190 or alternatively, the host organization 110 may define and provide a particular blockchain protocol as a cloud based service to customers and subscribers (and potentially to non-authenticated public node participants), via the blockchain services interface 190. Such a standard of proof 165 may be applied as a rule that requires a hash value to be less than the proof standard, more than the proof standard, or may require a specific bit sequence (such as 10 zeros, or a defined binary sequence) or a required number of leading or trailing zeroes (e.g., such as a hash of an input which results in 20 leading or trailing zeros, which is computationally infeasible to provide without a known valid input).

The hash algorithms used for the prior hash 161, the payload hash 163, or the authorized hashes 168 may all be of the same type or of different types, depending on the particular blockchain protocol implementation. For instance, permissible hash functions include MD5, SHA-1, SHA-224, SHA-256, SHA-384, SHA-515, SHA-515/224, SHA-515/256, SHA-3 or any suitable hash function resistant to pre-image attacks. There is also no requirement that a hash is computed only once. The results of a hash function may be reused as inputs into another or the same hash function again multiple times in order to produce a final result.

Figure 1C:
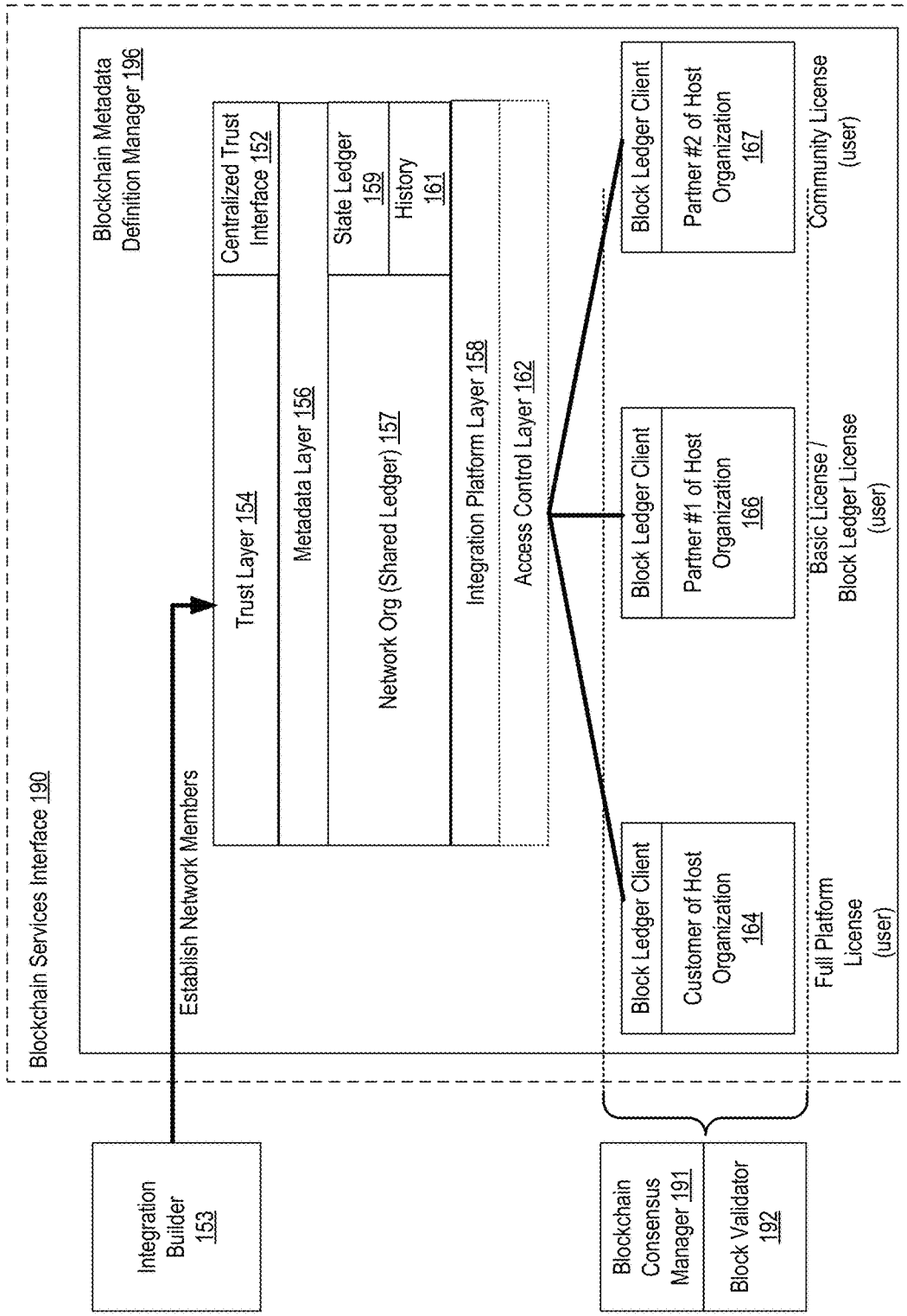
FIG. 1C depicts another exemplary architecture, with additional detail of the blockchain metadata definition manager set forth in greater detail, in accordance with described embodiments.

FIG. 1C depicts another exemplary architecture 102, with additional detail of the blockchain metadata definition manager 196 set forth in greater detail, in accordance with described embodiments.

As can be seen here, there is a blockchain services interface 190 which includes the blockchain metadata definition manager 196. Also depicted as interacting with the various elements of the blockchain metadata definition manager 196 are the integration builder 153 which is capable of establishing network members to participate with the metadata definition and creation scheme, as well as the blockchain consensus manager 191 and the block validator 192.

Internal to the blockchain metadata definition manager 196 there are various further elements, including a trust layer 154 and a centralized trust interface 152 capable of interacting with both tenants and customer organizations of the host organization as well as non-subscribers to the services of the host organization. There is further depicted a metadata layer 156 having knowledge of all presently defined metadata definitions created and pushed to the accessible blockchains, followed by a network organization 157 layer or a shared ledger, which serves as an interface to the variously accessible blockchains. The state ledger 159 maintains the status of the accessible blockchains and any connection or non-connection states while the history 161 block maintains a transaction history and logging for the platform. The integration platform layer 158 provides an interface to other components within the host organization 110 to interface with the components of the blockchain metadata definition manager 196 while the access control layer 162 is described in greater detail below, but provides certain access rights and restrictions for private and permissioned blockchains that are not fully open to public access.

Lastly, there is depicted various block ledger clients, including the customer of the host organization 164 which enjoys a full platform license as a subscribing customer of the host organization, while the next block ledger client at block 166 having the partner #1 of the host organization enjoys only a basic license and a block ledger license with limited user capabilities provided by the host organization, followed by the last block ledger client at block 167 having the partner #2 of the host organization which is limited to strictly a community license which is available to all parties without subscription to any subscription required user services provided by the host organization.

From a high level, the depicted architecture provides similar services to public blockchain, except that, according to this particular embodiment, the shared ledger 157 operates a blockchain internal to the host organization and defines the blockchain protocol of the hosted network org or a so called "shared ledger 157" as shown here. The depicted shared ledger 157 therefore permits customers and non-customers to interact with orgs and clients and non-subscribing clients, but not necessarily third party instances since this particular embodiment operates the shared ledger 157 internal to the host organization. In such a way, the functionality provided by public and private blockchains may still be realized and utilized, yet, because the shared ledger 157 is wholly internal to the host organization 110, its possible to operate the shared ledger, utilizing Distributed Ledger Technology (DLT) modified which is modified to rely upon the host organization's 110 trust layer 154 as a centralized trust authority (and providing validation of trust via the centralized trust interface 152) rather than the more customary use of a blockchain consensus manager 191 as is typical with other related embodiments described by this paper.

Regardless of the trust authority (e.g., be it the host organization 110 or distributed nodes reaching consensus as managed by the blockchain consensus manager 191), all data is transparent and cryptographically verifiable and data and users are not owned by a single party, notwithstanding being hosted internal to the host organization, and the history 161 and state ledger 159 provide for an enhanced audit trail. The integration builder 153 permits the execution of Smart contracts run on shared data as well as run against data which is owned by the network org 157 itself, such as metadata definitions which are accessible to all members but which nevertheless remain owned by the host organization.

In this particular embodiment, as alluded to above, because trust is established by the host organization itself, via the trust layer 154, there is no need for consensus, although consensus may optionally be utilized depending on the implementation.

According to particular embodiments, there is a multi tenant ledger platform that works at the network level providing and provides an equivalent amount of transparency and provenance that is available through Blockchain, yet is entirely within the control of the host organization 110, and thus provides for certain benefits, such as the establishment of centralized trust by the host organization 110.

In a manner of speaking, such an architecture represents a compromise between a centralized and decentralized database, and notably, deviates from the fundamentals of blockchain which utilized distributed ledger technology and thus operates as a distributed database. Nevertheless, depicted here is the host organization 110 operating as a central party, by and through the blockchain services interface 190, which provides the trust on behalf of all tenants, as opposed to blockchain where trust is delivered by the network, and specifically by the nodes distributed throughout the network reaching consensus.

Data and information which is persisted via the shared ledger 157 of the host organization is wholly owned and by the network and specifically by the established network members, yet the infrastructure is owned by the central party, in this case, the host organization 110 owns, controls, and manages the computing infrastructure and resources upon which the shared ledger 157 operates. Thus, if any established network member trusts host organization as the central party, then the system and architecture works for that particular established network member. Notably, however, the established network members must place their trust into a third party, in this case the host organization 110. If doing so is not possible, or not permissible based on the various data security requirements, regulations, or other concerns, then the Distributed Ledger Technology (DLT) which requires consensus by the distributed nodes, as managed by the blockchain consensus manger 191 is more appropriate for those parties.

According to a particular embodiment, a tenant-focused network org or a tenant focused shared ledger 157 is provided, again internal to the host organization 110 (and specifically the blockchain services interface 190 of the host organization) in which all users are controlled by each respective customer organization rather than being controlled by a centralized customer. Stated differently, there may be tenant-specific customer control, such that any user for a given instance of the shared ledger 157 is controlled by the tenant or customer org having authority over that instance of the shared ledger 157. In such a way, there can be multiple instances of the shared ledger 157, each having its user-set controlled by a specific customer org, without having to negotiate or rely upon any other customer org, tenant, or any other entity to approve or deny user inclusion. This includes the tenant's customer org being able to determine for itself which users are permitted in their instance of the shared ledger 157 without having to go through the host organization, despite the instance of the shared ledger 157 being internally hosted by the host organization. This is because the host organization 110 effectively delegates full control over user inclusion for each respective instance of the shared ledger 157 to the customer org for which that particular shared ledger 157 operates.

According to certain embodiments, the shared ledger 157 embodies a Merkle Directed Acyclic Graph (DAG) or a "Merkle-DAG" which is a data structure similar to a native Merkle tree, except that a Merkle DAG structure does not need to be balanced and its non-leaf nodes are allowed to contain data. In such a way, a Merkle-DAG is similar to native Merkle trees in that they both are embody a tree of hashes. While a Merkle tree connects transactions by sequence, the Merkle-DAG is differentiated insomuch that it connects transactions by hashes. Therefore, in a Merkle-DAG structure, addresses are represented by a Merkle hash. The resulting spider web of Merkle hashes links data addresses together by a Merkle graph. The directed acyclic graph (DAG) portion of the Merkle-DAG may therefore be utilized to model information, such as modeling what specific address stores specific data.

According to another embodiment, the data is encrypted and cryptographically verifiable within each instance of the shared ledger 157. For instance, utilizing an extension of the blockchain services interface 190 platform, any tenant having an instance of the shared ledger 157 may cryptographically verify any stored encrypted data within their instance of the shared ledger 157.

As noted above, for many customers, it is much preferred to lease or subscribe to cloud-based computing infrastructure and software rather than having to own, operate, maintain, and configure such computing infrastructure themselves. Where certain customers and partners require only transparency of their data and the ledger (e.g., and do not necessarily require consensus amongst distributed nodes), such a solution represents a substantial improvement over competing alternatives. While blockchain technology presents many advantages, many of which are described in greater detail elsewhere by this paper, the reality is that certain customers simply are not concerned with decentralization of the data and the ledger, and thus, may realize significant benefits from utilizing a shared ledger 157 instance which is entirely operated within the host organization 110 with a centralized trust interface 152, thus negating the need to participate in other consensus regimes common to distributed blockchain ledgers.

In accordance with one embodiment, the shared ledger 157 provides an audit trail which is immutable by any party, including by the host organization 110, and thus, provides greater security, transparency, and assurance than a standard audit trail offered by competing solutions. Added value is thus brought to the tenants and customer organizations when utilizing the shared ledger 157 when compared with a standard centralized system.

Further still, because the shared ledger 157 is multi-tenant aware (e.g., each tenant or customer organization may utilize it's own instance of the shared ledger 157) and metadata driven, with executable smart contracts via triggers, there are multiple advantages for the host organization's tenant subscribers, above and beyond the platform benefits offered by the host organization.

Consider the example of a large retailer wishing to got to market utilizing blockchain to manage their supply chain of products ranging from clothing to fresh produce. Such a pilot may begin with cotton as raw materials for clothing and leafy greens to be sold in stores as packaged produce. Ultimately, the large retailer may evolve to a full blockchain solution, but initially, many customers may prefer to utilize a wholly controlled, single point of trust, and hosted solution such as the shared ledger 157 provided by the host organization. Reasons for initially beginning with the hosted shared ledger solution may to enable a single login or a single authentication portal via their current host organization which already provides them with cloud-based services, which will then enable the large retailer to experiment with the Distributed Ledger Technology (DLT) while permitting the large retailer to view their validated ledger information from the single sign-on portal.

Such a structure would thus allow the large retailer, by way of example, to place their trust into the immutability of the data due to the data being stored within the immutable shared ledger 157, albeit within the host organization 110. This is possible because even the host organization cannot alter the shared ledger 157 audit trail. This is in contrast to the use of prior cloud based platforms which provides a standardized audit trail, yet because the audit trail is not immutable all parties, it could theoretically be manipulated by malicious actors, albeit such a scenario is highly unlikely. Nevertheless, the shared ledger 157 utilizing modified DLT technologies is by design immutable by all parties, in terms of its audit trail, and thus, a higher level of trust may be appropriately placed into the centralized trust authority, such as the host organization, given that even the host organization lacks the capability to alter the historical records stored within the shared ledger 157.

The same logic may apply to companies wishing to utilize such a ledger internally within one company and its subsidiaries as doing so will permit greater integration and data sharing amongst the company and its subsidiaries, while benefiting from the immutability of the shared ledger, above and beyond that which may be provided by competing solutions, such as locally and remotely operated databases, or a strictly on-demand cloud based solution.

Consider for example, a mortgage division wishing to share sales lead information with their commercial banking division or a healthcare company having multiple divisions across the country, which are not well integrated amongst the various divisions, resulting in duplicative operational centers, such as a claims processing group in northern California and another claims processing group in Southern California, which currently lack full integration, yet could migrate to the hosted shared ledger 157 solution to realize greater integration, trusted audit trails through the immutability of the records written into the platform, and in turn, improved ease of use and transparency of data utilized by the various divisions of the large healthcare provider.

Figure 1D:
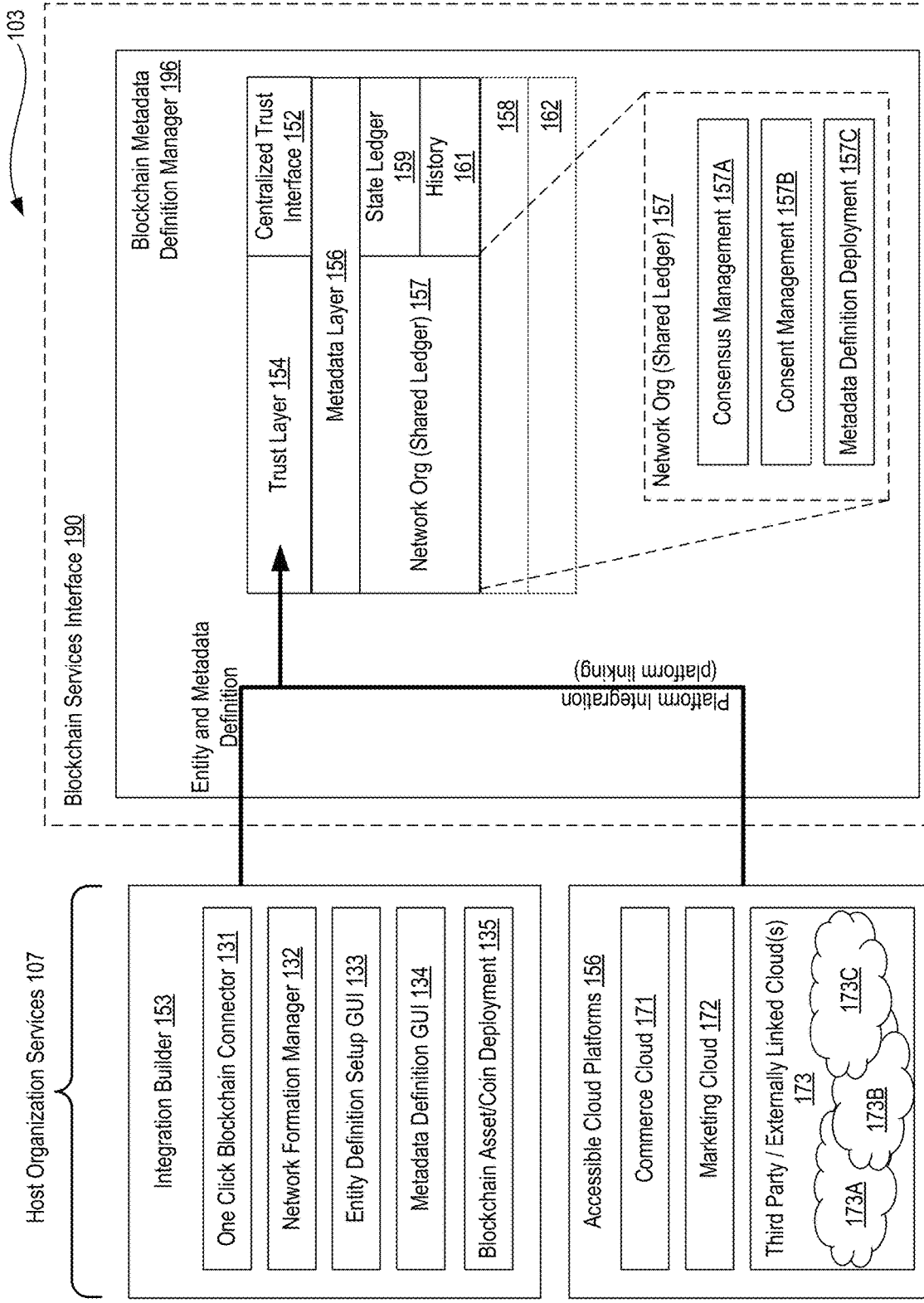
FIG. 1D depicts another exemplary architecture, which depicts the integration of host organization services with the blockchain services interface in greater detail, in accordance with described embodiments.

FIG. 1D depicts another exemplary architecture 103, which depicts the integration of host organization services with the blockchain services interface 190 in greater detail, in accordance with described embodiments.

In particular, there is now depicted both an integration builder 153 and accessible cloud platforms 156, each of which are interfaced into the blockchain metadata definition manager 196 of the blockchain services interface. The Integration builder 153 provides a variety of functionality which collectively permits for entity and metadata definition into a shared ledger 157 which is hosted internal to the host organization or which permits the entity and metadata definition into a blockchain which is made accessible through the host organization, even when such a blockchain is a public blockchain which is not under the ultimate control of the host organization.

Specifically depicted at the integration builder 153 are a one click blockchain connector 131 permitting users to click and drag components to link their application with an available blockchain internal to the host organization or accessible via the host organization, thus specifying a linkage between an application and a blockchain, without the user necessarily having to write code to establish the link.

The network formation manager 132 permits users to define what entities (e.g., applications, etc.), partners, tenants, users, customer organizations, etc., have access to the information written into the blockchain via their application.

The entity definition setup GUI 133 permits users to define, without writing code, an application or entity to which specified metadata will apply. For instance, this may be a new entity specified at the entity definition setup GUI 133 or this may be existing application, which are to be made compatible with the metadata definitions specified and established via the metadata definition GUI 134.

Lastly, the blockchain asset or coin deployment 135 permits a user to deploy their specified entities, with defined metadata and any associated applications, partners, customer orgs, tenants, users, etc., as specified via the network formation manager 132 onto the connected blockchain for use by applications or anyone having connectivity and where appropriate, relevant access rights. Once the entity and metadata defined via the GUIs are deployed onto the blockchain, they may be utilized by any application or entity having access and relevant access rights to the blockchain in question. Stated differently, the blockchain asset or coin deployment 135 component serves to "publish" or "go live" with the defined entities and metadata.

Further depicted are the accessible cloud platforms 156, via which information stored outside of the linked blockchain, yet accessible via the host organization, may be linked through a defined entity.

Therefore, if a user creates a new application and defines metadata for that application and deploys the defined entity and metadata onto the blockchain chosen, then it is further permissible to retrieve, reference, read and write data stored on variously accessible cloud platforms 171 accessible via the host organization which are not persisted within the chosen blockchain in question for that particular application.

For example, an application on the shared ledger 157 or another blockchain accessible via the host organization may retrieve data from the commerce cloud 171 provided by the host organization, or retrieve data from the marketing cloud 172 provided by the host organization or may reference information from third party and externally linked clouds 173, such as the externally linked clouds depicted here as 173A, 173B, and 173C, which may in reality correspond to, for example, an Amazon AWS cloud service interface, or a Microsoft Azure cloud service interface, or an Oracle cloud service interface, etc. So long as such third party clouds are externally linked via the host organization services 107, then they may be referenced by entities and applications which persist their data within a blockchain accessible via the host organization or hosted internal to the host organization.

Further depicted is a more detailed breakout of the network org shared ledger 157, which as noted previously, may provide to customer orgs wishing to avoid full deployment to a public blockchain, certain Distributed Ledger Technology (DLT) functional aspects, yet provide internally hosted ledger capabilities (within the host organization) which implements a centralized trust authority via the trust layer 154, rather than requiring consensus. Optionally, the shared ledger 157 may permit the customer org to reference consent management protocols 157A for testing or validation purposes, in which the customer organization may simply provide their own consensus for any transaction, as they are permitted to do within an internally hosted shared ledger 157 for which the customer organization has its own instance, and thus, ultimate authority. This is similar in function to relying upon the centralized trust interface 152, yet permits the customer organization to utilize DLT based consensus management as would be observed on a public blockchain, while retaining control over consensus management decisions. Later, if the customer org transitions their application to a public blockchain, then their migration path will be simplified as there will already be integration with consensus management components.

The consent management permits the customer org utilizing the shared ledger 157 to define which entities, users, partners, customer orgs, etc. have authority to reference, read, write, update, or delete transactions associated with a defined application as well as permit those same entities, users, partners, customer orgs, etc., to grant authority for their data to be referenced. The metadata definition deployment 157C module permits defined metadata to be written to the blockchain in question or written into the shared ledger 157 as an asset or as a coin, subsequent to which, entities, applications, and any code interacting with information for which metadata has been defined must be in compliance with the defined metadata, and may be forced into compliance via smart contract execution which performs metadata compliance validation.

Figure 1E:
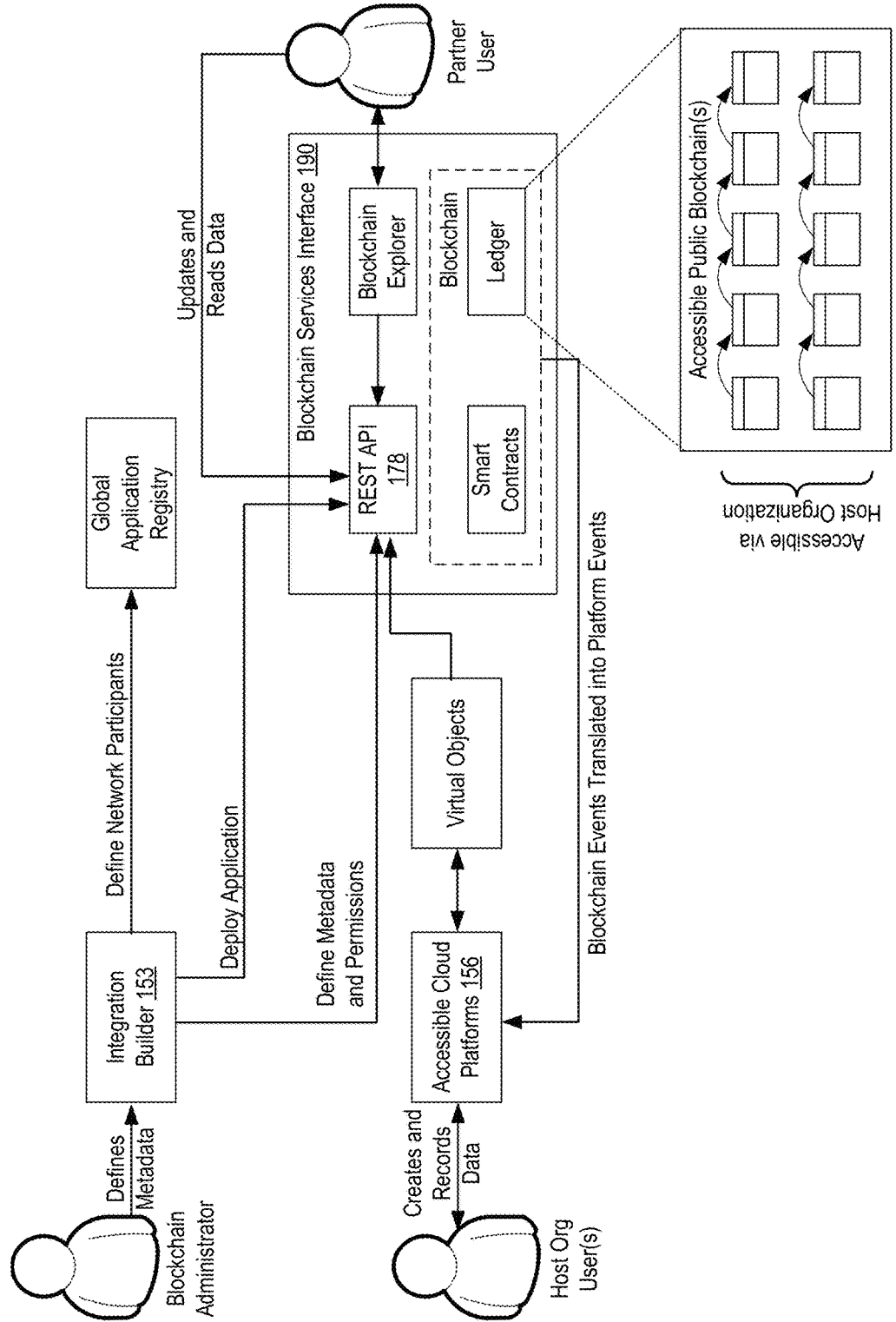
FIG. 1E depicts another exemplary architecture, which depicts an exemplary data flow utilizing the blockchain services interface, in accordance with described embodiments.

FIG. 1E depicts another exemplary architecture 104, which depicts an exemplary data flow utilizing the blockchain services interface 190, in accordance with described embodiments.

In particular, as shown here, there is a partner user which interacts with the blockchain services interface 190 and specifically with the blockchain explorer through which accessible blockchains may be discovered and referenced. The partner user may then update and read data, where permissions are appropriate, from the blockchain via the REST API as depicted at element 178. The blockchain persists the information for a defined entity application in compliance with the metadata definitions described previously.

The REST API 178 or the "Representational State Transfer" API is a software architectural style that defines a set of constraints used for creating and utilizing Web services. Web services that conform to the REST architectural style, termed RESTful Web services (RWS), provide interoperability between computer systems on the public Internet. RESTful Web services allow the requesting systems to access and manipulate textual representations of Web resources by using a uniform and predefined set of stateless operations, while other supported Web services, such as SOAP Web services, expose their own arbitrary sets of operations.

Such Web services may include any application entity that may be identified, named, addressed, or handled, in any way permitted by the application, via the public Internet, with so called RESTful Web service permitting requests to be made to a resource's URI which will then in turn elicit a responsive payload formatted in HTML, XML, JSON, or some other selected format. Utilizing a stateless protocol and standard operations, RESTful systems aim for fast performance, reliability, and the ability to grow, by re-using components that can be managed and updated without affecting the system as a whole, even while it is running, thus permitting fuller interoperability between the depicted blockchain and the connected elements, such as the partner user, the host org users, and the integration builder 153.

As shown here, there are blockchain events which are translated into platform events and transmitted to the accessible cloud platforms 156.

Host organization users may interact with such accessible cloud platforms 156 to create and record data, and where appropriate, data and events may be pushed back into the blockchain through configured virtual objects which communicate with the REST API to write information into the blockchain or to reference information in the blockchain or to update state information for managed events within the blockchain.

Additionally depicted here is a blockchain administrator which, for example, may utilize the previously described GUIs to define metadata at the integration builder 153, this permitting the blockchain administrator to define network participants which are recorded in the global application register, or to deploy an application which is then referenced by the REST API at the blockchain services interface, as well as to define metadata and permissions for the entity application deployed, thus ensuring that information for that deployed application when written into the blockchain must be in compliance with the defined metadata for such information associated with the application. Such compliance may be enforced by the smart contracts depicted here within the blockchain at the blockchain services interface 190.

As noted previously, the blockchain may be an internally hosted blockchain, such as shared ledger 157 hosted internally and wholly controlled by the host organization, or the blockchain may be any public blockchain accessible via the host organization.

Figure 2A:
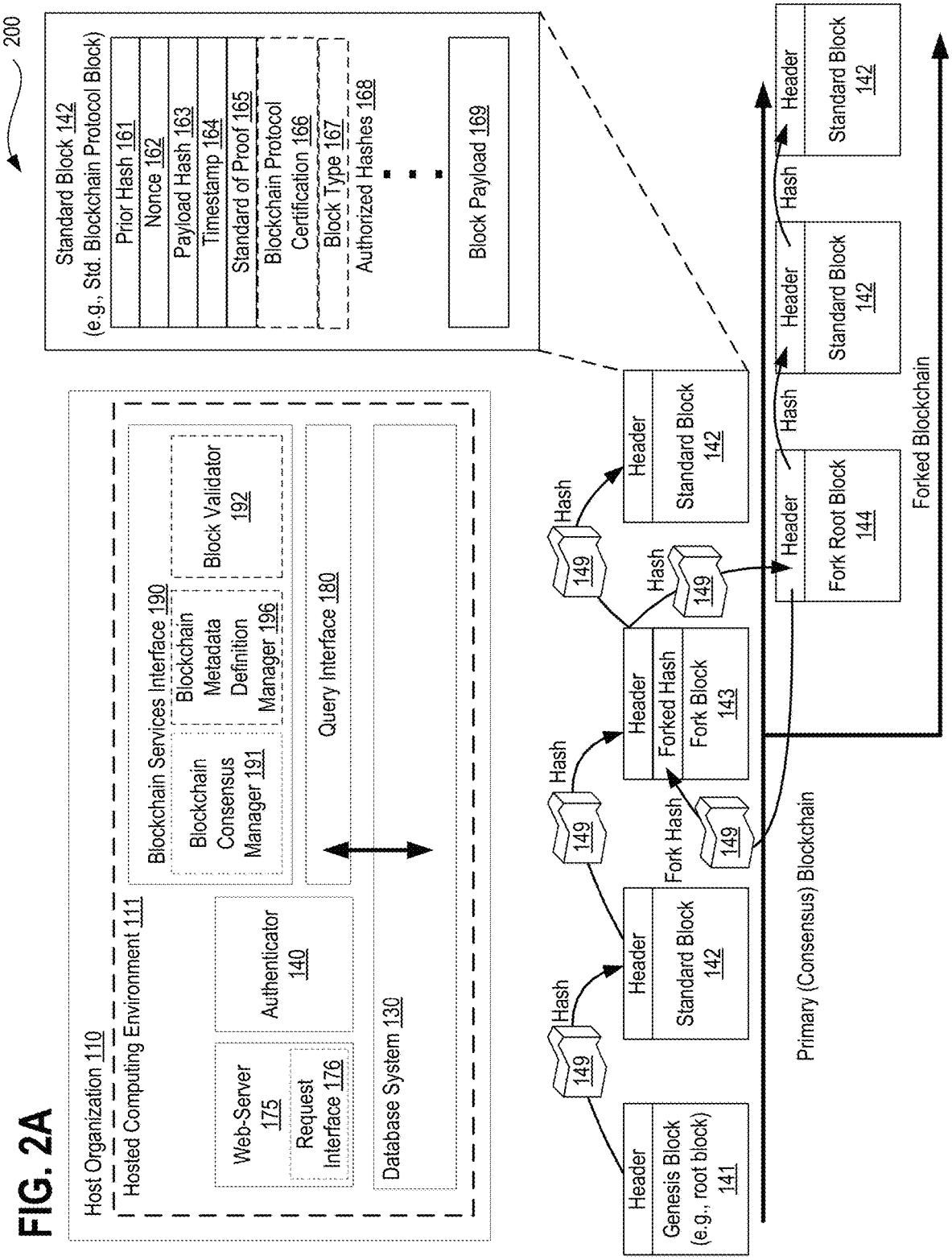
FIG. 2A depicts another exemplary architecture, with additional detail of a blockchain and a forked blockchain, in accordance with described embodiments.

FIG. 2A depicts another exemplary architecture 200, with additional detail of a blockchain and a forked blockchain, in accordance with described embodiments.

More particularly, there is now depicted a primary blockchain (e.g., a consensus blockchain) which begins with a genesis block 141 (sometimes called a root block) followed by a series of standard blocks 142, each having a header which is formed based at least in part from a hash of the header of the block which precedes it. There is additionally depicted a forked blockchain formed with an initial fork root block 144, followed by then a series of standard blocks 142. Because each block in the blockchain contains a hash of the immediately preceding block stored in the previous hash, a link going back through the chain from each block is effectively created via the blockchain and is a key component to making it prohibitively difficult or computationally infeasible to maliciously modify the chain.

As depicted, the primary blockchain includes a single fork which is originating from the fork block 143. As shown here, the genesis block 141 is a special block that begins the primary blockchain and is different from the other blocks because it is the first block in the primary blockchain and therefore, cannot by definition, include a hash of any previous block. The genesis block 141 marks the beginning of the primary blockchain for the particular blockchain protocol being utilized. The blockchain protocol governs the manner by which the primary blockchain grows, what data may be stored within, and forked blockchains are created, as well as the validity of any block and any chain may be verified via the block validator 192 of the host organization or any other participating network node of the blockchain pursuant to the rules and requirements set forth by the blockchain protocol certification 166 which is embedded within the genesis block 141 and then must be certified to and complied with by every subsequent block in the primary blockchain or any forked blockchain.

The blockchain protocol certification 166 inside each block in the genesis chain defines the default set of rules and configuration parameters that allows for the creation of forks and the modification of rules and configuration parameters in those forks, if any. Some blockchain protocol implementations permit no variation or non-compliance with the default set of rules as established via the blockchain protocol certification 166 and therefore, any fork will be the result of pending consensus for multiple competing and potentially valid primary blockchains. Once consensus is reached (typically after one or two cycles of new block formations) then the branch having consensus will be adopted and the fork truncated, thus returning to a single primary consensus blockchain. Conversely, in other implementations, a forked blockchain may permissibly be created and continue to exist indefinitely alongside the primary blockchain, so long as the forked blockchain complies with the blockchain protocol certification 166 and permissible variation of rules and configuration parameters for a forked blockchain within that blockchain protocol.

Fork block 143 anchors the forked blockchain to the primary blockchain such that both the primary blockchain and the forked chain are considered valid and permissible chains where allowed pursuant to the blockchain protocol certification 166. Normally, in a blockchain, all non-consensus forks are eventually ignored or truncated and thus considered invalid except for the one chain representing the longest chain having consensus. Nevertheless, the fork block 143 expands beyond the conventional norms of prior blockchain protocols by operating as and appearing as though it is a standard block 142, while additionally including a reference to a fork hash 149 identifying the first block of the permissible forked blockchain, represented here as the fork root block 144 for the valid forked blockchain. The fork root block 144 of the forked blockchain is then followed by standard blocks, each having a header based on a prior valid block's hash, and will continue indefinitely.

According to a particular embodiment, the forked blockchain utilizes some variation from the rules and configuration parameters utilized by default within the primary consensus blockchain, resulting in the need for a valid forked blockchain. Therefore, the variation of the rules and configuration parameters are encoded within a new blockchain protocol certification 166 for the fork root block 144 which, as noted above, must remain compliant with the original rules and valid range of configuration parameters as set forth by the blockchain protocol certification 166 of the original genesis block 141 for the primary blockchain. Because the fork root block 144 must continue to carry the original blockchain protocol certification 166, a forked blockchain protocol certification may be stored within a block payload 169 segment of the fork root block 144 thus establishing the rules and permissible configuration parameters of subsequent standard blocks 142 in the forked blockchain.

For instance, a forked blockchain may be utilized to support declarative smart actions as enabled by the host organization where a forked blockchain of a public or private blockchain is customized via a new blockchain protocol certification 166 to support both the declarative establishment of smart actions and their required information capture provisions as defined by an administrator as well as the ability to map the data captured with a transaction utilizing such a declared smart action back to the cloud platform entity as provided by the host organization.

When a new blockchain protocol certification 166 is applied for a valid fork, its rules and configuration is applied to all subsequent standard blocks for the fork and all subsequent sub-forks, where additional forks are permitted, and enforced by the participating nodes as though the forked blockchain were an original primary blockchain. Such forks may be desirable for certain customers seeking to apply a specialized set of rules or configurations for a particular group, such as a working group, a certain sub-type of transactions, or some other variation from the primary blockchain where an entirely separate "sidechain" is not required or desirable. A forked blockchain is distinguishable from a sidechain as it remains part of the same blockchain protocol and is permanently connected with the primary blockchain at the fork block 143 with a returned fork hash 149 being returned to and immutably written into the primary consensus blockchain where it will remain via the chain hashing scheme for all subsequent standard blocks of the primary blockchain. Stated very simply, the forked blockchain is explicitly tied to the primary blockchain via the fork block 143. Conversely, a sidechain may be an entirely distinct blockchain protocol for which an agreed rate of exchange or conversion factor is applied to all information or value passed between the primary blockchain and any sidechain without any explicit reference or fork hash 149 embedded within the primary blockchain.

Sidechaining therefore is a mechanism by which declared smart actions for assets, tokens, value, or payload entries from one blockchain may be securely used within a completely separate blockchain via a pre-defined exchange or conversion scheme, and yet, be permissibly moved back to the original chain, if necessary. By convention, the original blockchain is referred to as the main chain or the primary blockchain, whereas any additional blockchains which allow users to transact within them utilizing the tokens, values, or payload of the main chain are referred to as sidechains. For instance, there may be a private blockchain with a defined linkage to a public blockchain, thus allowing tokens, value, or payload data to be securely moved between the public blockchain and the private blockchain.

Consider for instance the host organization's use of a previously existing blockchain for the implementation of the services provided by the blockchain metadata definition manager 196. It may be advantageous to utilize an existing blockchain, but then creating a specialized sidechain or a forked blockchain specifically for the services provided by blockchain metadata definition manager 196 yet remain in compliance with the blockchain protocol certification 166 required by the primary (consensus) blockchain. In other instances, a modified Distributed Ledger Technology such as the shared ledger 157 at FIG. 1C may be utilized which is a hosted ledger fully under the control of the host organization, and as such, it may not be necessary to side-chain from a primary chain. Still other examples may include the host organization providing and defining the blockchain protocol for a public blockchain, in which case the host organization may define the blockchain protocol utilized in such a way that the extended capabilities of the blockchain metadata definition manager 196 (see e.g., FIG. 1A) are native to the protocol, thus requiring no side-chaining or conversely, the host organization may define and operate a public blockchain which has a limited sub-set of functionality available to the public and then extend the capabilities of the blockchain metadata definition manager 196 by side-chaining off of the public blockchain to provide the enhanced functionality.

According to described embodiments, the blockchain protocol certification 166 defining the protocol rules for a forked chain may be developed in any relevant programming or scripting language, such as, Python, Ruby, Perl, JavaScript, PHP, Scheme, VBScript, Java, Microsoft .Net, C++, C #, C, or a custom-created language for defining the protocol rules.

Under normal operating conditions, even conventional blockchains naturally fork from time to time, however, with previously known blockchains, ultimately only a single branch may form the primary consensus chain and all other forks must be ignored or truncated with only the primary consensus blockchain being considered as valid. Consensus on which chain is valid may be achieved by choosing the longest chain, which thus represents the blockchain having the most work put into completing it. Therefore, it is necessary to utilize the fork block 143 as described herein to permit permissibly forked chains to be created and certified as authorized forks via the fork hash 149 so as to prevent participating nodes to ignore or truncate the fork. Because each node may independently validate the forked blockchain, it will not be ignored, just as a validated primary blockchain will not be ignored upon having consensus.

FIG. 2B depicts another exemplary architecture 201 with additional detail for sidechains, in accordance with described embodiments.

More particularly, there is depicted here mechanism by which to perform a symmetric two-way pegged transfer from a parent blockchain 188 (e.g., e.g., a primary chain) to a sidechain 189, which may be a different blockchain protocol supported by and provided by the host organization 110 or the sidechain may be a foreign blockchain, public or private, for which the sidechain exchange manager 193 of the host organization 110 participates as a node, so as to permit access and transactional capabilities with the sidechain.

Regardless, it is in accordance with described embodiments that inter-chain transfers between the parent blockchain 188 and the sidechain 189 may permissibly be performed in compliance with the rules and conditions of each respective blockchain. Notably, as described here, the perspective of each blockchain is interchangeable insomuch that the sidechain 189 depicted here may consider itself as a primary or parent blockchain and consider the depicted parent blockchain 188 as the child blockchain or a sidechain. Regardless, each blockchain operates independently, yet has a defined exchange mechanism by which to exchange assets, coins, tokens, value, or other payload information between them which have been created by a transaction utilizing a declared smart action.

As shown here, the sidechain exchange manager 193 of the host organization may send a parent chain asset as an output of the parent blockchain 188 at operation 151.

A Simplified Payment Verification (SPV) proof 181 associated with the parent blockchain 188 asset is generated as the output and communicated to the sidechain 189. The SPV proof may include a threshold level of work, and the generating may take place over a predetermined period of time, which may also be referred to as a confirmation period 152. The confirmation period of a transfer between chains may be a duration for which a coin, token, or other exchanged value is locked on the parent blockchain 188 before may successfully be transferred to the sidechain 189 pursuant to the send SPV-locked output operation 127. This confirmation period may allow for sufficient work to be created such that a denial of service attack in the next waiting period becomes more computationally difficult.

Consider for instance an exemplary confirmation period which may be on the order of 1-2 days. The confirmation period may be implemented, in such an example, as a per-sidechain security parameter, which trades off cross-chain transfer speeds in exchange for greater security. Other confirmation periods which are much shorter may be utilized where sufficiently difficult proof of work conditions are effectuated so as to ensure adequate security so as to protect the integrity of both blockchains and negate the potential for fraudulent transactions.

The output created on the parent blockchain 188 may specify via rules and configuration parameters (e.g., stored within the blockchain protocol certification portion of each block of the parent blockchain 188) a requirement that any spending, transfer, or consumption of an asset received by the output in the future are burdened with additional conditions, in addition to the rules governing transfer within the parent chain. For example, any release of assets received by the output may require additional conditions for verifying a proof from the destination chain, such as validating that the rules for the destination chain proof show that the destination chain has released the asset and show to where the asset has been released. After creating the output on the parent blockchain 188, the user waits out the confirmation period, meanwhile, intra-chain transfers 153 continue to occur. Subsequent to waiting out the confirmation period 122, a transaction is then created on the sidechain 189 referencing the output from the parent blockchain 188.

The sidechain, using a sidechain validator service, such as the block validator 192 of the host organization, is then provided with an SPV proof that shows the parent chain asset was created and encumbered by sufficient work within the parent chain. A sidechain validator service (e.g., block validator 192 if performed by the host organization's available services) will then validate that the SPV proof 181 associated with the parent blockchain 188 asset meets the required threshold level of work indicated by the SPV proof at operation 124 and a sidechain 189 asset corresponding to the parent blockchain 188 asset is then generated.

The generated sidechain 189 asset also may be held for a predetermined contest period at operation 124, during which time the transfer will be invalidated if a reorganization proof 183 associated with the parent blockchain 188 asset is detected in the parent blockchain.

The contest period at operation 124 may be a duration during which a newly-transferred token, coin, value, or payload data may not be spent, accessed, or consumed on the sidechain 189. The predetermined contest period is implemented to prevent any possibility for double-spending in the parent blockchain 188 by transferring previously-locked coins, tokens, value, or payload data during a reorganization. If at any point during this delay, a new SPV proof 184 (known as a "reorganization proof") is published containing a chain with more aggregate work which does not include the block in which the SPV lock output 121 was created, the conversion is retroactively invalidated. If no reorganization proof is detected, the sidechain asset may be released. All participating nodes on the sidechain have an incentive to produce reorganization proofs if possible, as the consequence of a bad proof being admitted degrades the value of all sidechain tokens, coins, value, or trust in the authenticity of payload data stored by the sidechain 189.

Similar to the above, an exemplary contest period 126 at operation 156 may also be on the order of 1-2 days. To avoid these delays, users may instead employ use atomic swaps for fungible transfers, so long as a liquid market is available. Where the exchanged asset is a unique or less common token, value, or payload data, atomic swaps will not be feasible and a sidechain transfer must instead occur, despite the necessity of a potentially lengthy 1-2 day waiting period.

Upon eventual release of the sidechain asset, the side chain asset corresponding to the parent chain asset may then be transferred or consumed within the sidechain one or more times the intra-chain transfers 123 of the sidechain 189. While locked on the parent blockchain 188, the asset is freely transferable within the sidechain and without requiring any further interaction with the parent blockchain 188, thus permitting the sidechain 189 to again operate wholly independently. Notwithstanding the above, the sidechain asset retains its identity as a parent chain token, coin, value, or payload data and may therefore, if the need arises, be transferred back to the originating parent blockchain 188 from which the sidechain asset originated. In certain embodiments, transfers are relegated to only a single hop, such that an asset cannot be transferred to a sidechain 189 and then transferred again to another sidechain, where it is necessary to prevent obfuscation of the source. Such restrictions are dependent upon the particular blockchain protocol chosen and the define exchange agreement (e.g., pegging conditions) established between a parent blockchain 188 and a sidechain 189.

Where it becomes necessary to redeem a sidechain asset in the parent blockchain 188, the sidechain asset may be sent to an output of the sidechain as depicted at operation 157. An SPV proof 182 associated with the sidechain asset is thus generated and communicated to the parent blockchain 188. A parent chain validator service, such as the block validator 192 of the host organization 110, may validate the SPV proof 182 associated with the sidechain asset at operation 156. The validated the SPV proof 182 associated with the sidechain 189 asset may include, for example, validation that the SPV proof 182 associated with the sidechain asset meets the threshold level of work indicated by the SPV proof 182 associated with the sidechain asset.

As before, the parent chain asset associated with the sidechain asset may be held for a second predetermined contest period at step 129, during which a release of the parent chain asset is denied at operation 128 where the contest period ends if a reorganization proof 183 associated with the sidechain asset is detected in the sidechain. The parent chain asset may be released if no reorganization proof 183 associated with the sidechain asset is detected.

If validation failure occurs with respect to the new and second SPV proof 184, after the reorganization proof 183 is received, then a new and second SPV proof 184 associated with the sidechain asset may be received and validated by the parent blockchain 188 during a third predetermined contest period at operation 159. The parent blockchain 188 asset may be released if no reorganization proof associated with the sidechain asset is detected during the third predetermined contest period, after which the parent chain asset is free to be transferred within the parent chain via the depicted intra-chain transfers 123 shown at the rightmost side of the parent blockchain 188 flow.

Because pegged sidechains may carry assets from many different blockchains, it may be problematic to make assumptions about the security of the other foreign blockchains. It is therefore required in accordance with certain embodiments that different assets are not interchangeable (except by an explicit trade) within the sidechain. Otherwise, a malicious user may potentially execute a fraudulent transaction by creating a worthless chain with a worthless asset, and then proceed to move the worthless asset from their worthless chain into the primary blockchain 188 or into a sidechain 189 with which the primary blockchain 188 interacts and conducts exchanges. This presumes that the worthless chain secures a pegged exchange agreement with the sidechain. However, because the rules, configuration options, and security scheme of the sidechain 189 is not controlled by the parent blockchain 188 (assuming the sidechain is a foreign sidechain and not another blockchain protocol provided by the host organization 110), it simply cannot be known with certainty that the sidechain 189 being interacted with does not contain such vulnerabilities. To negate this potential security vulnerability, the sidechain 189 may be required, as per the pegged exchange agreement, to treat assets from separate parent blockchains as wholly as separate asset types, as denoted by the block type portion of a blockchain protocol block as depicted at FIG. 1B, element 167.

With a symmetric two-way pegged sidechain transfer, both the parent blockchain 188 and sidechains 189 may perform SPV validation services of data on each other, especially where the parent blockchain 188 is provided the host organization and where the sidechain is a foreign sidechain for which the host organization is merely a participating node via the sidechain exchange manager node 193. Because the parent blockchain 188 clients (e.g., participating nodes) do not observe every sidechain, users import proofs of work from the sidechain into the parent chain in order to prove possession. In a symmetric two-way peg, the reverse is also true. For example, to use Bitcoin as a parent blockchain 188, an extension script to recognize and validate such SPV proofs may be utilized. To facilitate such transactions, the SPV proofs are sufficiently small in size so as to fit within a Bitcoin transaction payload. However, such a change may alternatively be implemented as a forking transaction, as described previously, without affecting transactions not involved in pegged sidechain transactions. Stated differently, using symmetric two-way pegged sidechains as described above, no further restrictions need to be placed upon any transaction deemed valid within Bitcoin.

Through the use of such pegged sidechains transactions, independent blockchains are made to be flexible enough to support many assets, including assets that did not exist when the chain was first created. Each of these assets may be labeled with the blockchain from which it was transferred so as to ensure that transfers may be unwound (e.g., transferred back) correctly.

According to certain embodiments, the duration of the contest period is made as a function of the relative hashpower of the parent chain and the sidechain, such that the receiving sidechain (or the parent blockchain with an incoming transfer) may only unlock tokens, coins, value, or data payloads, given an SPV proof of one day's worth of its own proof-of-work, which may, for example, correspond to several days of the sending blockchain's proof-of-work. Security parameters of the particular sidechain's blockchain protocol implementation may thus be tuned to each particular sidechain's implementation.

According to described embodiments, the block validator 192 may require, utilize, or apply various types of consensus management to the blocks requiring validation.

When a block containing a particular asset or transaction is to be added to the blockchain, the transaction type database is queried using the type of the particular asset or transaction that is to be added to the blockchain to determine the corresponding consensus protocol type that is to be used to commit the particular asset or transaction, or block containing the particular asset or transaction, to the blockchain. For example, in the database, a transaction type of "loan" may be associated with a consensus protocol type of "proof of stake" (PoS), an asset type of "document" may be associated with a consensus protocol type of "Byzantine Fault Tolerant" (BFT), an asset or transaction type of "currency" may be associated with a consensus protocol type of "proof of work" (PoW), and a default transaction type to be used in the case of an otherwise unenumerated transaction type in the database may be associated with a default consensus protocol type, say, PoS. Another transaction type may correspond to an asset type having metadata stored therein, possibly typed as "metadata," while a closely related transaction type stores a "related entity" as metadata within the blockchain having a transaction type of either "metadata" if it shares the same type as normal metadata or having a transaction type of "related entity" if separate. Still further, a "stored record" transaction type may be utilized to store a record having multiple distinct data elements embedded therein, typically which will be defined by metadata specified by an application developer.

For instance, when a block or transaction within a block having a particular transaction type corresponding to transactions utilizing a declared smart action is to be added to the blockchain, the consensus protocol type to be used to commit the block or transaction therein to the blockchain is PoS, when a block or transaction therein with a particular asset having the type "document" is to be added to the blockchain, the consensus protocol type to be used to commit the block or transaction therein to the blockchain is BFT, and when a block or transaction therein with a particular transaction having a transaction type that is not specified in the database is to be added to the blockchain, then the default consensus protocol type of PoS is to be used to commit the block or transaction therein to the blockchain.

This selected consensus protocol type may be communicated to the nodes in the consortium for use in for validating the request to add the new block or transaction therein to the blockchain. According to certain embodiments, the host organization 110 receives validation of the request to add the new block or transaction therein to the blockchain when the nodes in the consortium reach consensus according to the selected consensus protocol to add the block or transaction therein to the blockchain and communicate such to the host.

Any relevant factors may be used in determining which nodes participate in the consensus protocol, including, for example, the selected consensus protocol itself, a particular node's computing resources, the stake a particular node has in the consortium or the selected consensus protocol, relevant (domain) knowledge a particular node has, whether that knowledge is inside (on-chain) or outside (off-chain) with regard to the blockchain or consortium, a particular node's previous or historical performance, whether in terms of speed or accuracy, or lack thereof, in participating in the selected consensus protocol, the block number of the new block being added to the blockchain, the number of transactions in the new block, the size of the block, and the fiduciary or nonfiduciary nature of the assets or transactions in the block being added to the blockchain.

According to a particular embodiment, the host organization 110 receives from each of one or more of the nodes in a peer-to-peer network a weighted vote to validate or to add a new block or transaction therein to the blockchain, in response to the request, or in response to a request for a vote issued by the blockchain platform host. These nodes learn of the request either through a blockchain protocol packet broadcast by the node generating the request, or by communication with other nodes in the consortium or the blockchain platform host providing notice of the request in conjunction or combination with the request for a vote transmitted by the blockchain platform host. The host organization then responsively validates, or receives validation of, the request to add the new block or transaction therein to the blockchain when a sum of the received weighted votes exceeds a threshold.

According to another embodiment, a consortium of nodes participate in a private, or permissioned, blockchain within which each node is assigned a weight that its vote will be given, for example, based on domain (general) knowledge about the transactions, or types of transactions, the nodes may add to a new block in the blockchain. Certain nodes may be given a zero weight within such a permissioned blockchain, whereas other nodes may be given such a significant weight that their vote is near controlling or even controlling when combined with a limited number of other highly weighted nodes, depending upon the particular implementation.

Before a node adds a transaction to a new block of the blockchain, or before the new block including the transaction may be added to the blockchain, other nodes in the consortium vote on adding the transaction to the new block for the blockchain and/or adding the new block to the blockchain. When a majority of nodes agree the transaction and/or new block is valid and may thus be accepted as a valid block on the primary blockchain, the transaction and/or new block is added and accepted to that primary blockchain, sometimes called the main chain or the consensus chain. For instance, while an invalid block may be added to the blockchain, such an invalid block in effect creates a side chain which fails to attain consensus, and thus, is never accepted as an added valid block within the main or primary blockchain. Nodes are weighted such that a "majority" may be obtained or denied based on the votes of one or more of the nodes participating in the private blockchain, that is, a majority may be obtained from less than all of the nodes participating in the blockchain.

According to this embodiment, the parties in the consortium agree upon the weight, w, to assign each node in the consortium, for example, based on a party's domain knowledge, and/or other criteria, including, for example, a party's participation in another blockchain or sidechain. The total weight, W, of the nodes in the consortium is equal to the sum of the individual node weights, $w_1+w_2+\ldots w_n$, where n is the number of nodes in the consortium. The weight, w, of any one member, or the ratio of w/W may or may not exceed a certain threshold, in one embodiment. Each node's weight is attributed to the respective node's vote. If the sum of the weights for the nodes that voted exceed a certain threshold, the transaction/new block is validated and added to the blockchain. In particular, the transaction/new block is added if the total weight, W, attributed to the votes meets or exceeds a threshold (e.g., a plurality, majority, supermajority, in terms of percentage of w/W, or absolute value for w, whatever is agreed upon by the consortium) to reach consensus for the blockchain. In this embodiment, the nodes in the blockchain do not need to come to unanimous agreement about adding the transaction and/or new block to the blockchain, and indeed, after the threshold is met, a node need not begin, or continue, to participate in the voting process.

In one embodiment, at least a minimum number of nodes, k, vote on adding a transaction to the new block in the blockchain, or adding the new block that includes the transaction to the blockchain, to mitigate the risk of fraud or double-spending, or to prevent one node with a large weight, w, or a small group of nodes with a collectively large weight, from controlling the outcome of the vote. In one embodiment, the number of nodes that participate in voting, k, or the ratio of k/n must meet a minimum threshold.

Figure 3A:
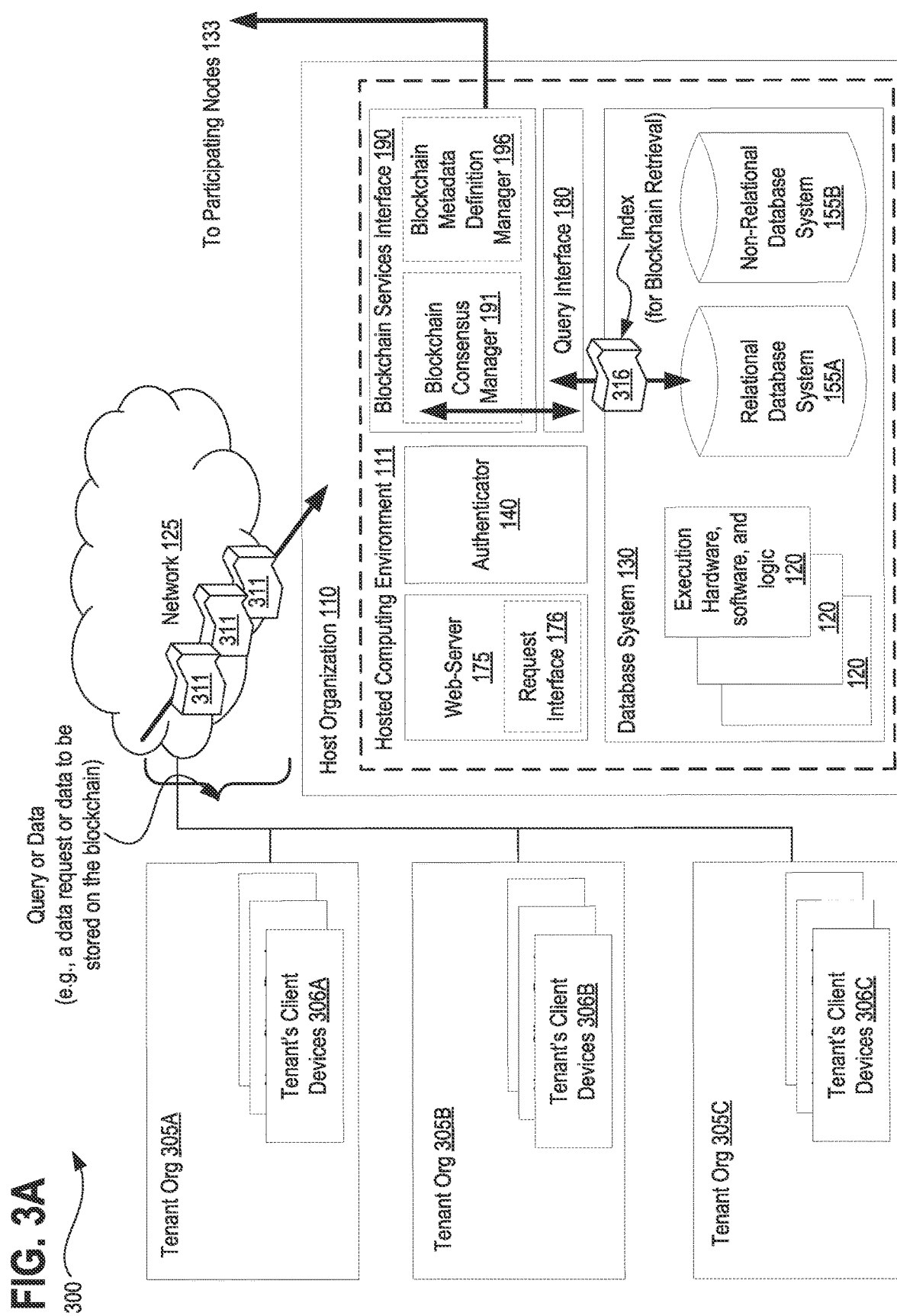
FIG. 3A depicts an exemplary architecture in accordance with described embodiments.

FIG. 3A depicts an exemplary architecture 300 in accordance with described embodiments.

As depicted here, there is again the host organization 110 which includes the hosted computing environment 111 having a processor and memory (e.g., within the execution hardware, software, and logic 120 of the database system 130) which serve to operate the blockchain services interface 190 including the blockchain consensus manager 191 and blockchain metadata definition manager 196. There is additionally depicted an index 316 which provides addressing capabilities for data, metadata, and records which are written to, or transacted onto the blockchain.

Additionally depicted are the multiple tenant orgs 305A, 305B, and 305C (also referred to sometimes as customer orgs) each of which have tenant client devices 306A, 306B, and 306C via which the tenants and the tenants' users may interact with the host organization 110 and its services. For example, the tenant orgs may submit queries or data 311 to the host organization to request data retrieval from the blockchain or to store data to the blockchain, either of which may utilize the depicted index 316.

According to certain embodiments, the index 316 implements a Merkle Tree Index or a Merkle Directed Acyclic Graph (DAG) or a "Merkle-DAG" tree index. In cryptography and computer science, a hash tree or Merkle tree is a tree in which every leaf node is labeled with the hash of a data block, and every non-leaf node is labeled with the cryptographic hash of the labels of its child nodes. Such trees allow for efficient and secure verification of the contents of large data structures and thus provide significant efficiencies for data retrieval from large data structures. According to such an embodiment, implementing the index 316 via a Merkle tree or the Merkle-DAG tree recursively defines the index as a binary tree of hash lists where the parent node is the hash of its children, and the leaf nodes are hashes of the original data blocks. The Merkle-DAG tree permits for unbalanced trees and permits data in the leaf (terminal) nodes.

Implementing the index 316 via a Merkle tree provides a means to prove the integrity and validity of data stored within the index, requires relatively little memory or disk space as the proofs are computationally easy and fast, and additionally, the proofs and management for the Merkle tree index requires only very small or tiny amounts of information to be transmitted across networks, thus being more operationally efficient in terms of network resource consumption. While many blockchains heavily rely upon the use of Merkle trees for the purposes of block verification, the index 316 implemented utilizing a Merkle tree, is unrelated to the block verification functions of the blockchain and is used here as a robust and efficient means by which to store the index 316 information.

Figure 3B:
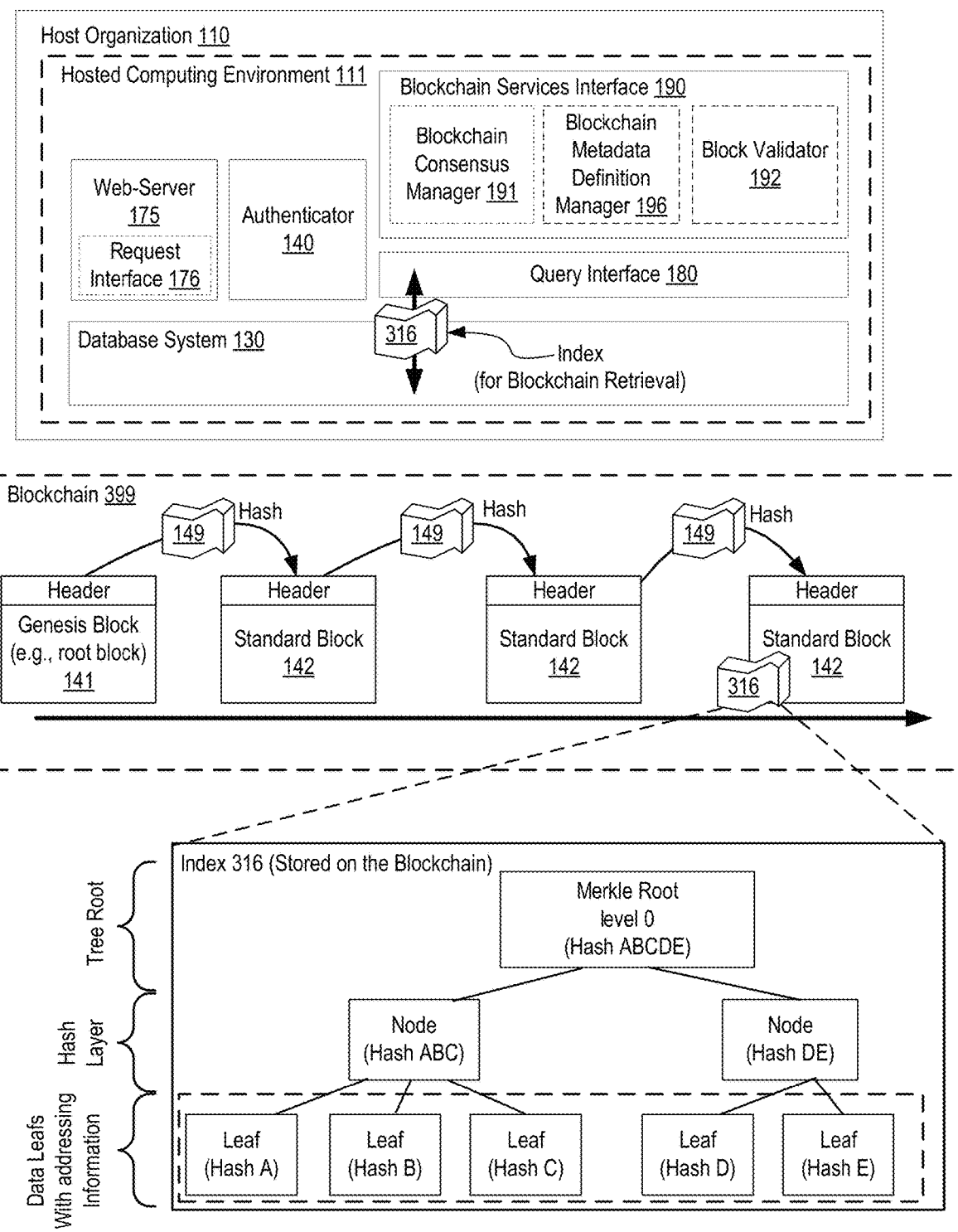
FIG. 3B depicts another exemplary architecture in accordance with described embodiments.

FIG. 3B depicts another exemplary architecture 301 in accordance with described embodiments.

There is again the host organization 110 which includes the hosted computing environment 111 having a processor and memory (e.g., within the execution hardware, software, and logic 120 of the database system 130) which serve to operate the blockchain services interface 190 including the blockchain consensus manager 191 and blockchain metadata definition manager 196. There is additionally depicted an index 316 which provides addressing capabilities for data, metadata, and records which are written to, or transacted onto the blockchain 399.

As shown, the index 316 is stored within the database system 130 of the host organization, however, the Merkle tree index 316 may alternatively be written to and stored on the blockchain itself, thus enabling participating nodes with the blockchain which lack access to the query interface 180 of the host organization to nevertheless be able to retrieve the Merkle tree index 316 (when stored on the blockchain)

and then use an address retrieved from the Merkle tree index 316 to directly reference an addressable block on the blockchain to retrieve the desired record, data, or metadata, without having to traverse the entire blockchain or search the blockchain for the needed record.

As depicted, there is another index 316 depicted as being shown within the last standard block 142 of the blockchain 399. Only one index 316 is required, but the index 316 may permissibly be stored in either location.

The Merkle tree index 316 depicted in greater detail at the bottom shows a level 0 Merkle root having a hash of ABCDE, followed by a hash layer with two hash nodes, a first with hash ABC and a second with a hash DE, followed by the data blocks within the data leafs identified by hash A, B, C, D, and E, each containing the addressing information for the addressable blocks on the blockchain.

Storing data and metadata on the blockchain 399 via the blockchain metadata definition manager 196 in conjunction with the use of a Merkle tree index 316 is much more efficient than previously known data storage schemes as it is not necessary to search through multiple blocks 141 and 142 of the blockchain to retrieve a data record. Rather, the index 316 is first searched to retrieve an address for the desired block, which is very fast and efficient, and then using the retrieved address from the index 316, the record is retrieved directly from the addressable block on the blockchain 399.

As data is stored within a blockchain using conventional techniques, the amount of data in the blockchain explodes in terms of total volume of stored data creating scalability problems and resulting in problematic inefficiencies. The total volume of data stored to a blockchain tends to explode or grow unsustainably over time because every time a stored record is updated or modified, it is necessary to re-write the entirety of the modified record back to the blockchain which then becomes the most recent and up-to-date record, however, all prior versions and copies are retained within the blockchain, thus resulting in significant duplicative data entries being stored. The benefit to such an approach is that an entire record may be retrieved from a single block on the blockchain, without having to refer back to prior blocks on the blockchain for the same record. But, such a storage scheme is highly inefficient in terms of storage.

Alternatively, only a modification to a record stored within the blockchain may be stored, in accordance with conventional approaches, thus resulting in the modified data being written into a new block on the blockchain, with the non-modifiable data being retrievable from a prior block of the blockchain. This approach reduces the total amount of data stored by the blockchain. Unfortunately, any data retrieval of a modified record requires the inspecting and retrieval from multiple blocks on the blockchain, thus mitigating the data redundancy and unsustainable growth problem, but trading that problem for an undesirable data retrieval inefficiency problem.

In such a way, data management for records and information stored within the blockchain 399 is improved. Moreover, metadata may additionally be stored within the blockchain to provide additional information and context regarding stored records, with each of the data records and the metadata describing such data records being more easily retrievable through the use of the index 316. Such metadata permits a business or other entity to transform the data record retrieved from the blockchain back into a useable format much easier than with conventional approaches which lose such context and metadata for any record written to the blockchain.

Figure 3C:
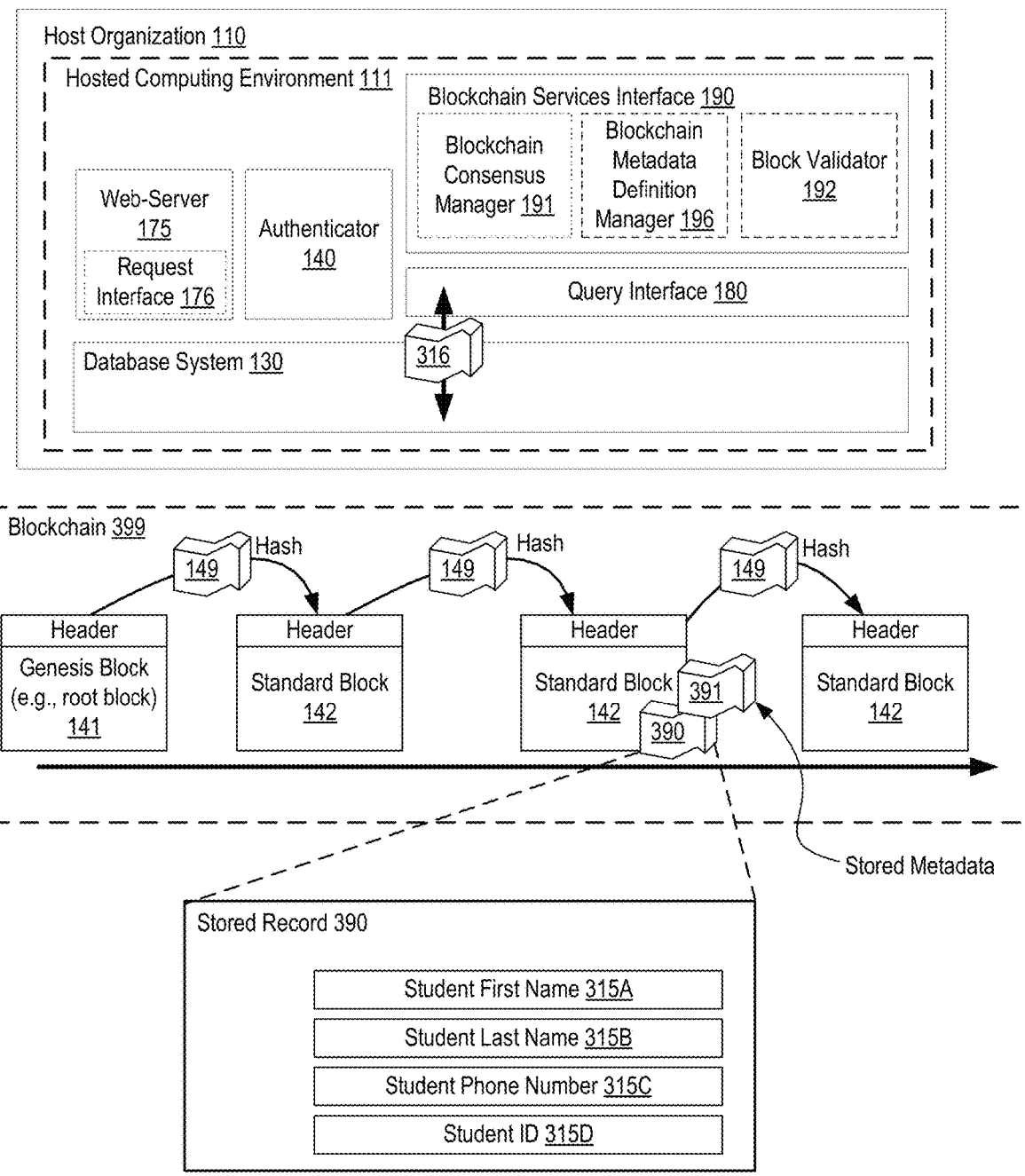
FIG. 3C depicts another exemplary architecture in accordance with described embodiments.

FIG. 3C depicts another exemplary architecture 302 in accordance with described embodiments.

There is again the host organization 110 which includes the hosted computing environment 111 having a processor and memory (e.g., within the execution hardware, software, and logic 120 of the database system 130) which serve to operate the blockchain services interface 190 including the blockchain consensus manager 191 and the blockchain metadata definition manager 196 which utilizes an index 316 by which to identify an addressable block of the blockchain 399 via which a desired record is stored. There is additionally depicted an exemplary stored record 390 at the second to last block of the blockchain 399.

Here the stored record 390 stores student information including a student first name 315A, a student last name 315B, a student phone number 315C, and a student ID 315D.

Once the stored record 390 is transacted onto the blockchain, for instance, by adding an asset to the blockchain within which the stored record 390 is embodied, student data is persistently stored by the blockchain and accessible to participating nodes with access to the blockchain 399, however, when such data is retrieved, the stored record does not in of itself describe how to use such data, any particular format for such data, or how to validate such data. Therefore, it is further permissible to store metadata within the blockchain which may then be used to define the format, validation means, and use for such data, but storage of the metadata only exacerbates the problem of searching for and retrieving data from the blockchain as there is now a stored record 390 and also stored metadata 391 which is associated with that record. An organization methodology is thus provided by the indexing scheme as implemented by the blockchain metadata definition manager 196 in conjunction with use of the index 316 which provides for more efficient storage, retrieval, and validation of data stored on the blockchain.

According to one embodiment, the stored record 390 is therefore converted to a more efficient format for storage within the blockchain. Consider the stored record 390 for which student information is stored. Initially, the stored record 390 may include only student first name 315A and student last name 315B, and is then stored. Subsequently, the student record is updated to include student phone number 315C, and thus, either the stored record 390 is updated and re-written to the blockchain in its entirety thus creating a second copy, albeit updated, of the stored record 390 or alternatively, only the new portion, the student phone number 315C is written to the blockchain with a reference back to the prior record, in which case total storage volume is reduced, but retrieval of the entire record requires searching for and finding multiple blocks on the blockchain from which to reconstruct the entire stored record 390. Worse yet, if the student ID 315D is subsequently assigned, then the stored record 390 needs to be updated again, thus writing yet another entire stored record 390 to the blockchain resulting in now three different versions and copies on the blockchain, or as before, writing only the new portion of the stored record to the blockchain 399, in which case the stored record 390 is fragmented across at least three blocks of the blockchain.

This fragmentation is problematic because if you are looking for student information, it may result that a first block contains the student's first name and last name, a second block contains a change to the student's last name due to an update, a third block contains only the student's phone number, and so forth. Consequently, it is necessary to travel the blocks of the blockchain to pick up all the fragmented pieces so as to reconstruct the entire stored record 390 before it may be used for whatever application requires the data.

Figure 3D:
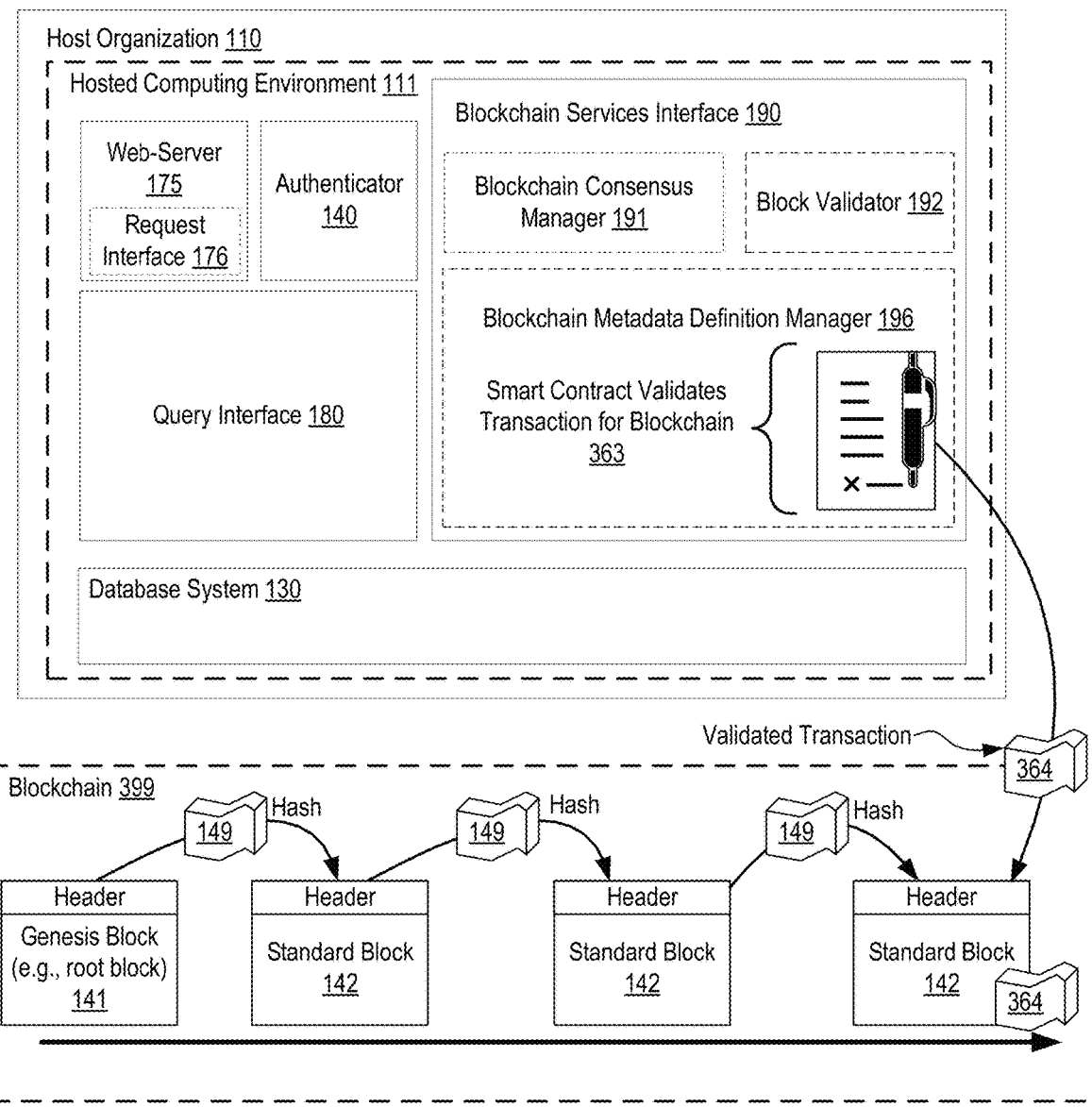
FIG. 3D depicts another exemplary architecture in accordance with described embodiments.

FIG. 3D depicts another exemplary architecture 303 in accordance with described embodiments.

According to one embodiment, the blockchain metadata definition manager 196 writes data or metadata onto a blockchain by transacting an asset to the blockchain or adding an asset to the blockchain via a new transaction with the blockchain. According to a particular embodiment, the transaction has a specific transaction type, for instance, defined as a blockchain storage transaction type, which triggers execution of a smart contract to perform validation of the transaction and specifically to perform validation of the data or metadata within the asset being added to or transacted onto the blockchain.

For example, such a smart contract 363 may execute via the host organization's blockchain services interface 190 which performs the validation and then transacts the new asset onto the blockchain pursuant to successful validation of the data or metadata within the asset being stored on the blockchain. As shown here at element 363, a smart contract executes and validates the transaction for the blockchain. Subsequently, a validated transaction 364 is then added to or transacted onto the blockchain 399.

Figure 4A:
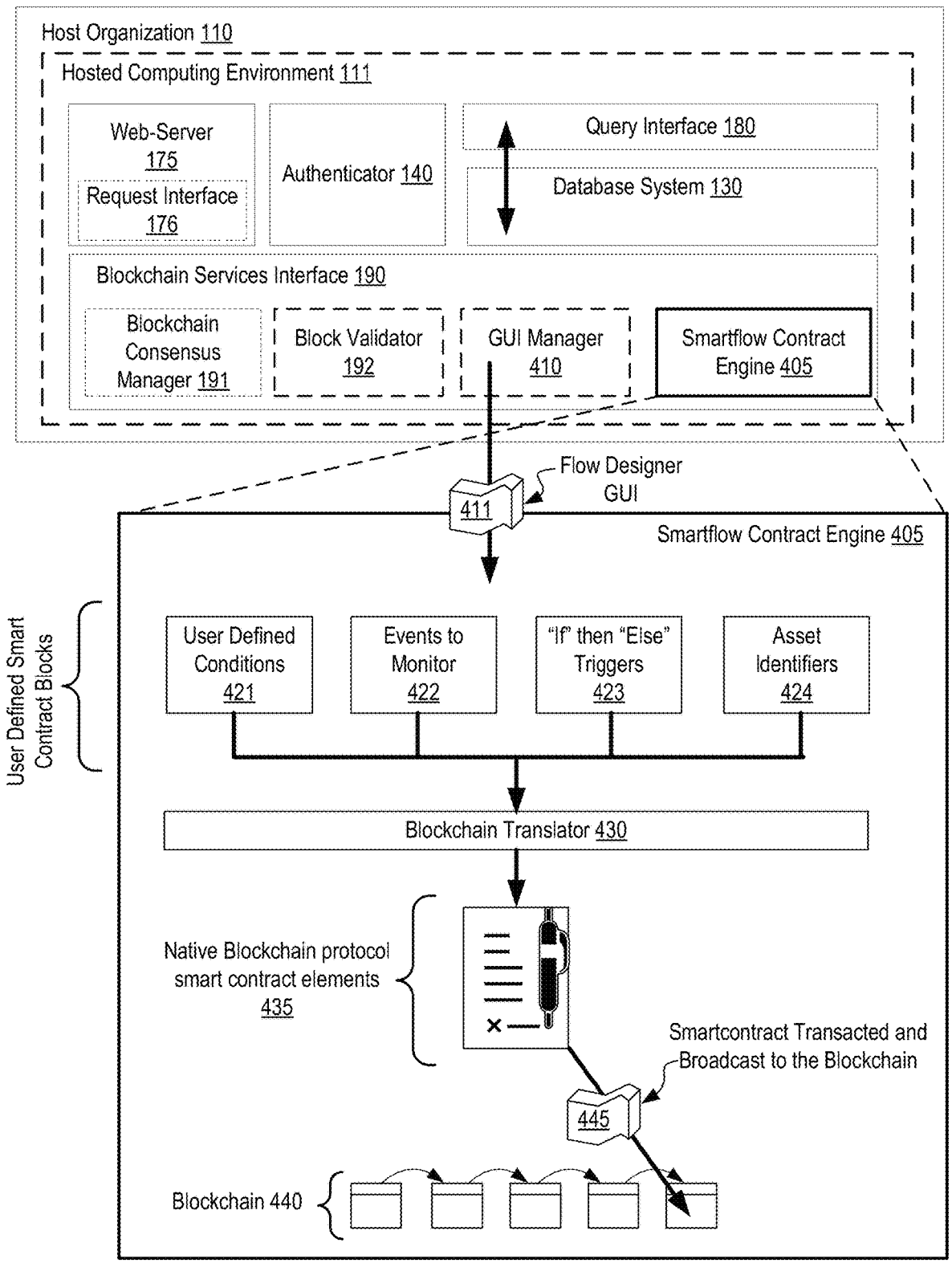
FIG. 4A depicts another exemplary architecture, with additional detail of a blockchain implemented smart contract created utilizing a smartflow contract engine, in accordance with described embodiments.

FIG. 4A depicts another exemplary architecture 400, with additional detail of a blockchain implemented smart contract created utilizing a smartflow contract engine 405, in accordance with described embodiments.

In particular, there is depicted here within the host organization the blockchain services interface 190 which now includes the smartflow contract engine 405 and additionally includes the GUI manager 410.

Because blockchain utilizes a distributed ledger, creation and execution of smart contracts may be technically complex, especially for novice users. Consequently, a smart flow visual designer allow implementation of smart contracts with greater ease. The resulting smart flow contract has mathematically verifiable auto-generated code, as created by the blockchain translator 430 freeing customers and users from having to worry about the programming language used in any given blockchain protocol. Moreover, the smart flow contract engine implements visual designers that coordinate with the blockchain translator 430 to generate the requisite native code capable of executing on each of the participating nodes of the blockchain, thus further allowing easy processing and verification of the smart contract. According to certain embodiments, each smart flow contract utilizes a mathematical code based verifiable encryption scheme.

Flow designers provide users with a simple, intuitive, web-based interface for designing applications and customized process flows through a GUI based guided flow design experience. The flow designer enables even novice users to create otherwise complex functionality, without necessarily having coding expertise or familiarity with the blockchain.

The GUI manager 410 presents a flow designer GUI 411 interface to a user device via which users may interact with the host organization. The smartflow contract engine 405 in coordination with the GUI manager interprets the various rules, conditions, and operations provided by the user, to generate a smartflow contract which is then translated or written into the target blockchain protocol.

Through the flow designer GUI 411, a user may completely define utilizing visual flow elements how a particular process, event, agreement, contract, purchase, or some other transaction needs to occur, including dependencies, checks, required process inputs and outputs, triggers, etc.

Using the flow designer GUI 411, the user simply drags and drops operational blocks and defines various conditions and "if then else" events, such as if this event occurs, then take this action. As depicted here, there are a variety of user defined smart contract blocks including user defined conditions 421, events to monitor 422, "if" then "else" triggers 423, and asset identifiers 424.

Once the user has completed defining the flow including all of its operational blocks, conditions, triggers and events, the smartflow contract engine takes each of the individual blocks and translates them into a native target blockchain protocol via the blockchain translator 430, and then generates a transaction to write the translated smartflow contract 445 into the blockchain 440 via the blockchain services interface 190.

Once transacted to the blockchain, every participating node with the blockchain will have a copy of the smart contract, and therefore, if any given event occurs, the corresponding trigger or rule or condition will be viewable to all participating nodes, some of which may then take an action based on the event as defined by the smart contract.

The blockchain services interface 190 of the host organization provides customers, users, and subscribers access to different blockchains, some of which are managed by the host organization 110, such as private blockchains, others being public blockchains which are accessible through the host organization 110 which participates as a node on such public blockchains. Regardless, each blockchain utilizes a different blockchain protocol and has varying rules, configurations, and possibly different languages via which interfaces must use to communicate with the respective blockchains. Consequently, the blockchain translator 430 depicted here translates the user defined smart contract blocks into the native or required language and structure of the targeted blockchain 440 onto which the resulting smart contract is to be written or transacted.

Once the smart contract is transacted and broadcast to the blockchain 445 it is executed within the blockchain and its provisions, as set forth by the user defined smart contract blocks, are then carried out and enforced.

According to one embodiment, a salesforce.com visual flow designer is utilized to generate the user defined smart contract blocks which are then translated into a blockchain smart contract. According to other embodiments, different visual flow designers are utilized and the blockchain translator 430 translates the user defined smart contract blocks into a blockchain smart contract.

The resulting native blockchain protocol smart contract elements 435 may be embodied within a code, structure, or language as dictated by the blockchain 440 onto which the smart contract is to be written. For instance, if the smart contract is to be written to Ethereum then the blockchain translator 430 must translate the user defined smart contract blocks into the Ethereum compliant "Solidity" programming language. Solidity is a contract-oriented, high-level language for implementing smart contracts specifically on Ethereum. Influenced by C++, Python and JavaScript, the language is designed to target the Ethereum Virtual Machine (EVM). Smart contract elements include support for voting, crowd funding, blind auctions, multi-signature wallets, as well as many other functions.

Conversely, if the smart contract is to be written to Hyperledger, then the language is different, utilizing the Go programming language which permits use of a distributed ledger blockchain for and smart contracts, among other capabilities.

While smart contracts are beneficial and supported by many blockchain protocols they may be cumbersome to implement to the requirement that they be programmed in differing languages depending on the particular blockchain being targeted. Therefore, not only must users understand programming constructs, but also the particular syntactical nuances of the required programming language for the blockchain protocol in question.

By utilizing the smart flow contract engine 405, even novice users may create compliant smart contracts by generating the smart contract elements with the flow designer and then leveraging the blockchain translator 430 to actually render the native blockchain programming language code embodying the smart contract elements as defined by the user, subsequent to which the blockchain services interface 190 handles the transacting of the smart contract onto the blockchain.

Consider for example a vendor that sells to Home Depot and wants to execute a smart contract with Home Depot which uses Ethereum. The vendor logs in with the host organization, assuming he is an authenticated user and has access to the cloud subscription services, and then accesses the smartflow contract engine 405 through which the user may generate whatever flow he wishes. When done, the user, via the flow designer GUI 411, instructs the blockchain services interface 190 to execute the smart contract, thus causing the smartflow contract engine to translate the user's custom designed smartflow contract into Ethereum compliant "Solidity" code, subsequent to which the smart contract is then written into the blockchain for execution. The vendor need not know how to program or even understand the details of transacting with the blockchain. Rather, the cloud based services accessible through the host organization 110 remove the complexity from the process and present the user with a simple flow designer GUI 411 through which all the necessary operations may thus be carried out.

According to such embodiments, writing the smart contract to the blockchain requires storing metadata defining the smart contract in the blockchain as supported by the particular blockchain protocol. According to one embodiment, when a transaction occurs on the blockchain, having the metadata for the smart contract therein, the smart contract is executed and the various user defined smart contract events, conditions, and operations are then effectuated.

According to certain embodiments, the user defined smart contract, having been translated and transacted onto the blockchain, triggers events within the host organization.

For example, consider that Wal-Mart and Nestle have an agreement that a shipment must be transported within a climate controlled trailer within a range of 35 to 39 degrees Fahrenheit at all times. Moreover, if the temperature exceeds 39 degrees at anytime, then the payment is nullified.

Within the host organization, a Customer Relationship Management (CRM) platform defines and manages the various relationships and interactions between customers, vendors, potential customers. suppliers, etc. The term CRM is usually in reference to a CRM system, which is a tool that helps businesses with contact management, sales management, workflow processes, productivity and so forth.

In the above example with Wal-Mart and Nestle, the CRM system will possess the requirements for the shipment. Because the host organization through the CRM system monitors the shipment and subscribes to shipment events, such as temperature data, the CRM system will monitor for and become aware of a temperature related event for the particular shipment which may then be linked back to the smart contract automatically. More particularly, because the host organization operates as a participating node for the blockchain within which the smart contract is executing, the host organization has visibility to both the smart contract terms and conditions accessible via the blockchain and also the CRM requirements for the shipment, such as the required temperature range.

Therefore, upon the occurrence of a smart contract condition violation, the host organization will synchronize the violation with the CRM system (which is not part of the blockchain) to halt the payment associated with that particular shipment, pursuant to the terms of the executing smart contract.

According to one embodiment, the blockchain sends out an event which the CRM system of the host organization will listen to, and then conduct some substantive action based on the event according to what is specified by the user defined smart contract flow. With the above example, the substantive action being to halt payment for the shipment pursuant to the smart contract on the blockchain.

Each of the participating parties for an executing smart contract will likely have their respective CRM systems subscribed to events of the blockchain associated with the executing smart contract, and therefore, both parties are likely to be aware of the event.

According to one embodiment, logic is written into the CRM system to facilitate a specific action responsive to a blockchain event. Stated differently, non-blockchain actions may be carried out pursuant to an executing blockchain smart contract.

Figure 4B:
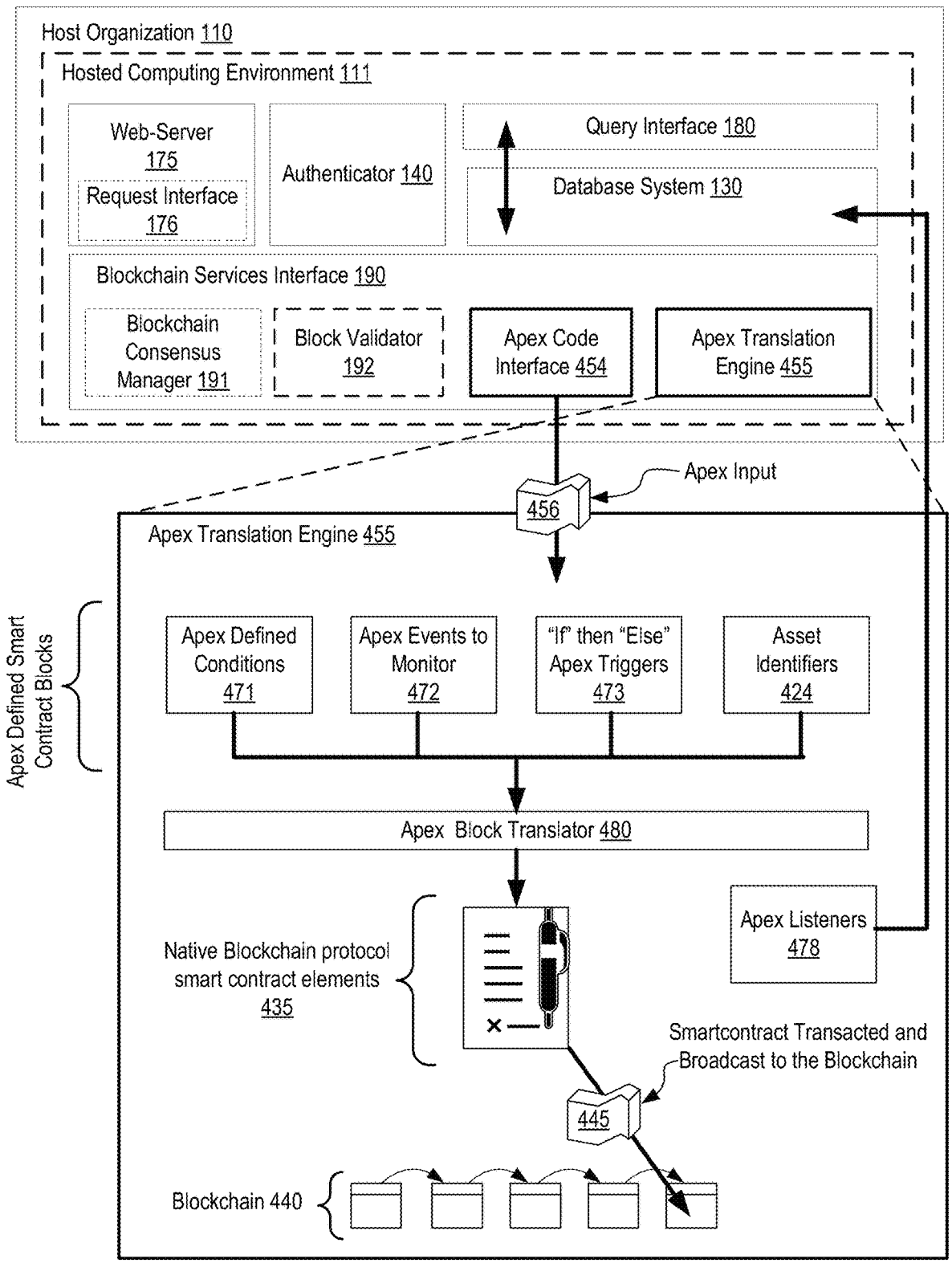
FIG. 4B depicts another exemplary architecture, with additional detail of a blockchain implemented smart contract created utilizing an Apex translation engine, in accordance with described embodiments.

FIG. 4B depicts another exemplary architecture 401, with additional detail of a blockchain implemented smart contract created utilizing an Apex translation engine 455, in accordance with described embodiments.

As depicted here, there is an Apex translation engine 455 within the blockchain services interface 190.

Apex is a programming language provided by the Force.com platform for developers. Apex is similar to Java and C# as it is a strongly typed, object-oriented based language, utilizing a dot-notation and curly-brackets syntax. Apex may be used to execute programmed functions during most processes on the Force.com platform including custom buttons and links, event handlers on record insertion, update, or deletion, via scheduling, or via the custom controllers of Visualforce pages.

Developers of the salesforce.com host organization utilize Apex frequently to implement SQL programming, database interactions, custom events for GUI interfaces, report generation, and a multitude of other functions. Consequently, there is a large community of developers associated with the host organization 110 which are very familiar with Apex and prefer to program in the Apex language rather than having to utilize a less familiar programming language.

Problematically, smart contracts must be written in the native language of the blockchain protocol being targeted for execution of the smart contract on the respective blockchain.

For instance, as noted above, if the smart contract is to be written to Ethereum then the smart contract must be written with the Ethereum compliant "Solidity" programming language.

Like the smart contracts, Apex is a kind of metadata. Therefore, the Apex translation engine 455 permits developers familiar with Apex to program their smart contracts for blockchains utilizing the Apex programming language rather than utilizing the native smart contract protocol programming language.

As depicted here, developers write their smart contracts utilizing the Apex programming language and then provide the Apex input 456 to the Apex translation engine 455 via the depicted Apex code interface, for example, by uploading a text file having the developer's Apex code embedded therein.

The Apex translation engine 455 parses the Apex input 456 to identify the Apex defined smart contract blocks and breaks them out in preparation for translation. As despite here, there are Apex defined conditions 471, Apex events to monitor 472, "if" then "else" Apex triggers 473, and as before, asset identifiers 424 which are not Apex specific.

The Apex defined smart contract blocks are then provided to the Apex block translator 480 which converts them into the native blockchain protocol smart contract elements 435 for the targeted blockchain protocol. Once translated, the process is as described above, in which the translated smart contract is transacted and broadcast 445 to the blockchain 440 for execution 445.

Unlike the visual flow GUI, because Apex is programmatic, users writing Apex code may write programs to execute on a smart contract and are not limited by the available functions within the visual flow GUI.

According to a particular embodiment, the Apex input 456 is first translated into JavaScript and then subsequently translated into a specific blockchain API appropriate for the targeted blockchain protocol upon which the smart contract is to be executed.

According to another embodiment, listening events may be written using the Apex language and provided in the Apex input 456, however, such listening events are to be executed by the host organization. Therefore, the Apex block translator 480 separates out any identified Apex listeners 478 and returns those to the host organization 110 where they may be implemented within the appropriate CRM system or other event monitoring system. In such a way, developers may write the Apex input 456 as a single program and not have to separately create the smart contract and also the related listening events in separate systems.

Figure 5A:
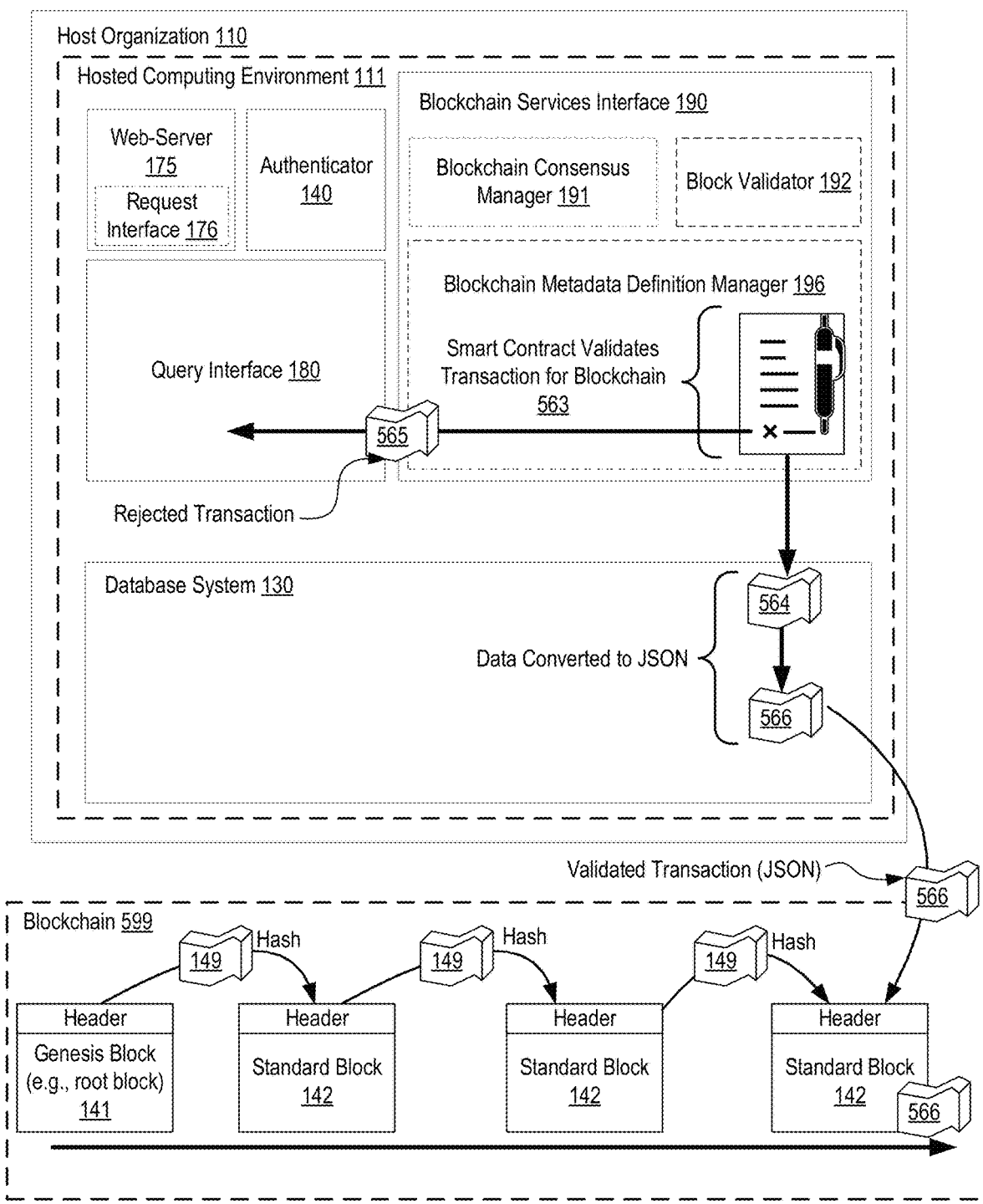
FIG. 5A depicts another exemplary architecture in accordance with described embodiments.

FIG. 5A depicts another exemplary architecture 501 in accordance with described embodiments.

Conventional solutions permit the storage of free-form text within an asset transacted onto the blockchain, for instance, storing such data within a payload portion of the asset, however, because such data is not validated, there is a risk that corrupted or incorrect data is written to the blockchain and later retrieved on the assumption that such data is valid.

By executing a smart contract to perform transaction validation of the entity or asset being transacted onto the blockchain, it is therefore possible to enforce various masks, data structures, data types, data format, or other requirements prior to such data being written to the blockchain 599.

According to such embodiments, the blockchain metadata definition manager 196 executes smart contract validation 563, and if the data to be written to the blockchain is not compliant with the requirements set forth by the executed smart contract, then the transaction is rejected 565, for instance, sending the transaction back to a query interface to inform the originator of the transaction. Otherwise, assuming the transaction is compliant pursuant to smart contract execution, then the transaction is validated 564 and written to the blockchain.

According to one embodiment, the smart contract applies a data mask to validate compliance of the data or metadata to be written to the blockchain. In other embodiments, the smart contract enforces rules which are applied to the data as part of the validation procedure.

According to one embodiment, the smart contract executes as part of a pre-defined smart contract system which executes with any blockchain which permits the use of smart contracts, and the smart contract performs the necessary data validation.

According to one embodiment, the data or metadata to be written to the blockchain 599 is converted to a JSON format to improve storage efficiency. JavaScript Object Notation (JSON) provides an open-standard file format that uses human-readable text to transmit data objects consisting of attribute—value pairs and array data types or any other serializable value. It is a very common data format used for asynchronous browser—server communication, including as a replacement for XML in some AJAX-style systems. Additionally, because JSON is a language-independent data format, it may be validated by the smart contract on a variety of different smart contract execution platforms and blockchain platforms, regardless of the underlying programming language utilized for such platforms.

Thus, as depicted here, data or metadata to be written to the blockchain may be converted into a JSON format 566 (e.g., within database system 130 of the host organization 110) and the validated and converted JSON data is then transacted onto the blockchain.

Figure 5B:
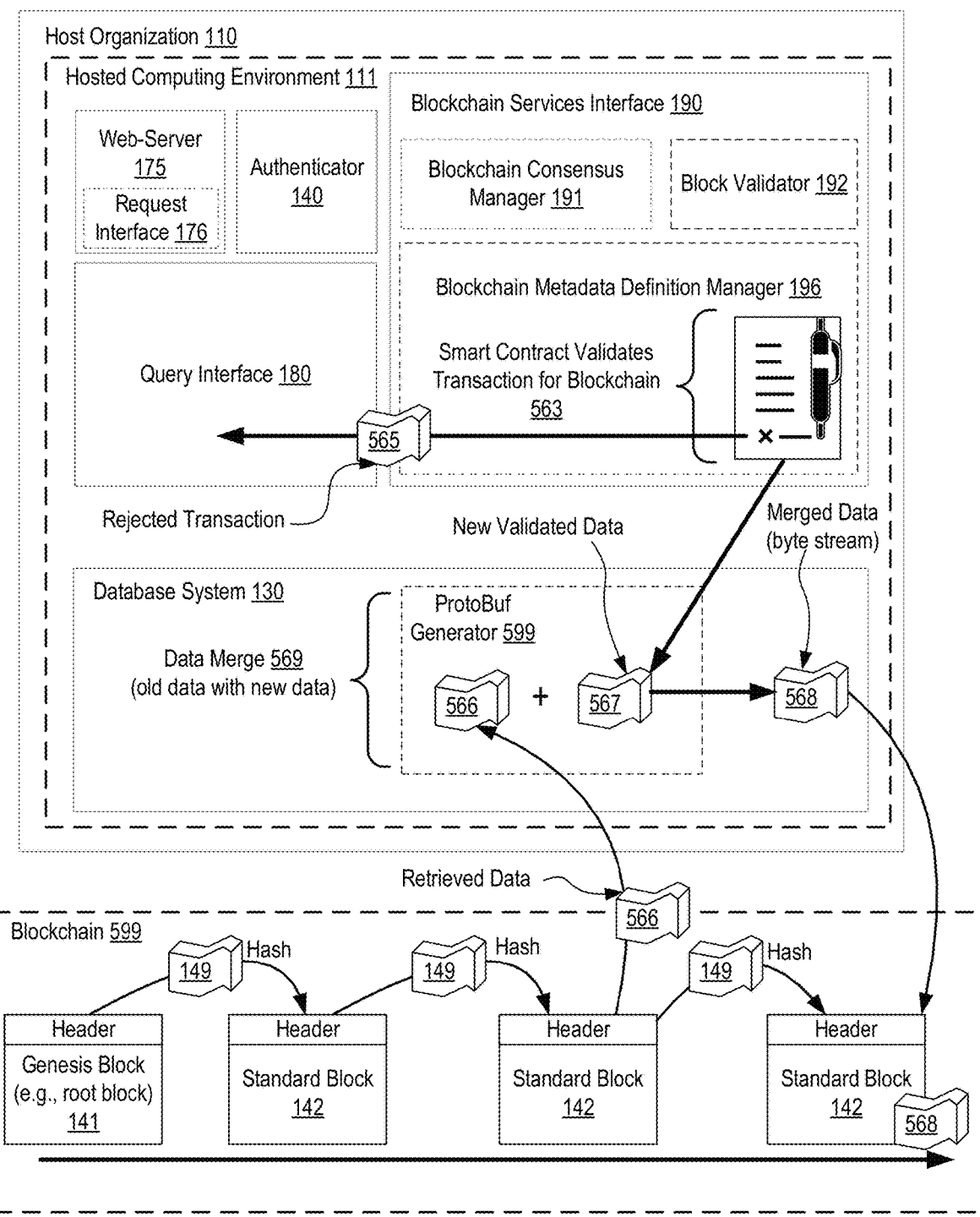
FIG. 5B depicts another exemplary architecture for performing dynamic metadata validation of stored data in accordance with described embodiments.

FIG. 5B depicts another exemplary architecture 502 for performing dynamic metadata validation of stored data in accordance with described embodiments.

According to certain embodiments, it is desirable to improve the efficiency of data stored on the blockchain 599, and therefore, all new transactions having data to be written to the blockchain perform a data merge 569 process prior to writing the new data to the blockchain. This is performed by first retrieving old data, such as a previously written stored record from the blockchain, for instance, pulling retrieved data 566 into the database system 130 of the host organization, and then merging the retrieved data 566 with the new validated data 567 having been checked by the executed smart contract, resulting in merged data 568. The merged data 568 is then written to the blockchain, for instance, by embedding the merged data 568 within a new asset which is added to the blockchain or by updating an existing asset and replacing a payload portion of the existing asset with the merged data 568, thus having an entire updated and validated record stored on one block of the blockchain for more efficient retrieval.

According to one embodiment, the data merge 569 process is performed by a protobuf generator 599 which reduces the total size of the data in addition to merging the retrieved data 566 with the new validated data 567. For example, via performance of a dynamic protobuf generation for the retrieved data 566 with the new validated data 567, the data is made to be extremely small and efficient.

Protocol Buffers (referred to as a protobuf or protobuff) provide a means for serializing structured data, thus converting the retrieved data 566 and the new validated data 567 into a merged serialized byte stream at the protobuf generator 599. This has the added benefit of permitting encryption of the merged data and providing such data in a byte stream format which is easily usable by any other application later retrieving the stored data. The protobuf generator 599 utilizes an interface description language that describes the structure of the data to be stored with a program that generates source code from that description for generating or parsing a stream of bytes that represents the structured data represented by the retrieved data 566 and the new validated data 567.

Such an approach enables the storing and interchanging all kinds of structured information. For instance, a software developer may define the data structures (such as the retrieved data 566 and the new validated data 567) and the protobuf generator 599 then serializes the data into a binary format which is compact, forward- and backward-compatible, but not self-describing (that is to say, there is no way to tell the names, meaning, or full datatypes of fields without an external specification), thus providing a layer of encryption and data security for the stored data.

In such a way, the protobuf generator 599 improves efficiency of network communication and improves interoperability with other languages or systems which may later refer to such data.

Thus, consider the previously described example of the student's stored record with the student's first name, last name, phone number, and student ID.

According to a particular embodiment, processing begins with generating a protobuf of the metadata describing the student record as provided by and defined by the application seeking to store data on the blockchain, thus resulting in protobuffed student record metadata or serialized (e.g., JSON) compliant student record metadata. Next, processing validates the student data within the stored record against the metadata to ensure compliance (e.g., by executing the smart contract) and then processing generates a protobuf of the student data within the stored record resulting in protobuffed student record data. Next, both the protobuffed or serialized metadata describing the student record and the protobuffed or serialized data of the student record is then written to the blockchain. Thus, storing the protobuffed or serialized version of the data results in more efficient storage of such data on the blockchain. According to such embodiments, metadata defined by an application which is used for validation purposes is also stored in its protobuffed or serialized version, thus resulting in efficient storage of protobuffed or serialized metadata on the blockchain.

According to such embodiments, the data merge 569 process includes adding new fields and new data to the stored record which is then re-written to the blockchain 599 with subsequent to dynamically validating the new fields using the metadata.

For instance, according to such embodiments, processing includes taking the retrieved data 566, adding in the new fields, such as adding in a student's newly assigned universal ID (e.g., such as a universally unique identifier (UUID) or a globally unique identifier (GUID) as a 128-bit number used to identify information within the host organization) to the previously stored student's first name, last name, and phone number, so as to generate the merged data 568, subsequent to which processing dynamically validates merged data 568 based on the metadata by executing the smart contract. If the metadata has previously been written to the blockchain then there is no need to update or store the metadata again, which is likely the case for merged data 568 which will constitute an updated record. Thus, only the merged data 568 is written to the blockchain. If the data is new (e.g., not retrieved and not merged) then processing dynamically validates the new data using metadata provided by the application and then stores both the new data and the metadata onto the blockchain.

Metadata, as defined by the application seeking to store the data onto the blockchain, may specify, for example, a student record has three mandatory fields and one optional fields, such as mandatory first name, last name, and student ID, and optionally a student phone number, thus permitting validation of data to be written to the blockchain. The metadata may further define a format, data mask, or restrictions for the data fields, such as names must not have numbers, and the phone number must have a certain number of digits, etc.

Multiple different applications may store data onto the blockchain, with each of the multiple different applications defining different metadata for their respective stored records, and thus permitting the smart contract execution to perform validation of different kinds of data based on the variously defined metadata for the respective applications. For example, a student record with a student name, phone number, UUID will have different metadata requiring different data validation of a credit card record with a credit card number, expiration data, security code, etc. Regardless, the same processing is applied as the dynamically applied metadata validation process is agnostic of the underlying data, so long as such data is in compliance with the defined metadata for the data of the data record to be stored.

Figure 5C:
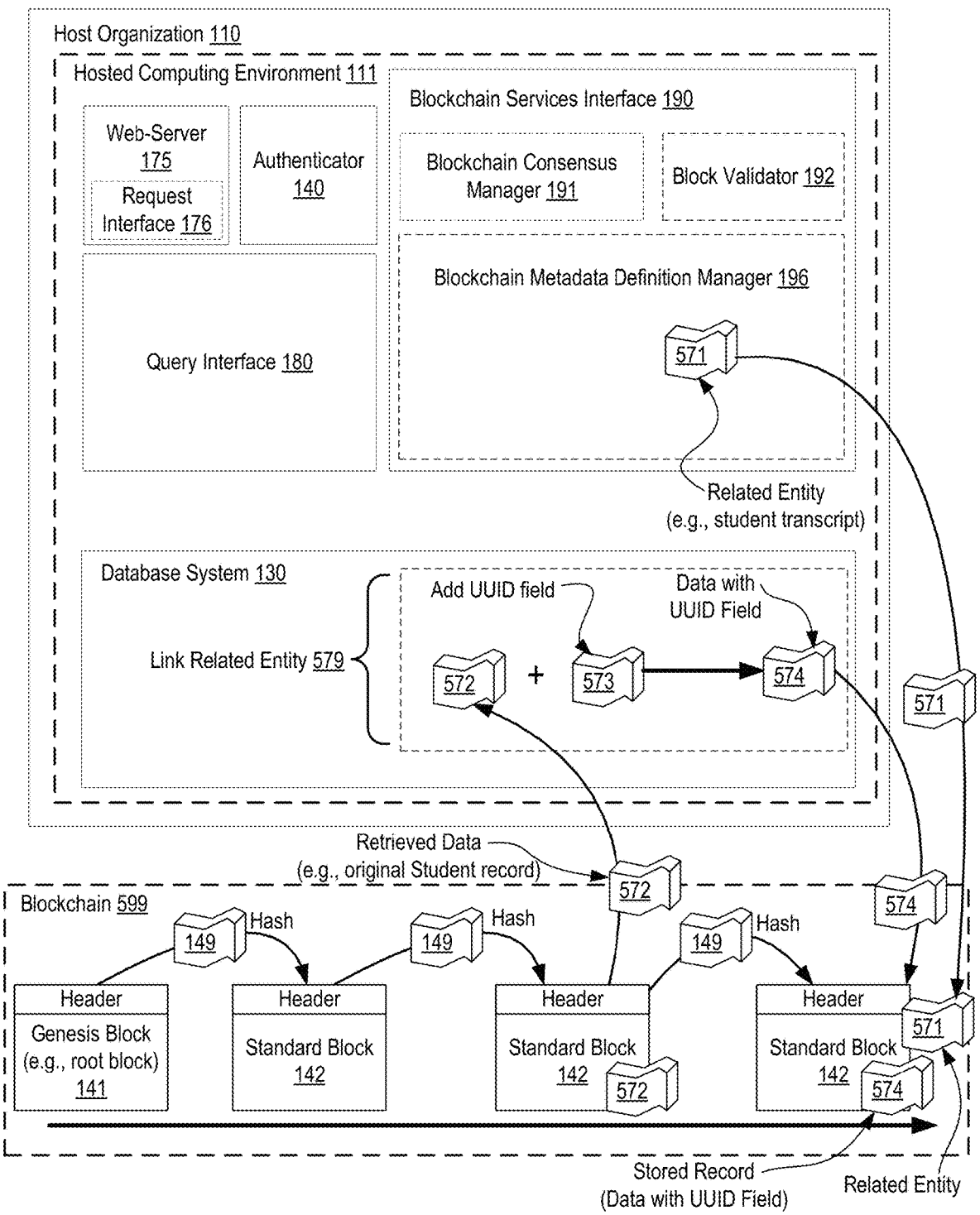
FIG. 5C depicts another exemplary architecture for storing related entities in accordance with described embodiments.

FIG. 5C depicts another exemplary architecture 503 for storing related entities in accordance with described embodiments.

In the example of the saved student record as described above, there was a student record saved to the blockchain having, for example, a student first name, student last name, student phone number, and a student ID. Also stored was metadata defined by an application seeking to store the student record, with such metadata being utilized for dynamic validation of the student record.

According to further embodiments, related entities are stored on the blockchain and linked with the previously stored record. Consider for example, a stored student record on the blockchain for which a new student transcript is provided.

As depicted here, a link related entity 579 process is performed in which retrieved data 572 is modified to add a UUID field 573 identifying the related entity, providing a link between the related entity 571 and the data record previously stored on the blockchain and retrieved 572 for modification. This results now in data with the UUID field 574, which has not yet been stored. Next, the data with the UUID field 574 linking and identifying the new related entity 571 is then written to and stored within the blockchain, resulting in the stored record now having the original data of the stored record, but also a UUID field 574 linking to and identifying the new related entity. Next, the related entity 571 is written to the blockchain as metadata with the same UUID data field, thus permitting subsequent retrieval of the related entity 571 from the blockchain by first referencing the UUID within the stored record and then retrieving the linked related entity 571 stored within the blockchain as metadata.

Thus, if a student record defines the student's name, phone number, and student ID, then a transcript for the student may be stored as metadata on the blockchain. A new UUID is automatically generated for the transcript to be stored and then within the student record, a related entity field within the student record is updated to store the new UUID generated for the transcript, thus linking the student record updated with the related entity field identifying the UUID for the transcript with the separately stored transcript which is written to the blockchain as stored metadata. In such a way, any number of related entities may be added to the blockchain, each being stored as metadata within the blockchain and linked to another stored record via the data field for the related entity. Multiple related entity fields may be added to any record, each using a different UUID to link to and identify the related entity in question. For instance, if the student has a transcript and also medical records, each are separately saved to the blockchain as metadata, each identified separately by a unique UUID, and each UUID being updated within the student's stored record as separate related entity fields. As before, the updated record with the related entity field identifying the UUID for the separately stored related entity may be stored in its protobuffed or serialized version.

FIG. 6A depicts another exemplary architecture 601 for retrieving stored records from addressable blocks using an indexing scheme, in accordance with described embodiments.

Use of the Merkle tree index 616 or a Merkle DAG tree index permits retrieval of stored records from the blockchain by going to a particular block of the blockchain based on the Merkle tree index, thus permitting retrieval of a stored record in a more efficient manner. For instance, the Merkle tree index identifies an address for one of many addressable blocks on the blockchain, then retrieval of the stored record negates the need to traverse the blockchain looking for the stored record in question and instead permits the retrieval of the stored record directly from the block identified by the Merkle tree index.

Thus, as depicted here, processing performs a query 651 to the index 616 to identify an address for the desired data, subsequent to which a query to a specific block 617 is performed to retrieve the stored data at the addressable block based on the address without having to traverse the blockchain or traverse the tree to find the data as the data is stored at an addressable block 618.

According to certain embodiments, the index 616 is stored within the blockchain 699 as an entity, for instance, the index may be stored as an asset on the blockchain. Additionally, by storing the stored records within a Merkle tree index 616 which itself is stored onto the blockchain, it is possible to retrieve any data from the index 616 by going to a particular block with an index. Thus, if the index is known, it is not necessary to query 651 the index 616 for the address, but instead, go directly to a node for a known address within the index and receiving back anything at that node. If the address points to a leaf within the index 616 then the data stored within the leaf is returned based on a direct query to that address within the index 616. If the address points to a node having a sub-tree beneath it, such as additional nodes or simply multiple leafs, then the entire sub-tree is returned. For instance, if the address ABC is used, then the entire node having hash ABC is returned, including the three leafs beneath that node, including the leaf having hash A, the leaf having hash B, and the leaf having hash C.

If the index 616 stores addressing information for specific blocks within the blockchain, then based on the returned addressing information, the specific block of the blockchain may be checked to retrieve the stored record to be retrieved. Alternatively, if the addressing is stored within the index 616 along with the latest information of the stored record, then going to the index 616 using an address will return both the addressing information for a block on the blockchain where the stored record is located as well as returning the latest information of that stored record, thus negating the need to query the blockchain further.

Figure 6B:
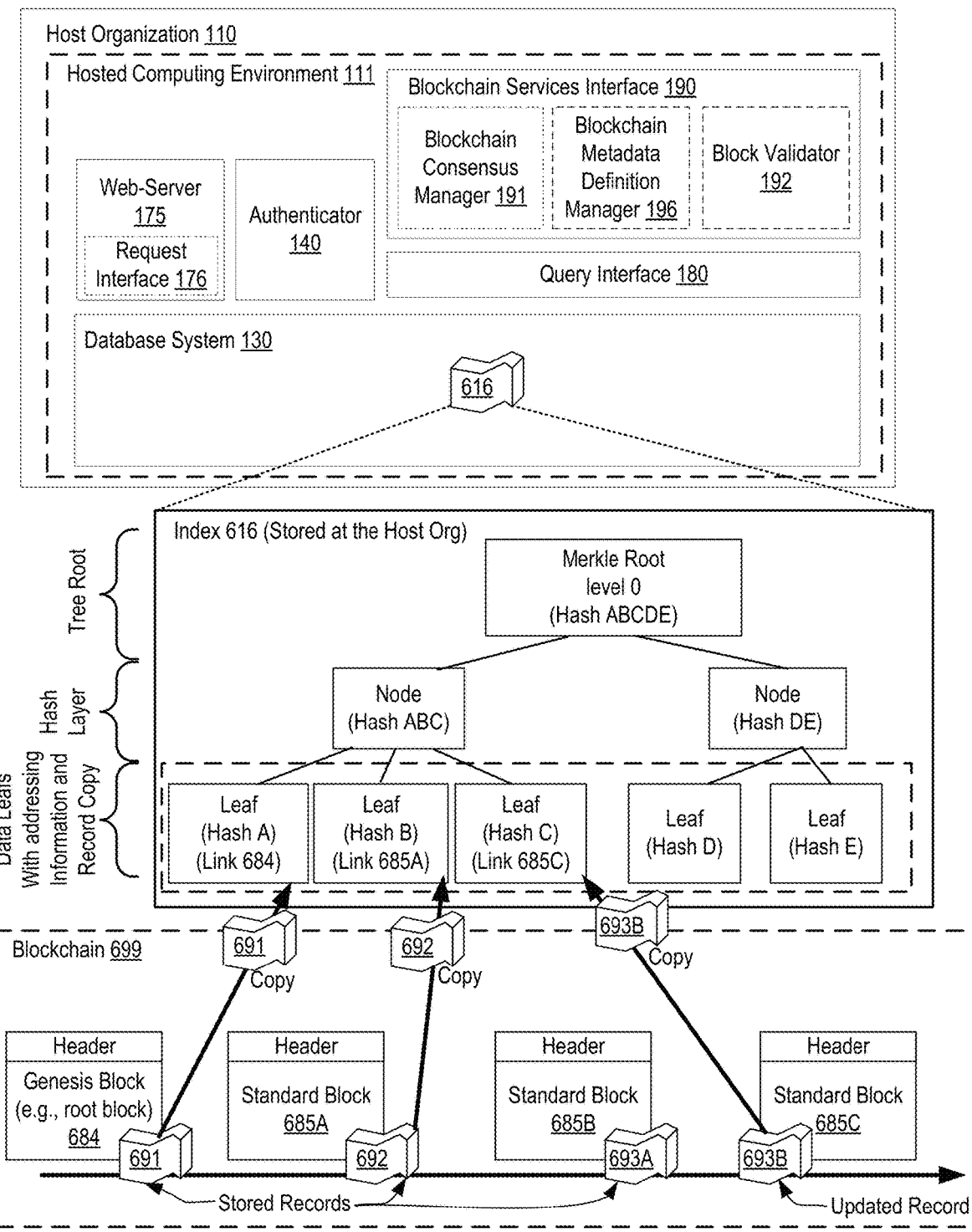
FIG. 6B depicts another exemplary architecture for building an index from records in the blockchain and maintaining the index, in accordance with described embodiments.

FIG. 6B depicts another exemplary architecture 602 for building an index from records in the blockchain and maintaining the index, in accordance with described embodiments.

According to a particular embodiment, it is desirable to enable extremely fast access to the data records stored within the blockchain through the use of the index 616. As noted above, the index 616 may store only an address of an addressable block on the blockchain within which the underlying stored record is kept, thus permitting retrieval of the record from the blockchain using the address retrieved from the index 616. Alternatively, both the latest information, that is to say, the up to date and current version of a particular record stored by the blockchain may be stored within the index along with the addressable block of the blockchain where the underlying stored record is kept by the blockchain. To be clear, this results in duplicative records being persisted. A latest and current version of a record is kept within the blockchain, considered as the authoritative record, however, for the sake of improving query speeds, a second copy of the same record is kept within the index 616 along with the address on the blockchain of where the authoritative version of that record is maintained.

According to such an embodiment, an index 616 may therefore be built or generated by the host organization by referring to the underlying stored records within the blockchain.

As shown here, within the blockchain 699 there are multiple stored records at different addressable blocks of the blockchain. Stored record 691 is located at the root block 684. Stored record 692 located at block 685A, stored record 693A located at 685B, and finally an updated record 693B is stored at block 685C, with the updated record depreciating previously store record 693A as no longer current.

Any of these stored records may be retrieved from the blockchain by walking or traversing the blockchain searching for the relevant record, locating the relevant record, and then retrieving the stored record from the located block.

Building the index 616 improves the retrieval efficiency of this process by providing at least the address for the block within the blockchain where the stored record is kept. As described above, an index 616 with such addressing information may be checked, returning the addressable block of the blockchain for the stored record, and then the stored record may be retrieved from the blockchain without having to traverse or walk multiple blocks of the blockchain. For example the index 616 may be checked for the location of updated record 693B, with the index returning the location of addressable blockchain block 685C, and then block 685C may be queried directly to retrieve the latest and most current version of the authoritative stored record which is updated record 693B at standard block 685C.

Alternatively, both the contents or the data of updated record 693B and the location of addressable blockchain block 685C identifying where the most current version of the authoritative stored record 693B is kept may be persisted within the index 616, thus wholly negating the need to retrieve anything from the blockchain. While this results in an additional copy of the updated record 693B being stored within the index 616, the speed with which the data of the updated record 693B may be retrieved is vastly improved. This is especially true where the index 616 itself is stored within the host organization rather than being written to the blockchain. In such an embodiment, the index 616 is checked within the host organization 110 and both the location of the stored record is returned as well as the contents or the data of the stored record, with such data corresponding to the copy of the data from the stored record in the blockchain being returned from the index 616 stored at the host organization. Thus, the application receiving such information is subsequently checked to validate the information stored within the blockchain by retrieving the stored record from the blockchain using the location for the stored record within the blockchain as returned by the index 616 or the application may simply utilize the copy of the data returned from the index 616 itself, depending on the data consistency requirements and concerns of that particular application.

Thus, as may be observed here, the data leafs of the index 616 now include not just addressing information providing the location of the block in question within the blockchain, but additionally persist a copy of the stored record within the blockchain, thus providing duplicative locations from which to retrieve such data. One copy of the stored records is retrievable from the blockchain itself, but a copy of the stored record in the blockchain is also retrievable from the index 616.

As depicted here, the leaf hash A now has a link to location 684, thus providing the location or addressing information for block 684 on the blockchain 699 where stored record 691 is persisted. However, leaf hash A additionally now has a copy of stored record 691 which is persisted within the index 616 itself, thus permitting retrieval of the data or contents from stored record 618 directly from the index 616 stored on the host organization without necessarily having to retrieve the stored record from the blockchain, despite the blockchain having the authoritative copy of the stored record 691. By identifying the records to be indexed (e.g., all student records for example) and then searching for and retrieving those records from the blockchain and recording the location of those records within the index 616 along with a copy of the stored records retrieved, such an index 616 may be built and utilized for very fast retrieval of the record contents. Further depicted is leaf hash B having a link to the blockchain block location 685A along with a copy of stored record 692 located within the index 616 and because stored records 693A was updated and thus deprecated by stored record 693B, the leaf hash C is built with a link to blockchain block location 685C along with a copy of the stored record 693B from the blockchain to be persisted within the index 616 stored at the host organization 110 (e.g., within the database system 130 of the host organization 110). In alternative embodiments where the index 616 is saved within the blockchain retrieval efficiency is still improved as only the index 616 needs to be retrieved, which will have within it the duplicative copies of the stored records as described above.

The index 616 may then be searched much more quickly than searching the blockchain or in the event the hash or address is known for a leaf or node within the index 616, then the address may be utilized to go directly to the leaf or node within the index 616 from which all contents may thus be retrieved. For instance, is the address or hash points to a leaf, then the location information for the addressable block within the blockchain will be returned along with the persisted duplicate copy of the stored record at that blockchain location. If the address or hash points to a node with sub-nodes or multiple leafs beneath it, then the entire sub-tree will be returned, thus providing the contents of multiple records within the respective leafs (end-points) of the sub-tree returned.

Figure 6C:
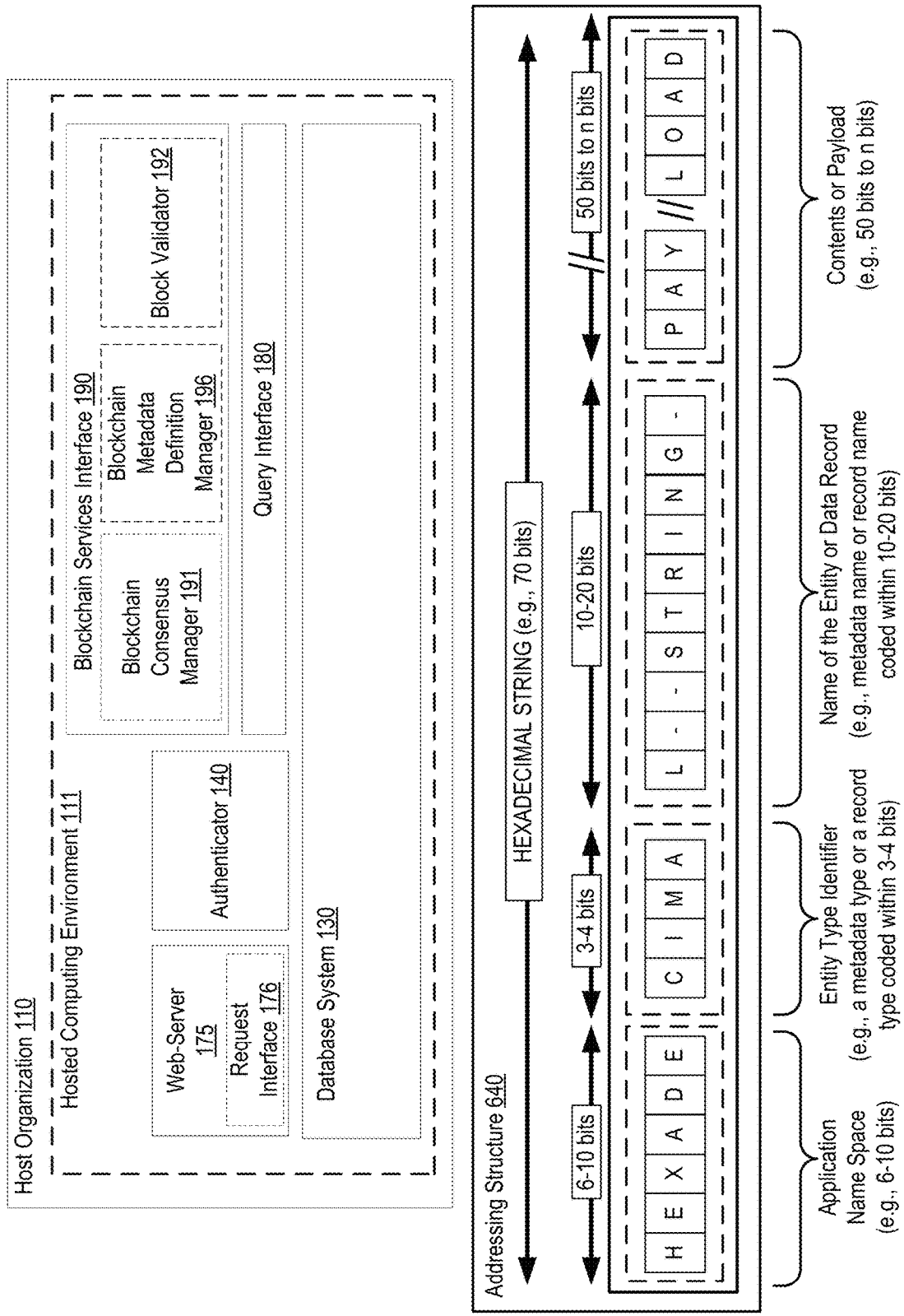
FIG. 6C depicts another exemplary architecture for utilizing an addressing structure to form an address for retrieving information from the index, in accordance with described embodiments.

FIG. 6C depicts another exemplary architecture 603 for utilizing an addressing structure to form an address for retrieving information from the index, in accordance with described embodiments.

Structuring of the addresses within the Merkle tree index permits very fast access to the specific node or leaf within which the location information for the stored records within the blocks on the blockchain is provided as well as, according to certain embodiments, a copy of the stored record. Without the structured address, it is necessary to begin at the root of the Merkle tree index 616 and then step through each level until the desired node or leaf is found. While this traversal of an index 616 is faster than walking or traversing the blocks of the blockchain, even faster access is realized by referring directly to a single leaf or a node (and thus it's sub-nodes or leafs) via a structured address as depicted via the addressing structure 640 shown here.

Specifically depicted here is an addressing data structure 640 for the indexing scheme utilizing the Merkle tree index 616 which is broken into four primary components which make up a hexadecimal string. The first portion provides an application namespace of an exemplary 6-10 bits (though the size may differ) in which a specific application may be coded. For instance, the student records discussed above may be defined by and utilized in conjunction with a student record look-up API or interface coded as "SLDB" (e.g., Student Lookup DataBase) which converts to hex "534c4442." This application namespace field is then followed by an entity type identifier of an exemplary 3-4 bits (though the size may differ) to identify the type or kind of information stored, such as a stored record or a metadata entity or a related entity stored as metadata, etc. For example, the information may be the contents of a student record which may be coded as SR which converts to hex "5352" or the information may be metadata defining a student record which may be coded as MD which converts to hex "4d44" or the information may be a related entity. Certain related entities are stored as metadata with the same type identifier (e.g., MD/4d44) or alternatively may be stored as metadata with a unique entity type identifier, such as being coded RE for a related entity which converts to hex "5245."

Next, within the addressing structure 640 is the name of the entity or data record of an exemplary 10-20 bits (though the size may differ) to specify what is being stored (not the contents, but the name of the stored information). Thus, metadata defining a student record may be coded as SRAMD (e.g., for Student Record Application MetaData) which converts to hex "5352414d4420" or the stored information may be the student record itself, thus being named STUDREC (e.g., for Student Record) which converts to hex "5354554452454320" or perhaps the stored information is a related entity within which there is stored a student's transcript named TRNSCRPT which converts to hex "54524e534352505420" or the stored information may be a stored a student's medical records named MEDREC which converts to hex "4d454452454320" information may be a related entity. Any extra space for the respective portions of the addressing structure may be padded with leading zeros depending on the application's use and means of parsing such data.

Lastly, there is a contents or payload portion of the addressing structure having therein the actual information to be stored, such as the contents of a stored record (e.g., the values making up a student's record), or metadata defining a record (e.g., the metadata by which to define, validate, structure, mask, or type the actual stored contents. Similarly, there may be stored within the payload or contents portion of the addressing structure 640, metadata identifying a related entity via a linked UUID which corresponds to a UUID field within a stored record (e.g. a student record may include a related entity field with a UUID for a student's transcript, thus linking the student's record with the student's separately stored transcript within a related entity metadata stored asset on the blockchain).

Within the payload or contents portion of the addressing structure 640, the application developer utilizing the indexing scheme has nearly unlimited flexibility of what may be stored, up to the size limits imposed, such as a 70 bit total limit for an extremely small, efficient, albeit restrictive addressing structure 640 up to n bits (e.g., hundreds or thousands depending on the use case) within which significantly more information may be stored.

Because the information is stored as a hexadecimal string, the information may easily be protobuffed, serialized, encrypted, and decrypted as well as every efficiently transmitted across networks and utilized by heterogeneous applications without regard to any specialized formats.

FIG. 6D depicts another exemplary architecture 604 for utilizing an address to retrieve information from the index, in accordance with described embodiments.

As depicted here, the query interface 180 provides an address 653 via which to perform a query 652 against the index using the address, thus permitting direct retrieval from the index 616 of either a leaf or a sub-tree of the index 616 depending on what retrieved data is queried for via the address. Note that retrieved contents 654 are fetched via a specified address.

Consider a query 652 against the index 616 address using the indexing scheme and address structure from the example above.

For example, the application namespace for a student record look-up API or interface is coded as "SLDB" (e.g., Student Lookup DataBase) which converts to hex "534c4442" followed by the type or kind of information stored coded as MD (for metadata) which converts to hex "4d44" followed by metadata defining a student record coded as SRAMD which converts to hex "5352414d4420."

This results in an address of 534c4442+4d44+5352414d4420 or 534c44424d445352414d4420. It is not necessary to define the address for the contents or payload since this is the data being retrieved, however, such data may be written to the index using the above address concatenated with the hexadecimal representation of the contents or payload.

Nevertheless, querying against the index 616 using the address 534c4442+4d44+5352414d4420 provides a fully qualified address down to a leaf in the Merkle tree index having therein the payload or contents to be retrieved, which in this case is the metadata for an application called "SLDB" (e.g., Student Lookup DataBase) which defines the coding of student records for that application.

Similarly, if a student record is to be retrieved, then querying the index 616 using the address 534c4442 (for the Student Lookup DataBase)+5352 (for SR or a Student Record)+5354554452454320 provides a fully qualified address down to a leaf in the Merkle tree index having therein the student record payload or contents to be retrieved, which in this case is the student record information for the application called "SLDB" (e.g., Student Lookup DataBase) which is defined by the metadata retrieved above. If the student's UUID or student ID is utilized as a leading portion of the stored student record payload, then the address may be further qualified to retrieve a specific record's contents only for that particular student.

Another benefit of such an indexing scheme is the ability to query for information using a non-fully-qualified address or a partial address. For example, continuing with the above example, the developer may trigger the index to return all the metadata for their specific application by submitting a partial address to the index 616 for direct retrieval by specifying their address and the entity type identifier for their metadata. Thus, such a partial address forms the hex string for the application namespace portion corresponding to the "SLDB" (e.g., Student Lookup DataBase) which converts to hex "534c4442" followed by the type or kind of information stored coded as MD (for metadata) which converts to hex "4d44," thus resulting in 534c4442+4d44 or simply 534c44424d44.

Querying the index 616 for direct retrieval using this partial address will cause the index to return all metadata for the "SLDB" (e.g., Student Lookup DataBase) application, regardless of what such metadata is named or how many leafs or sub-trees are consumed to store such data. More particularly, querying the index 616 using the partial address will return an entire sub-tree below the node of the Merkle tree index hashed with the hex string 534c4442+4d44. Similarly, all student records may be retrieved (via an entire sub-tree being returned) by specifying a partial address for direct retrieval, such as specifying to the query of the index 616 the address 534c4442 (for the Student Lookup DataBase)+5352 (for SR or a Student Record) without any specifically named student records.

In the event the contents or payload information in the index includes both the location information for the stored record within the blockchain as well as the contents of the stored record copied from the blockchain into the index 616, then it is not necessary to retrieve anything further from the blockchain. If only the location information of the contents within a specified block of the blockchain is provided (thus resulting in a much smaller storage volume and faster retrieval due to a smaller index) then the blockchain services interface 190 will subsequently utilize the location information to fetch the contents of the stored record directly from the specified block on the blockchain without having to traverse or walk multiple blocks of the blockchain in search of the specified stored record.

Figure 6E:
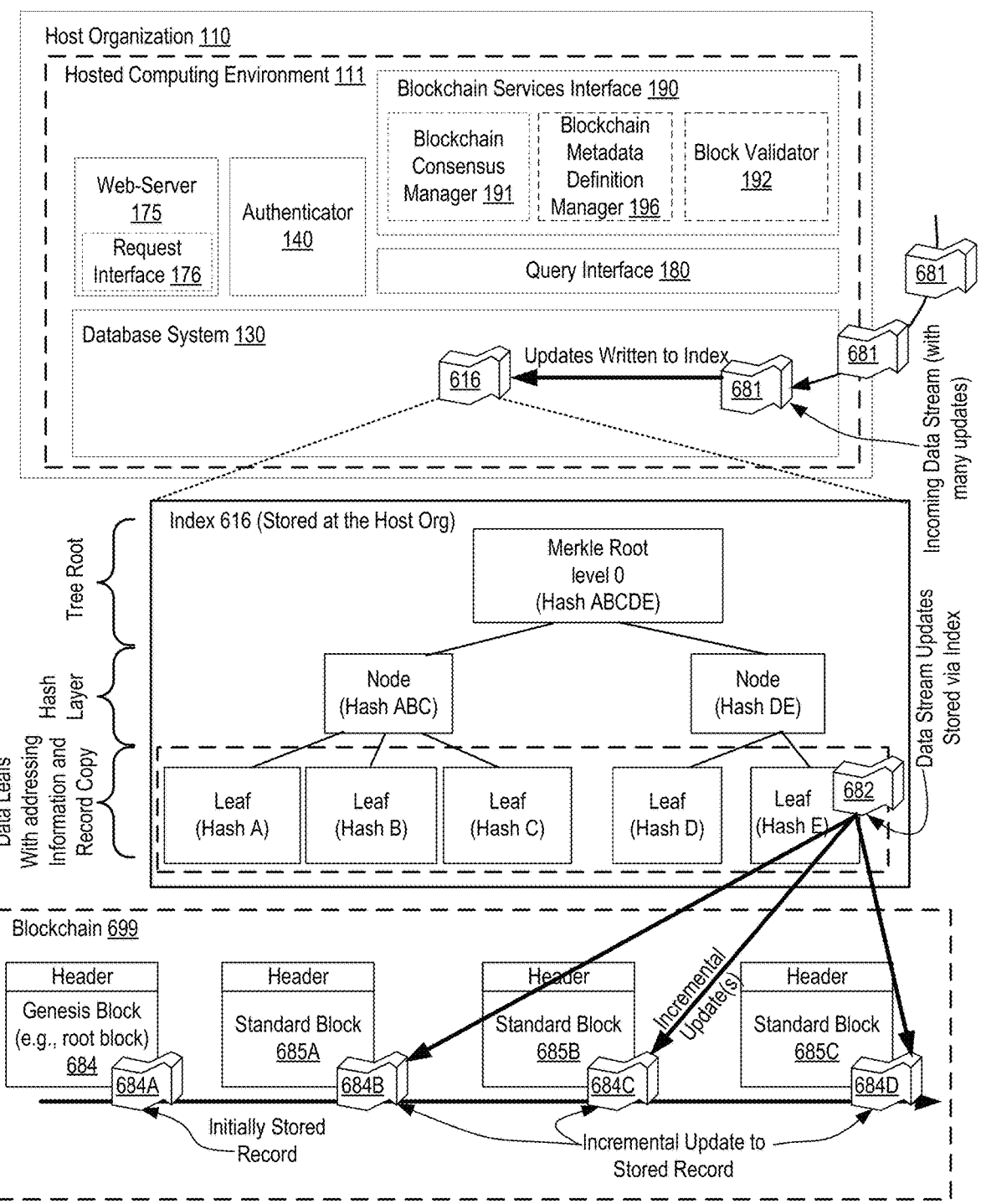
FIG. 6E depicts another exemplary architecture for incrementally updating a blockchain asset for stored records using an index to store current updates, in accordance with described embodiments.

FIG. 6E depicts another exemplary architecture 605 for incrementally updating a blockchain asset for stored records using an index to store current updates, in accordance with described embodiments.

In certain situations, it is desirable to store information within the blockchain, however, the volume and frequency of information updates for the stored records render use of the blockchain impractical given that blockchain storage is very poorly suited for information storage with many updates at a high frequency.

As shown here, an incoming data stream 681 with many updates is received at the host organization and the updates are written into the index 616 resulting in the data stream updates being stored via the index as shown at element 682. Periodically, incremental updates are then written into the blockchain by, for example, transacting with the blockchain to add a new asset having the stored record(s) with the incremental updates taken from the index 616 and pushed into the blockchain as stored records. For example, stored record 684A is initially stored on the blockchain 699 with an initial batch of data from the data stream. Next, more data stream updates are written first to the index 616 at the host organization and after a period of time, the incremental updates are then again written to the blockchain, resulting in repetitive incremental updates shown here as incremental update 684B, then incremental update 684C, and then incremental update 684D, and so on.

Consider for example the storage of an information stream from IoT devices (Internet of Things) devices which are reporting various telemetry data such as status, errors, location, events, configuration changes, etc. If the collection of such data scales to a large group of IoT devices in the hundreds the blockchain may be overwhelmed due to the frequency of data storage requests.

However, storing the information within the index 616, especially when the index is stored within the host organization, overcomes this problem as the database system 130 of the host organization easily accommodates a high frequency of database updates and interactions.

Therefore, in the event it is nevertheless desired to make such data available on the blockchain and to be stored upon the blockchain, then the frequency problem may be overcome by first writing the many updates (e.g., from the IoT devices or other such updates) directly into the index 616 within the host organization 110 and then periodically writing incremental updates to the blockchain for persistent storage of the data within the blockchain. For example, IoT device data streams may be collected by the host organization 110 into the index and then once every 24 hours (or some other period) the incremental update to the IoT device data stream (measured from the last update to the blockchain to the currently available data) is then pushed, flushed, added, or transacted onto the blockchain. Thus, the latest block of the blockchain then persistently stores the latest portion of the IoT device data stream and thus be accessible directly from the blockchain or alternatively available from the index 616 at the host organization.

In certain embodiments, the index purges or flushes the incremental data by storing the incremental update to the blockchain and then the index removes the stored contents or payload portion from the index 616 and retains only the block location information on the blockchain via which to locate the underlying stored records. Stated differently, once the incremental information is written to the blockchain, the index 616 may be cleaned up such that it retains where to locate the stored records having the incremental information on a specific block of the blockchain, but the index 616 itself no longer retains the contents of such stored records as they are available within the blockchain and because such data, which grows very quickly, may slow the index in an undesirable manner.

Pushing the whole change (e.g., all of the IoT data stream ever collected) to the blockchain in its entirety is problematic as all data prior to the incremental update is replicated over and over again within the blockchain. Thus, pushing only the incremental changes or updates to the blockchain provides efficient use of the blockchain for purposes of storage and efficient use of the index 616 by which to buffer the incoming data stream or incoming high frequency updates as well as via which the index 616 permits fast identification of location information indicating where the incremental information is stored (e.g., within which block) on the blockchain.

Figure 7A:
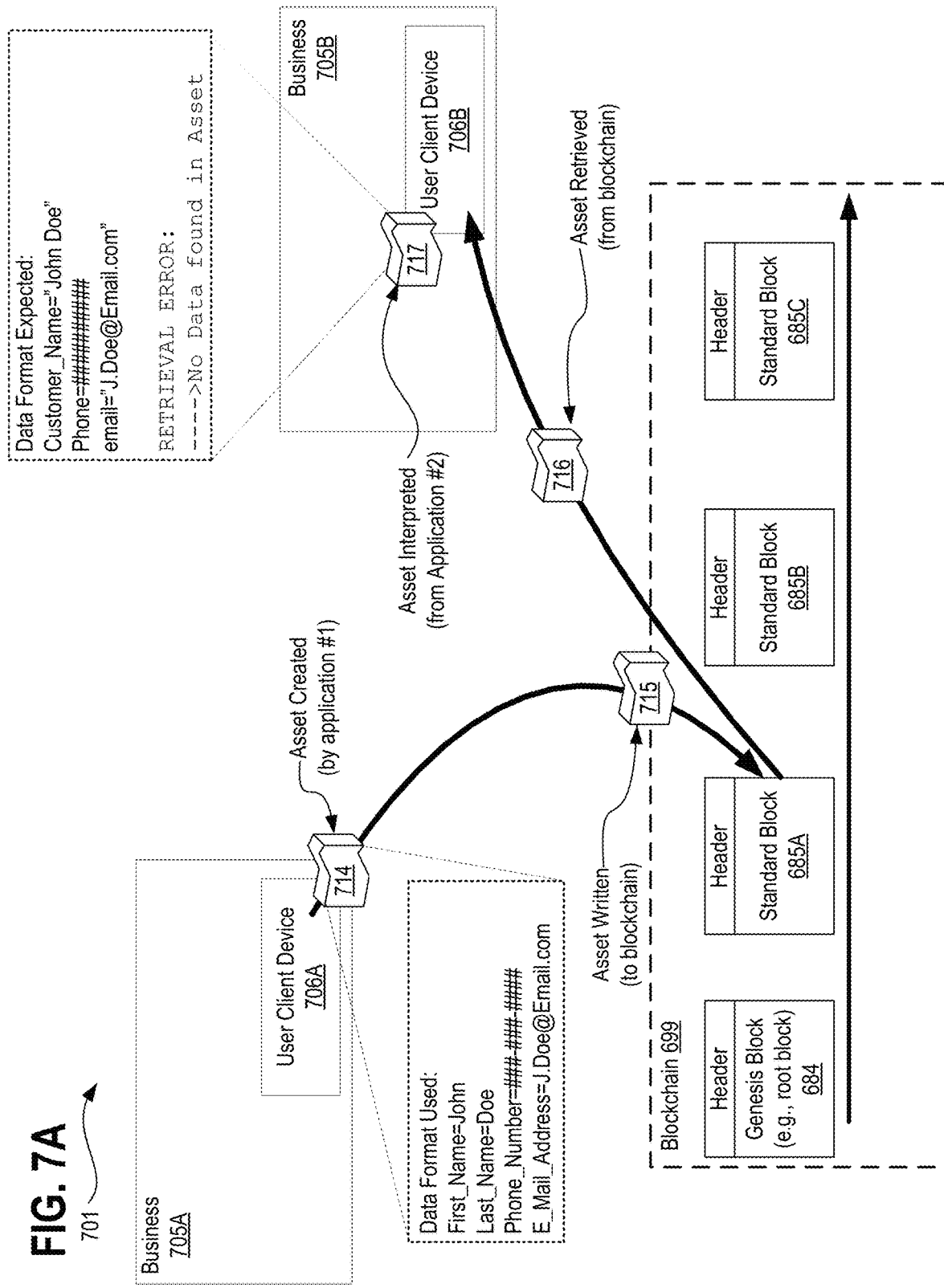
FIG. 7A depicts another exemplary architecture in accordance with described embodiments.

FIG. 7A depicts another exemplary architecture 701 in accordance with described embodiments.

Many customer organizations and businesses operate in a network-centric manner as they are obligated by the marketplace to solve customer problems. Therefore, it becomes necessary for businesses, including sometimes unrelated business organizations, to share data amongst one another on behalf of their customers.

Understandably, however, different businesses have a fundamental lack of trust in one another. Thus, many businesses find themselves in a situation today where they need to share data to satisfy their customers, and yet, they cannot trust that the other businesses with whom they share data can be trusted.

Distributed Ledger Technology and blockchain platforms specifically solve the issue of trust as is described above. This is true because data written onto the blockchain is immutable insomuch that updates may be provided, but the historical data is always accessible, and further still, all participating nodes for the blockchain cooperatively contribute to consensus based upon an agreed consensus model. The exception to this is the modified DLT technology discussed above for which a shared ledger (e.g., element 157 at FIG. 1C, et seq.) is hosted internally to a host organization and for which the host organization operates as the single and centralized trust authority, or alternatively for which trust determination is delegated to a customer organization operating a modified DLT shared ledger instance 157, pursuant to which the customer organization then determines for themselves who has access rights, such as what partner organizations or users, etc., have consent from the customer organization to access data in the modified DLT shared ledger.

Therefore, utilization of DLT technologies and blockchain technology specifically is considered to solve the issue of trust amongst businesses wishing to share data.

Notwithstanding the issue of trust having been largely solved, there remains two further obstacles which prevent adoption of the technology.

Firstly, adoption of blockchain is technologically complex and exceedingly difficult for most business to implement on their own. Even a technical evaluation of such data requires specialized computer programmers and developers having adequate skill in this particular area of expertise coupled with an understanding for the needs of the business, often provided by a technical business analyst, and then the procurement of additional computing infrastructure and either the development of a blockchain platform and protocol themselves or the identification and then participation with an existing public or private blockchain that meets the needs of the business. These developers must understand how to package and transact assets (sometimes called "coins") onto the blockchain and how to transfer those assets, within which their information of interest is embedded, between nodes and make such data available to other participating nodes on the blockchain, such that the information may be shared. Further still, there needs to be a consensus model by such a blockchain which is acceptable to the business. For these reasons alone, adoption of blockchain technologies, though promising, remains an insurmountable burden for many businesses.

Secondly, even assuming the above mentioned obstacles are overcome, there remains a significant problem with data standardization across applications for information which is written to, stored within, or persisted by the blockchain. For instance, even assuming a business manages to transact information to the blockchain and make that data accessible to another business, there simply is no guarantee whatsoever that the information written to the blockchain by a first business will be understandable by a second business. Therefore, the transportability of data amongst businesses wishing to share data presents another significant problem, due to the lack of standardization of data written onto the variously available blockchain platforms.

Consider the exemplary depiction shown here at FIG. 7, in which there are two businesses 705A and 705B, which have managed to agree to share data with one another and have successfully implemented the necessary computing architecture to transact with a blockchain 699.

With all data sharing agreements in place, business 705A creates an asset via its application #1 executing at the user client device 706A, and as depicted, embeds a customer record into that asset 714 which is to then be transacted onto the blockchain 699. As shown here, application #1 creates the asset with the following information:
Data Format Used:
First_Name=John
Last_Name=Doe
Phone_Number=###-###-####
E_Mail_Address=J.Doe@Email.com Notably, for this record, there are four fields, including "First_Name" and "Last_Name" followed by "Phone_Number" which has a particular format mask used as well in which there are hyphens "-" required in between certain digits, and finally an email address which has a field identifier of "E_Mail_Address."

Each of the various fields are then populated with data.

The created asset is then transacted onto the blockchain 699 as depicted by the asset written 715 onto the blockchain and at some later time, business 705B elects to retrieve the information via its own application #2.

As shown here, business 705B transacts with the blockchain and the asset retrieved 716 is successfully transmitted to the application #2 executing at user client device 706B.

All seems well, until the application #2 utilizes its own understanding of the data to interpret the asset 717 via the code executing at application #2, which expects the following information:
Data Format Expected:
Customer_Name="John Doe"
Phone=##########
email="J.Doe@Email.com"
RETRIEVAL ERROR:
→No Data Found in Asset As might be expected, application #2 encounters a retrieval error message: "No Data found in Asset."

This is the result when application #2 looks for a field named "Customer_Name" and yet there is no such field. Application #2 additionally looks for the field "Phone" and finds no such field, and finally searches for "email" and again finds no such field.

While a human reader may readily understand that "First_Name" with the value "John" represents a sub-portion of the field "Customer_Name," such logic simply is not available within applications and computing programs which simply search for the field name that they are instructed (e.g., programmed) to search for, which is "Customer_Name" and not a combination of "First_Name" and "Last_Name."

While such a conversion between the two field types would be trivial for any programmer, the fact remains that the two applications by each of the respective businesses are simply incompatible, and if they are to be made compatible, then custom translation for these fields needs to be programmed.

Fundamentally, the non-transferability of this date is due to a lack of data standardization. The two distinct application entities each are enabled to write to the blockchain and retrieve from it, and an agreement is in place between the businesses to share such data, and yet, the two entity applications lack the ability to share the data because there is no definition of what constitutes a customer's name. One application expects this to be a combination of "First_Name" and "Last_Name" fields whereas another application expects the field "Customer_Name" to be utilized as a single field for the customer's full name.

Figure 7B:
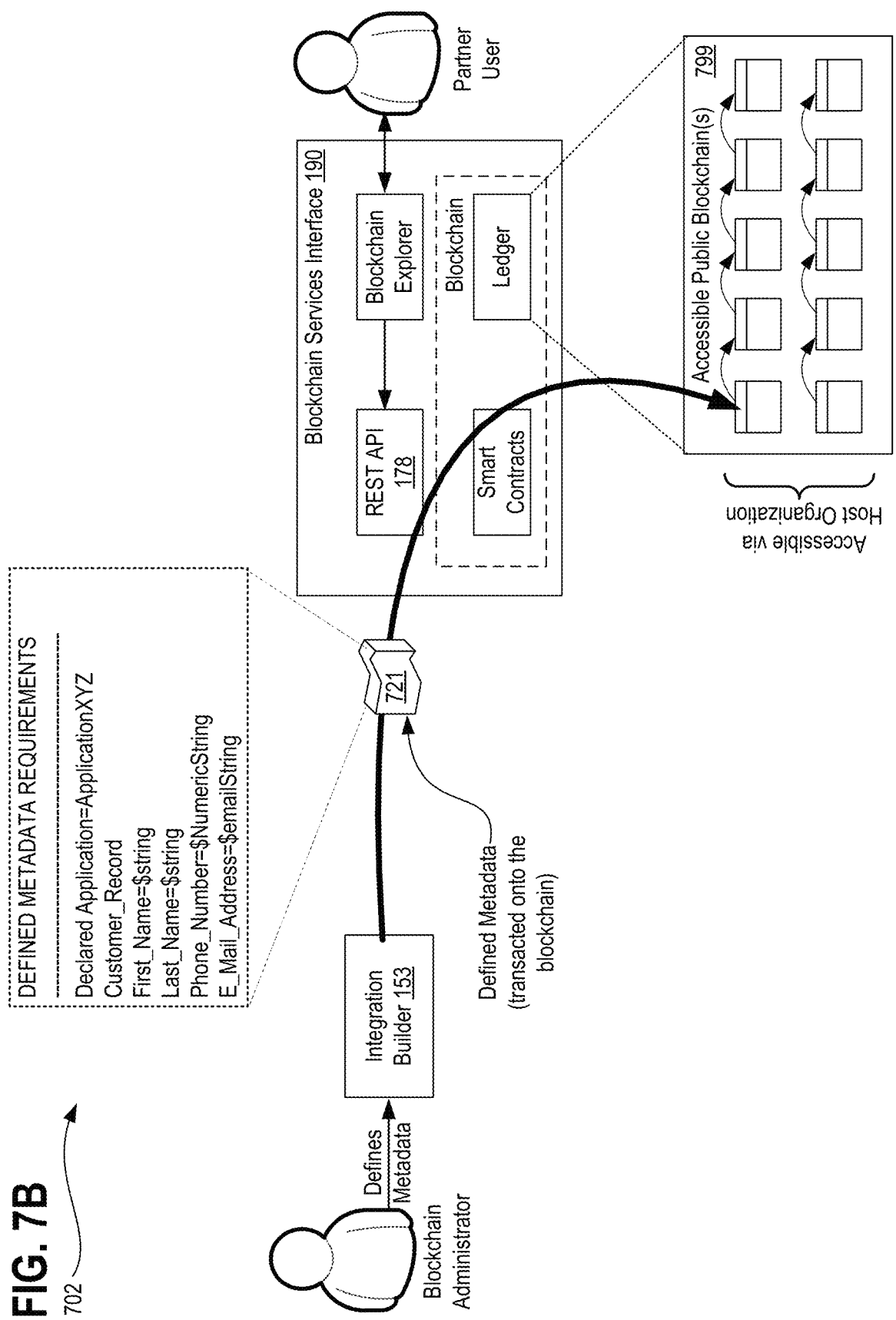
FIG. 7B depicts another exemplary architecture in accordance with described embodiments.

FIG. 7B depicts another exemplary architecture 702 in accordance with described embodiments.

In particular, there is now depicted a blockchain administrator defining metadata for the data utilized by an application which then standardizes the data which is written onto the blockchain on behalf of the two businesses, business 705A and business 705B.

As depicted here, the blockchain administrator defines metadata via the integration builder's GUIs or via the integration builder's API, and that defined metadata 721 is then pushed onto the specified blockchain 799.

Now, there is, transacted onto the blockchain, a clearly defined metadata specifying the requirements for the declared application "ApplicationXYZ" and specifically for the "Customer_Record," which is now structured as follows, as per the defined metadata:
DEFINED METADATA REQUIREMENTS
- - - - - - - - - - - - - - - - - - - - - - - - - - - - - - - - - - - -
Declared Application=ApplicationXYZ
Customer_Record
First_Name=$string
Last_Name=$string
Phone_Number=$NumericString
E_Mail_Address=$emailString Because the defined metadata 721 is transacted onto the blockchain, any application with permission to access data records on the blockchain 799 will be able to read and write data in compliance with the requirements specified by the defined metadata 721. This may be the specifically declared application, "ApplicationXYZ," or this may be other applications which utilized the data generated or managed by the declared application. Any application can read out the metadata 721 and operate in compliance with the requirements.

Figure 7C:
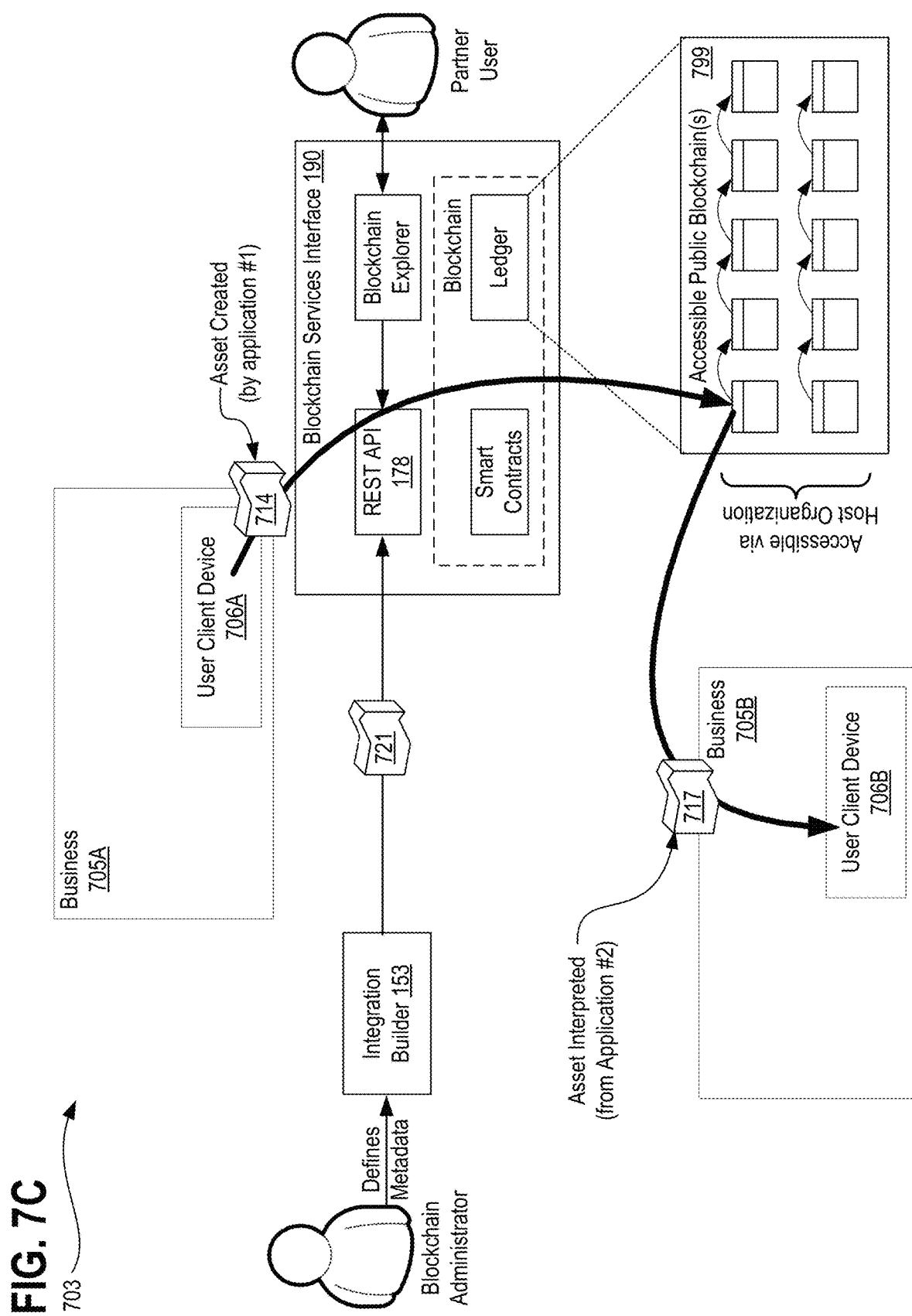
FIG. 7C depicts another exemplary architecture in accordance with described embodiments.

FIG. 7C depicts another exemplary architecture 703 in accordance with described embodiments.

In particular, it is now depicted that businesses 705A and 705B are enabled to share data transacted onto the blockchain 799 and because the defined metadata 721 specifies the requirements for formatting such data, the data written to the blockchain 799 and retrieved from the blockchain will embody a known format, and thus be transferable between the various businesses.

As shown here, the blockchain administrator defines the metadata via the blockchain services interface 190 which is transacted onto the blockchain, and then later, business 705A creates an asset 714 via application #1 and it writes that asset having the details of a customer record into the blockchain. Subsequently, business 705B retrieves the asset from the blockchain and when the asset is interpreted 717 via application #2 executing at business 705B, that data is successfully interpreted and understood by the application because there is a known and defined metadata structure for the customer record data.

FIG. 8A depicts another exemplary architecture 801 in accordance with described embodiments.

As shown here, there is a GUI 810 executing at a computing device 899, such as a user device of the blockchain administrator, with the GUI 810 being pushed to the computing device 800 by the blockchain metadata definition manager 196 of the host organization.

As shown here, the blockchain administrator may view the deployed applications as shown at the top of the GUI 810 and by clicking the "new" button at the GUI 810, the declarative capability is provided for the blockchain administrator to declare a new application. While depicted here is the declaration of a new application via the GUI 810, the blockchain administrator may alternatively utilize an API provided via the blockchain metadata definition manager 196 to create the new application.

Figure 8B:
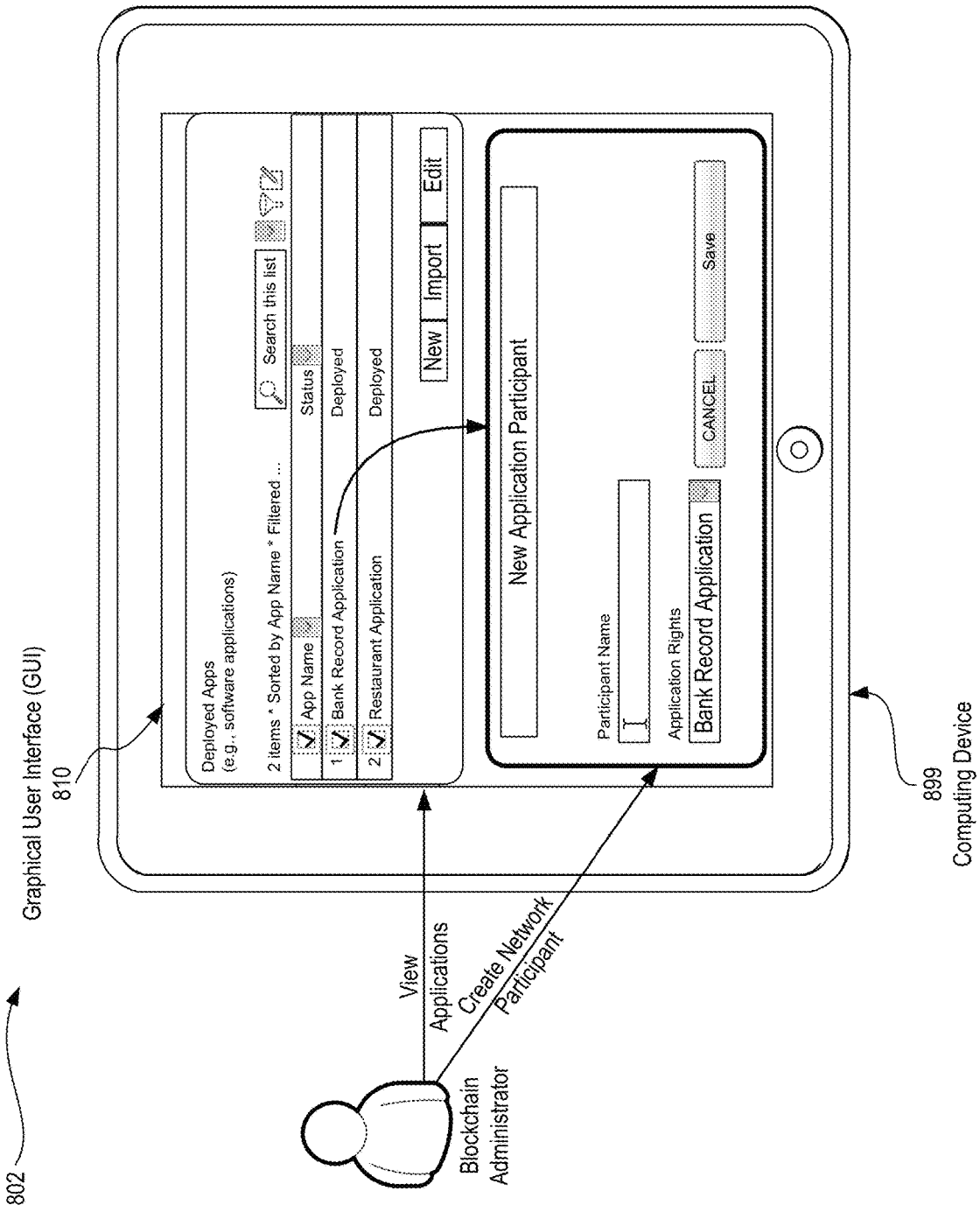
FIG. 8B depicts another exemplary architecture in accordance with described embodiments.

FIG. 8B depicts another exemplary architecture 802 in accordance with described embodiments.

In addition to the declaration of the new application or declaring the new application, there is additionally the ability for the blockchain administrator to define what participants have access to the data associated with this particular application, thus defining the network participants for this newly declared application.

Figure 8C:
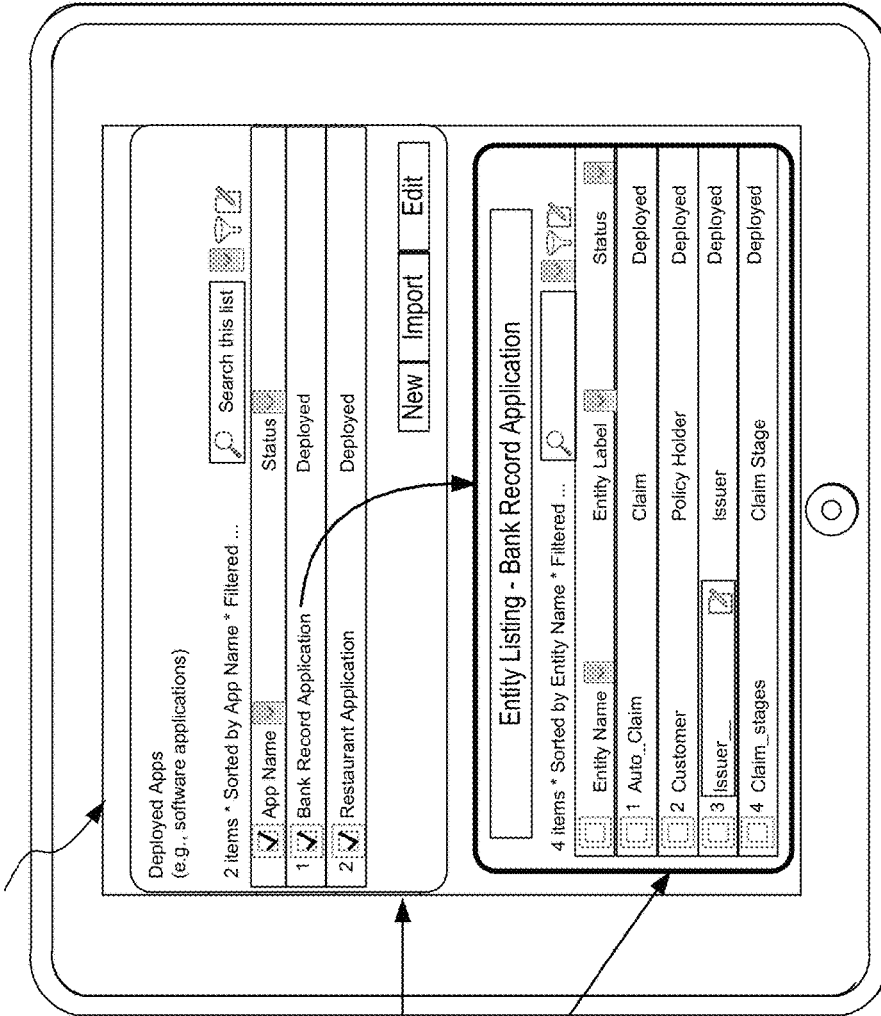
FIG. 8C depicts another exemplary architecture in accordance with described embodiments.

FIG. 8C depicts another exemplary architecture 803 in accordance with described embodiments.

There is again depicted the GUI 810, however, now depicted is the blockchain administrator viewing and editing entities for the "bank record application" by clicking on that application.

Thus, the blockchain administrator may first declare or create a new "application" and then once created, the blockchain administrator may edit or view that application and may create or declare new "entities" within the application, with each declarative entity defining the metadata for a particular custom field within which the application may ultimately store information in compliance with the defined metadata and which other applications may also interact with such data and reference such data, and possibly update, add to, or delete such data where adequate permissions exist, but again, doing so in compliance with the defined metadata.

For example, there is defined here for the bank record application, a "claim" having the entity name "Auto_Claim" and thus, any application wishing to write information to the blockchain pertaining to claims, at least to the extent such information will be utilized by the bank record application, then it is necessary to comply with the requirements of the defined entity "Auto_Claim."

Figure 8D:
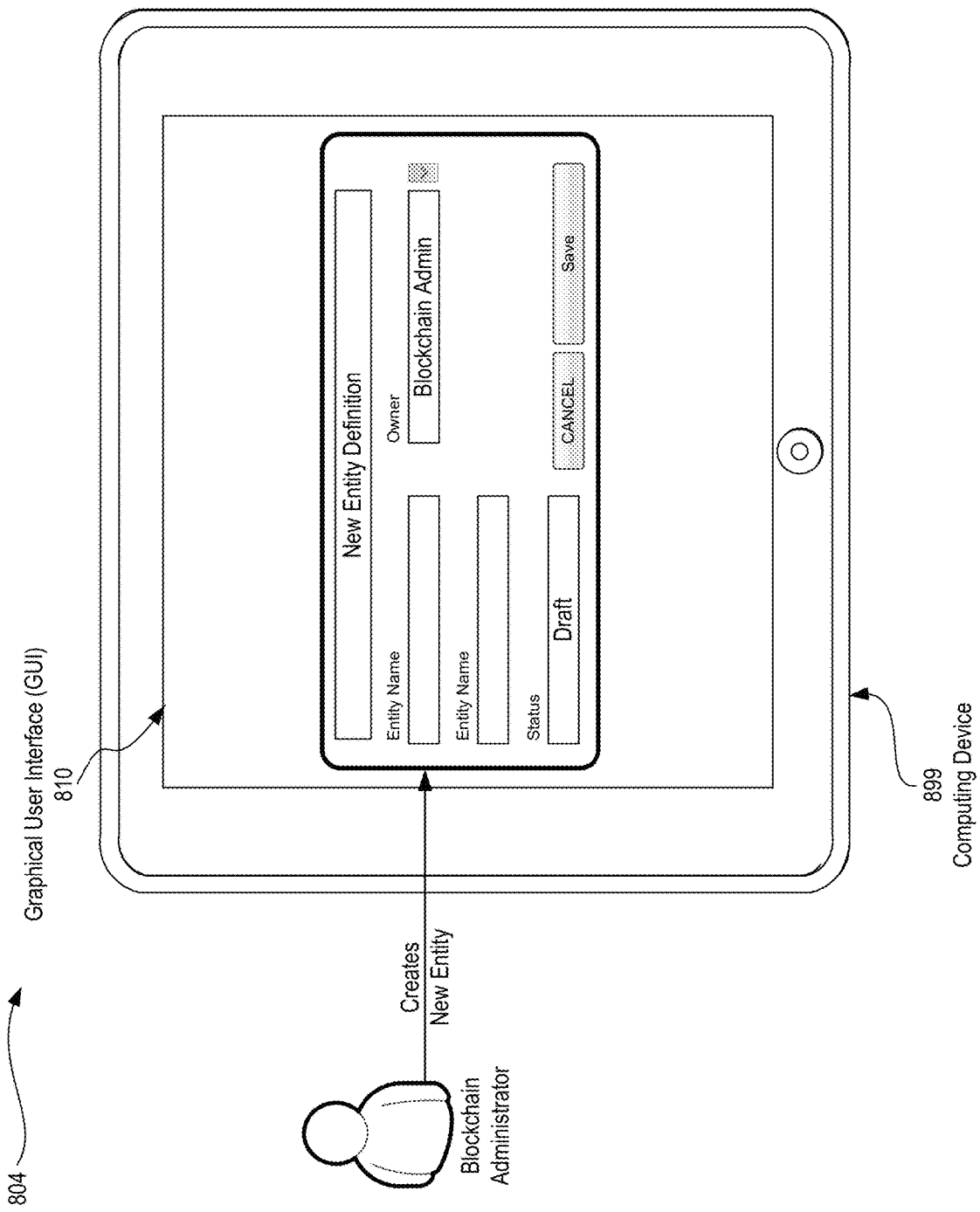
FIG. 8D depicts another exemplary architecture in accordance with described embodiments.

FIG. 8D depicts another exemplary architecture 804 in accordance with described embodiments.

Depicted here is a GUI 810 resulting from the blockchain administrator clicking on the "new" button on the prior screen to declare and create a new entity within the newly created application, or within a viewed application.

As shown here, there is a "New Entity Definition" GUI presented, in which the blockchain administrator can now create a new entity by entering the entity name, entity label, and selecting an owner for the entity, which by default is the user creating the entity. Clicking save then creates and declares this new entity. The blockchain administrator may additionally change the status to "deployed" and once saved, the entity will be transacted onto the blockchain, whereas in draft status, it will be retained only at the host organization's blockchain metadata definition manager 196.

According to a particular embodiment, every GUI has a corresponding API via which to interact with the blockchain metadata definition manager 196.

Figure 8E:
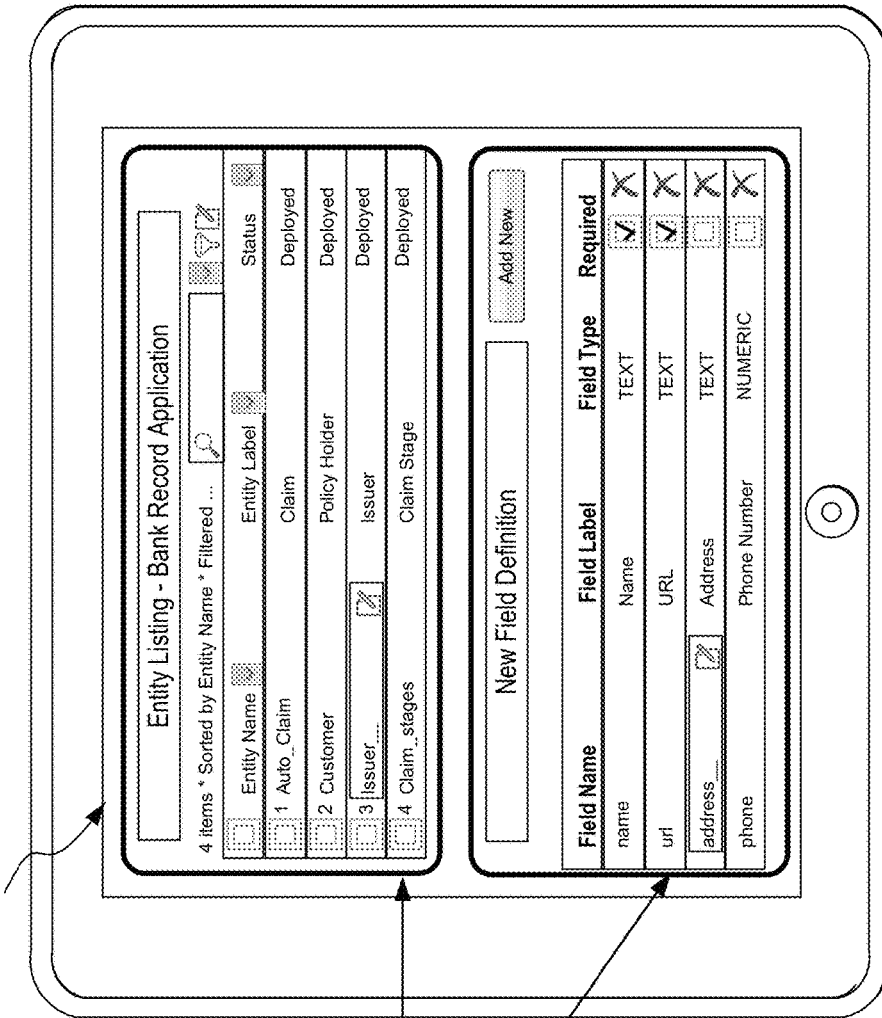
FIG. 8E depicts another exemplary architecture in accordance with described embodiments.

FIG. 8E depicts another exemplary architecture 805 in accordance with described embodiments.

Clicking on an existing entity, including the one just created at the prior GUI 810 as depicted at FIG. 8D, will result in the Field Definition GUI being presented, via which the blockchain administrator may now create any number of fields which are to be stored within that particular entity.

By way of analogy, it may be helpful to think of the declared application as a computer program, albeit one that runs via the cloud, and the declarative entities as tables comparable to tables in a relational database, and finally the declarative fields as column identifiers or populatable fields within a table, and lastly, the collection of fields would thus form a record. While the comparison is not exact, relationships between the various declarative elements and the metadata defined for them should help to illustrate their use.

Because the defined metadata specifies precisely what data is permissible, and the format and type of that data, any permitted application may then both successfully write information to the blockchain in a predictable and pre-defined format as specified by the metadata and additionally, applications with whom they are sharing may also successfully retrieve the information from the blockchain, knowing based on the defined metadata, how that information is supposed to look, and be structured, and thus how that information is to be interpreted.

Because the information is defined in blockchain via the metadata, all the participants know what each element of data means, based on the defined metadata, and therefore, for that network of participants, all participating nodes can share information via the blockchain.

Moreover, the participants are not restricted to the existing metadata transacted onto the blockchain, but they may create additional elements, create new metadata definitions, alter metadata definitions, etc.

For example, Bank Wells Fargo may decide that they, as a participant, require a new entity having fields X, Y, and Z. That participant may therefore define that metadata for the new entity (via the API or the GUI) having the fields X, Y, and Z, and then transact that new entity onto the blockchain.

The new entity will then be subjected to consensus by the other participating nodes. If the other participating nodes disagree, then consensus is not reached, and the change is negated. However, if consensus is reached, then the new entity having fields X, Y, and Z is transacted onto the blockchain by writing the defined metadata for that new entity onto the blockchain within a consensus block, or stated differently, the entity having already been written onto the blockchain, once consensus is attained, becomes a part of the "primary" chain on the blockchain which is accepted by all participants as the main chain.

According to another embodiment, smart contracts are executed for transactions on the blockchain which attempt to write or update data on the blockchain for an entity having defined metadata. For instance, there may be a trigger which causes the execution of the smart contract, in which case the smart contract retrieves or applies the defined metadata to validate that every field within the entity has a data type, data naming compliance, and a date mask which is in compliance with the requirements of the defined metadata.

Where the smart contract enforces the defined metadata, any transaction which fails compliance is either prohibited from being transacted onto the blockchain or if written to the blockchain, the transaction will never be accepted into a block on the main chain as the smart contract validation failure will prevent the transaction from reaching consensus for acceptance.

Thus, through the use of the described GUIs, it is possible for business users lacking programming and program development expertise to nevertheless declare a new application and declare new entity names as well as declaratively create new field definitions for those entity names. For those with greater technical expertise, they may utilize the APIs to interact with the blockchain metadata definition manager 196, if it is preferable for them to do so.

Regardless of the method chosen, the blockchain administrator can declaratively create a new application, new entities, and new field definitions, all without writing any code whatsoever, and the blockchain metadata definition manager 196 will then transact the defined metadata for the new application, the new entity, and/or the new field definitions onto the blockchain for voting and consensus.

Until consensus is reached, the defined metadata cannot be utilized. However, once transacted onto the blockchain and consensus is reached, then other participating nodes or participants on the blockchain can interact with all data for the declared application and the smart contract execution by the blockchain services interface 190 will force or mandate compliance with those interactions.

Figure 8F:
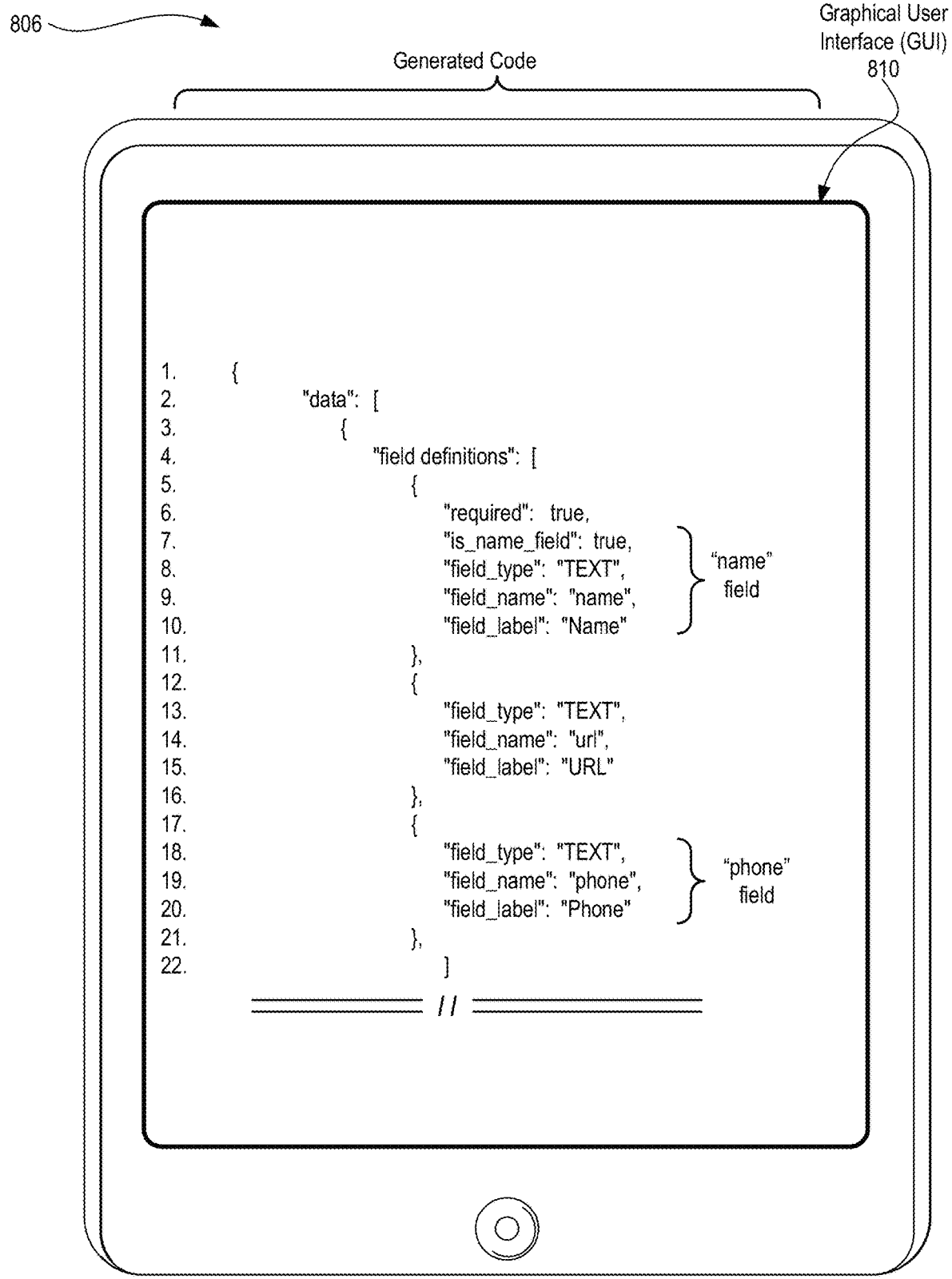
FIGS. 8F and 8G depict another exemplary architecture, respectively, in accordance with described embodiments.
Figure 8G:
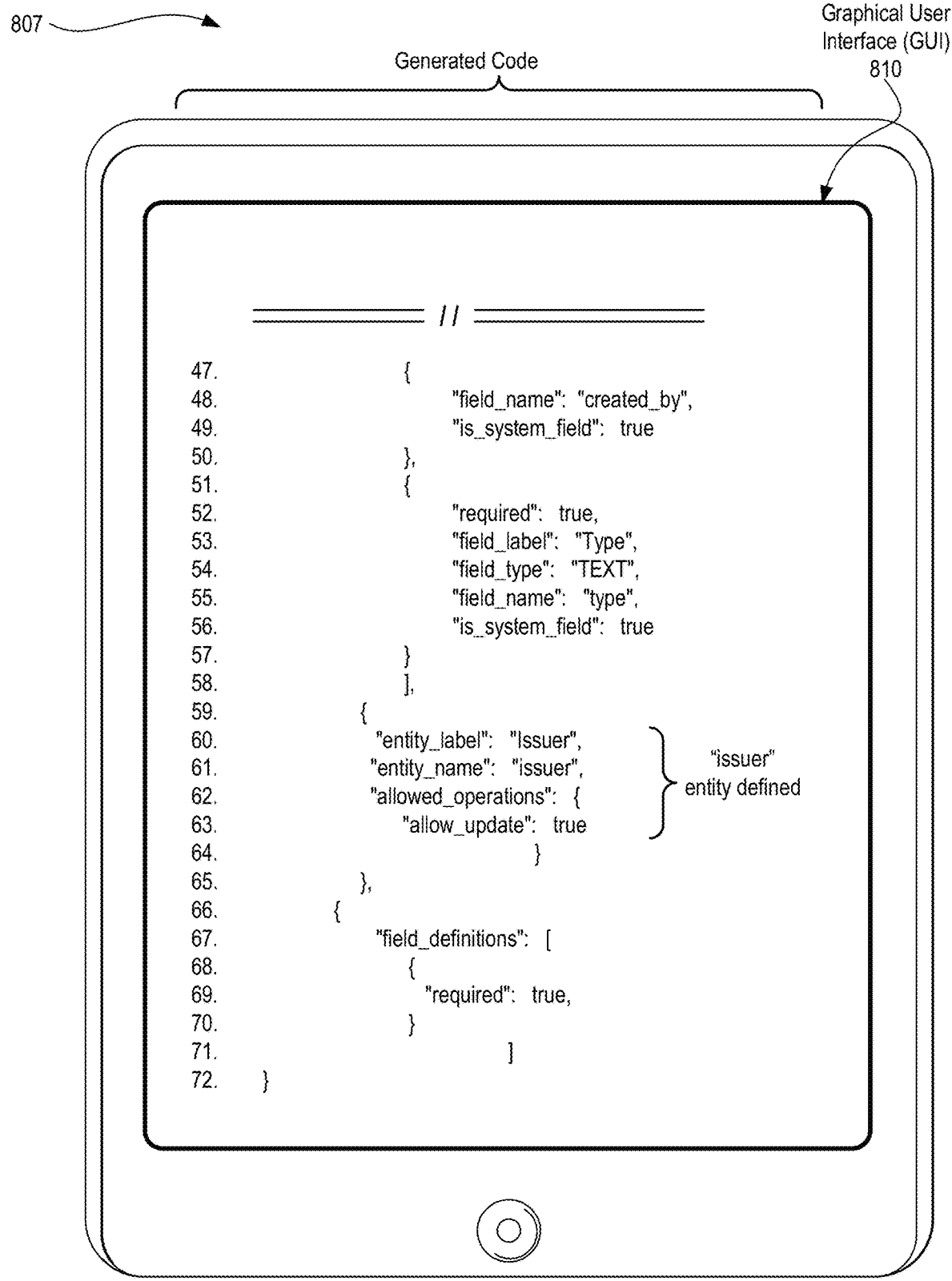

FIGS. 8F and 8G depict additional exemplary architectures 806 and 807, respectively, in accordance with described embodiments.

Depicted here is the generated code which is created on behalf of the blockchain administrator's declarative actions to define the application and declare the entity and declare the various defined fields, resulting in the API compliant code being represented within the defined metadata, despite no code having been written by the blockchain administrator. In other embodiments, a programmer or developer may elect to utilize the API to generate this code, in which case the GUIs will reflect the coded entities and the coded defined fields, just as if they had been declared via the GUIs originally.

Thus, the disclosed platform permits the creation of the necessary code to transact with the blockchain and to interact with the blockchain and to define and declare an application, and entities for that application (which may be depicted as tables within a database system via a materialized view as is discussed below), and to further define and declare new field definitions for each entity, and also define permissible network participants which may utilize the declared application.

In such a way, the declarative metadata platform performs all the heavy lifting on behalf of the blockchain administrator, allowing a non-programmer to create all the necessary code to interact with the blockchain for the newly declared application by using only point and click actions through a series of GUIs.

Moreover, the constructs of an application, and allowed network participants, and new declarative entities and new declarative field definitions are presented in a familiar manner to the blockchain administrator since the various elements may be thought of as database tables, columns, fields, and records, etc., despite the fact that database entries and database tables are not being created. Instead, the information is transacted onto the blockchain as an asset, while permitting the blockchain administrator to point and click their way through the entire process without any knowledge or requirement that the blockchain administrator understands how to transact to the underlying blockchain or how to add and update or transfer assets on a blockchain. Therefore, practice of the disclosed embodiments drastically reduces the complexity on the part of a non-programmer user operating as a blockchain administrator.

And yet, for more sophisticated users having programming knowledge and understanding of blockchain, the same code may be written and generated via the APIs exposed by the blockchain services interface 190 and specifically the blockchain metadata definition manager 196 provided by the host organization.

Figure 8H:
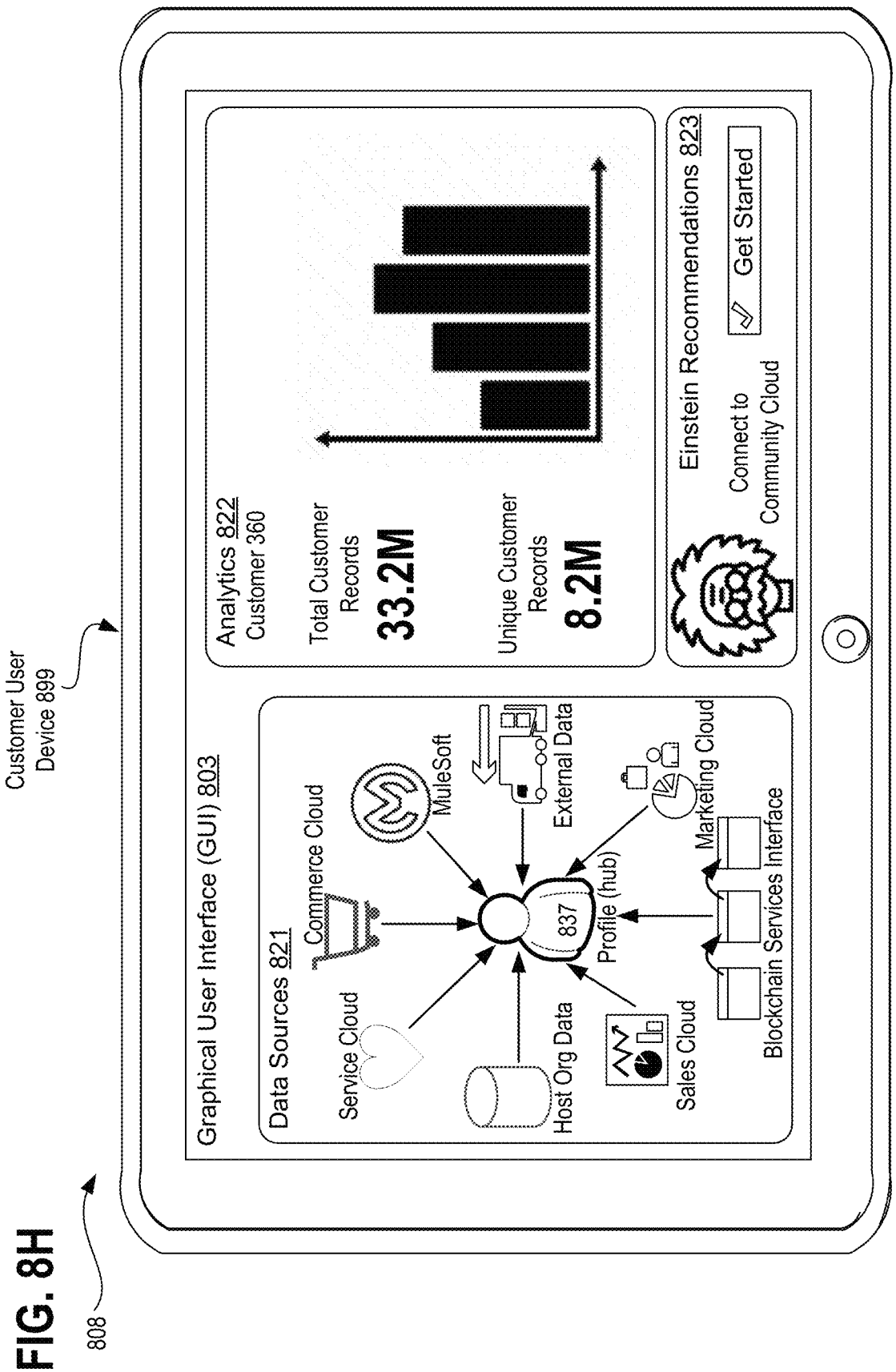
FIG. 8H depicts additional exemplary architectures in accordance with described embodiments.

FIG. 8H depicts additional exemplary architectures 808 in accordance with described embodiments.

Rather than replicating all of the related data (such as opened tickets, customer service cases, order history, etc.) into one single central storage location, Customer 360 (e.g., element 895) creates and stores a customer profile 837 which then operates as a central hub through which to exchange data and events across the systems at the time of need for that particular customer represented by the profile 837.

For example, as depicted at FIG. 8H, there are multiple data sources 821, each of which are linked with a common profile 837 which operates as a hub through the use of a unique profile ID. For example, the profile 837 may be utilized to update, write, search, and retrieve data from any of the service cloud, the commerce cloud, from the MuleSoft platform, from internally stored host organization data sources (e.g., CRM records, stored application data within Salesforce.com, etc.) from the sales cloud, from the marketing cloud, from an internally or externally hosted blockchain via the blockchain services interface, or from any external data source communicably interfaced to the host organization, such as other cloud platforms.

This information may then be consumed in support of consolidated analytics 822 across the dataset, rather than having to rely upon fragmented analytics which likely will not tell a complete and holistic story for any large customer organization. For example, as depicted here, the analytics 822 has now identified 33.2 million total customer records and has identified that there are 8.2 million unique customer records within this massive dataset.

Still further enabled is therefore the ability to provide Einstein recommendations 823 by connecting the analytics and available data sources lined via the customer 360 platform with the community cloud.

Connected customer experiences are therefore powered by Customer 360 (e.g., element 895) enable customer organizations utilizing the Salesforce app, including platform and industry solution teams, to build out-of-the-box, cross-cloud features and experiences that use Customer 360. For example, a service cloud agent's console operating from the service cloud 883 will include a reconciled customer profile (see e.g., profile 837 at FIG. 8H), and may further include commerce cloud order history pulled from customer records 887 and may further include shopping cart data pulled from subscribers 882 data at the email and mobile messaging and marketing cloud 881 platform. For instance, as is shown here, subscriber data 896 is depicted as being passed from the marketing cloud 881 platform through Customer 360 (e.g., element 895) and down into the service cloud 883, although the direction of data travel may be different and is not limited to any particular direction.

With such functionality, it is therefore not only possible for a customer service agent utilizing the service cloud 883 to see the customer's profile and richer contextual information about that customer, but the customer experience may be further improved by enabling the customer service agent to actually place an order through the marketing cloud 881 from the service cloud platform 883 on behalf of a customer, all of which is powered by Customer 360 operating as the inter-platform communications hub 899.

Additional examples include the marketing cloud triggering abandoned shopping cart journeys, triggered by the Commerce Cloud, powered by Customer 360 and pre-built assets for enhanced functionality such as journey templates, all of which are delivered out of the box to customer organizations utilizing the host organization's services and specifically utilizing the customer 360 platform.

In such a way, the Salesforce Customer 360 platform provides a new way for companies to connect Salesforce apps and deliver unified cross-channel customer experiences. With the aid of the Customer Success Platform, Customer 360 will help companies move beyond an application-specific or a department-specific view of each customer by making it easier to create a single, holistic customer profile to inform every interaction through the practice and implementation of the customer 360 platform (element 895). By placing the customer at the center of the business, Customer 360 enables companies to usher in dynamic new customer engagement models that bring together service, marketing, commerce and more in entirely new ways.

Customer 360 further permits brands to go that extra mile to deliver an amazing cross-channel experience by creating a single, unified, and consolidated view of the customer to yield far richer context permitting such brands and businesses to better serve their customer base. While such consolidation is historically challenging for any company to deliver consistently themselves, the Customer 360 platform greatly simplifies this process on behalf of such brands, thus making it easier for companies to bring service, commerce and marketing together to deliver the unified experiences that their customers demand—with clicks, not code.

The Connected Experience Imperative: Seventy percent of customers say connected experiences (e.g., an engagement with a brand that reflects an understanding of past actions, product usage, and a host of other personalized factors) are very important to winning their business. They expect a consistent experience when connecting with a company, whether they are interacting with a service agent or shopping for a pair of shoes. Despite this desire, disconnected experiences are an all too common occurrence, This is true regardless of whether the shortcoming is due to a support agent lacking a historical view of previous purchases, an email marketing offer for the very same product that was purchased just hours before, or a service representative who instructs the customer to reach out through a separate channel for additional assistance because they don't have all the relevant information at their fingertips.

These siloed experiences are equally frustrating for companies. Customer-facing employees lack a unified customer record, resulting in a fragmented view of each customer. Critical information that makes up a complete customer profile is spread across multiple systems. Traditional methods used to unify customer data and plug it back into engagement applications require extensive IT resources, and are difficult to change when organizations need to deliver new personalized customer experiences quickly.

Companies need a new way to empower their organizations to manage and create connected customers experiences that surface the right information to the right people at the right time and will thus benefit greatly through the use of the Customer 360 platform.

Delivering a Unified Customer Experience with Salesforce Customer 360 is made possible through a set of powerful platform services that enhance data management across Salesforce apps and provide instant access to consistent, reconciled customer data.

Such enabled capabilities include, for example: a click-based UI for app and data management enabling administrators to establish trusted connections between Salesforce apps and orgs; a mapping and reconciliation function to identify, map, and reconcile data across the various clouds when connected via the customer 360 inter-platform communications hub 899; and the further ability to create a canonical data model that provides a single representation of a customer's data for connected systems, thus eliminating the problem of having redundant and fractured data spread across multiple distinct platforms.

Previously, companies were required to rely on point-to-point connections. Unfortunately, such connections are difficult to establish and fail to integrate all potentially available data for a single customer. Conversely, with the customer 360 platform capabilities as described herein, companies now have a straightforward and secure mechanism by which to connect their customer data, thus enabling such companies with one single place by which to view their customer related data within the wide array of available Salesforce apps provided by the host organization.

Still further provided via the customer 360 platform are reconciled 360 ID and profiles across connected apps. For instance, a single ID enables Salesforce apps to recognize a customer across multiple channels regardless of how that customer identifies themselves, be it via name, email, phone number, social media handle, etc. Data management capabilities prepare, match, reconcile and update the customer profile across clouds, and data exchange features enable employees to pull up the right customer data exactly when needed, such as when a service agent may need to pull a list of past purchases a customer has made so they can better assist in solving a problem. Unlike massive data lakes or data warehouses that can become costly and tend to slow businesses down, the customer 360 platform implemented by the inter-platform communication hub 899 leaves data at the source where it originated, retrieving it only when needed, thus eliminating all synchronization and data redundancy inefficiency issues.

Still further provided are pre-built packages for Service, Marketing and Commerce. These packages enable companies and customer organizations associated with the host organizations cloud computing suite of services to quickly deploy experiences for the most common use cases, such as a Service Cloud experience that enables agents to see purchase and browsing history from the Commerce Cloud, or a Marketing Cloud journey that is automatically triggered by an event in Commerce Cloud. Each package has the necessary components to accelerate the delivery of connected experiences. For example, utilizing the Service Cloud, components provided include pre-built connectivity to the Customer 360 platform. In the Marketing Cloud, pre-built journey and email templates are provided which contain content and data sourced directly from the Customer 360 platform. And in the Commerce Cloud, data and events are automatically distributed to every system connected to Customer 360 via the inter-platform communications hub 899 once identified, mapped and connected.

While the generalized concept of a single customer view is not new, the technology and capabilities which permit salesforce.com to deliver that view is entirely new and built from the ground up. The customer 360 platform handles data in a highly efficient and secure manner, by allowing such data to remain within the systems that originally stored and managed such data, and calling upon the data only when needed, rather than creating massive centralized lakes of duplicate data which require constant synchronization, reconciliation, management, and result in costly wasted computing recourses.

Therefore, tenants, customer organizations and partner businesses may focus less on data management and more on delivering truly unified cross-channel experiences. For example, if a customer of an apparel company fills up their cart with merchandise while on a Commerce Cloud-powered website and then abandons it, this event, according to certain embodiments, may be configured to automatically trigger an action related to unfulfilled shopping cart journeys via the marketing cloud 881. By adding such a customer into a campaign in the Marketing Cloud offering discounts to the customer for those products abandoned in their cart, potentially greater sales conversions may be realized. Similarly, if an ecommerce retail customer reaches out to support about changing an order, an agent using Service Cloud 883 now has access to all past purchases the customer made through a Commerce Cloud-powered website, despite such data originating with and remaining within disparate cloud platforms, with the data being retrieved and shuffled to the needed platform on an on-demand basis via the inter-platform communications hub 899.

Consider the exemplary customer 360 use case: According to a particular embodiment, the matching and merging of customer/consumer data is of utmost importance to tenants and customer organizations utilizing the cloud computing services of the host organization.

While the Customer 360 platform is enabled to provide a single, unified, consolidated, holistic view of the customer, the reality is that, in this digital age, data for a single human customer or a single business is quite often scattered across various sources and 3rd party vendors. The integration and resolution of the data is a hard problem to solve and even more complex is getting the matching and merging correct. Still further complicating matters is the necessity to have such data validated and verified.

Exemplary match and merge algorithms may be based on deterministic or probabilistic matches, which may be associated with a match score or a statistical confidence score. However, prior solutions in the marketplace required that the customer of the host organization work to solve this problem. Through the practice of the disclosed embodiments, the host organization (e.g., Salesforce.com) operates to solve this problem on behalf of its customer organizations and partner organizations.

Consider for example, a consumer Samantha who is a customer of Adidas, with Adidas being a customer organization or "tenant" of the Salesforce.com host organization. In this example, Adidas utilizes the host organization's Commerce Cloud and Adidas also has a service cloud.

Therefore, the customer organization Adidas may seek to merge their data within the Commerce Cloud and their data within the service cloud, so as to result in matched and merged data indicating that both sources are in actuality the same underlying customer, namely, Samantha according to this particular example, However, further complicating issues is the fact that Nike, a separate tenant of the host organization, may also have data pertaining to Samantha as the individual human customer, notwithstanding the fact that Samantha now, according to this example, has customer records in the Commerce Cloud platform with Adidas, in the Service Cloud platform with Adidas, and yet further still, in another host organization cloud services platform utilized by the separate and competing customer organization (e.g., tenant), specifically Nike.

Now, consider for instance that both Nike and Adidas form a limited agreement for the betterment of their respective customer bases to share certain data. While such an agreement is challenging enough on the business side in terms of negotiations and contractual obligations, the technological burdens now faced by the two organizations are immense.

However, the host organization is well suited to address these technical complexities on behalf of their respective customer organizations and tenants (Adidas and Nike in this example) by acting as an intermediary and by applying their technological capabilities to the problem rather than districting Adidas and Nike from focusing on their core business objectives, which notably is not the means by which to merge disparate customer records.

Nevertheless, consider the difficulties faced by the organizations seeking to share and merge data. For example, Nike might erroneously merge data of a different Samantha on the Nike with a customer record for the original Samantha on the Adidas side, thus necessitating that both reset the data, and thus end up with lost data and with both organizations now finding themselves in a worse position than prior to the merge.

Such a problem becomes even more convoluted when 3rd party sources enrich the data, potentially injecting noise and misleading data and variables which then trigger false matches within the available data.

Figure 8I:
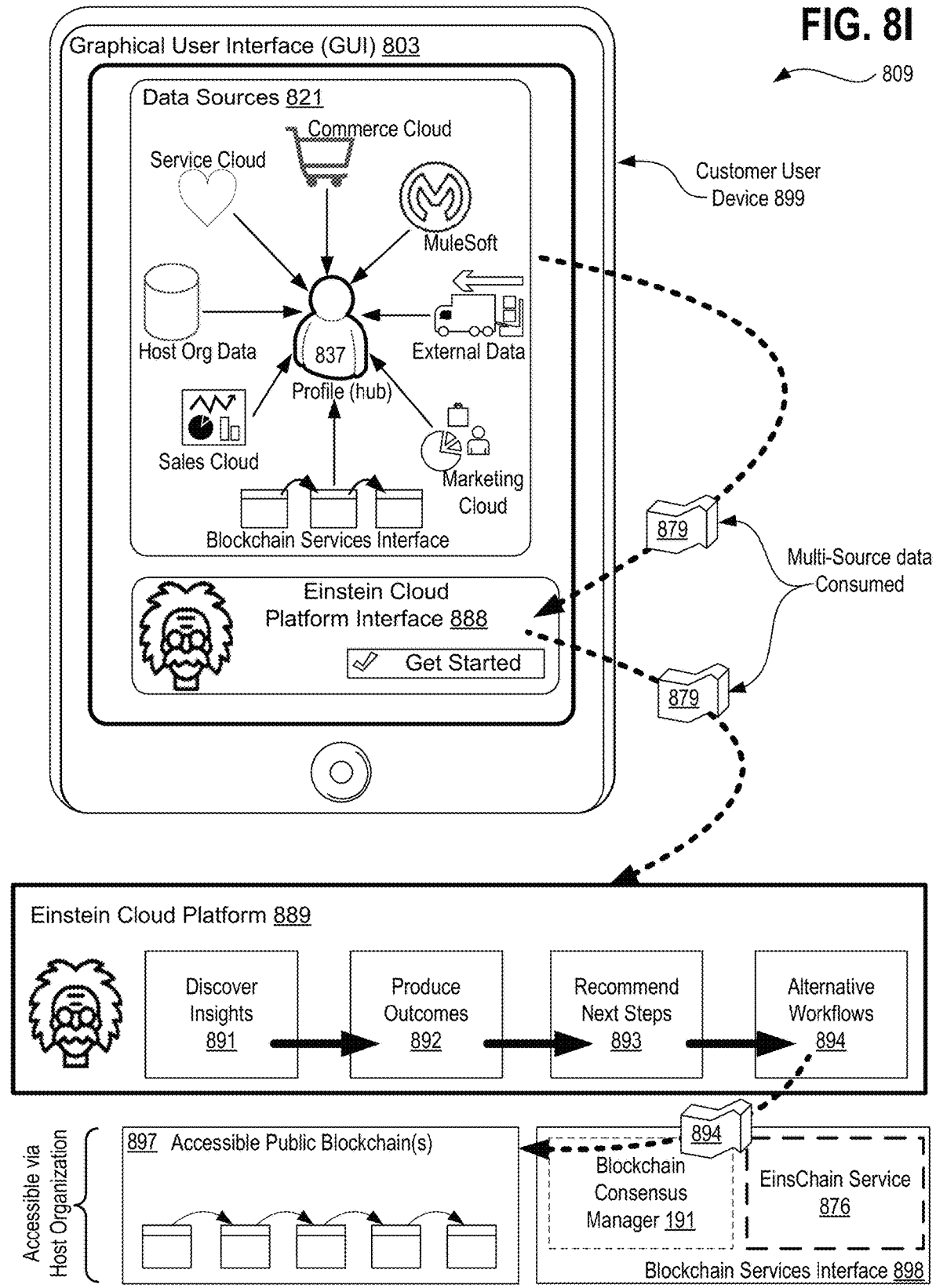
FIG. 8I depicts another exemplary architecture in accordance with described embodiments.

FIG. 8I depicts another exemplary architecture 809 in accordance with described embodiments.

As shown here, users and tenants of the host organization may communicate with the Einstein cloud platform 889 via the Einstein cloud platform interface 888 which is exposed to customers from the host organization from the customer user device 899. Moreover, the host organization's customers and tenants may direct the Einstein cloud platform 889 to consume multi-source data 879 available from the Customer 360 platform, assuming such data sources 821 are linked via the customer's profile 837 operating as a centralized hub for such data. The Einstein cloud platform 889 provides various services, such as the discovery of insights 891, the ability to produce outcomes 892, recommended next steps 893 for that customer, and ultimately may produce and output alternative workflows 894. Further still, output from the Einstein cloud platform 889 on behalf of the customer may be transacted onto accessible public blockchains 897 via the blockchain services interface 898 described above (e.g., including use of the blockchain consensus manger 191 and the host organization's EinsChain service 876 implemented via the blockchain services interface 898). Such blockchains are made accessible to the customer via the host organization and the blockchain services interface 898. Alternatively, alternative workflows 894 and other recommended next steps, predictions, and other output may be written to the any internally hosted blockchain of the host organization or may be written to both internal and externally hosted blockchains or selectively written to one or the other based on defined criteria.

The salesforce.com Einstein cloud platform 889 provides capabilities to the customer organizations and tenants of the host organization via the Einstein cloud platform interface 888 which consumes multi-source data 879 from the various data sources 821 (e.g., the service cloud, commerce cloud, sales cloud, marketing cloud, from internally stored host organization data, from externally stored data, from data stored on blockchains accessible from the blockchain services interface, from MuleSoft data, etc.

Via the Einstein cloud platform 889, discover insights 891 capabilities help the customer to identify significant patterns in their data that may be affirmatively acted upon. The discover insights 891 capabilities enable customers to discover the cause of unexpected business outcomes with Einstein, with the Einstein cloud platform 889 digging through customer's data, at their request and direction, the determine such patterns and causal events, often unknown to customers, regardless of whether such data resides internal to Salesforce or outside of Salesforce, hosted by third-party systems, including data hosted by publicly accessible blockchain platforms which are made accessible to customer's internal Salesforce applications and analytics via the host organization (e.g., via the Salesforce cloud computing platform).

Via the Einstein cloud platform 889, produce outcomes 892 capabilities, it is possible for customers of the host organization to leverage powerful AI capabilities which are exposed to the customer via the Einstein cloud platform interface 888. Such capabilities enable businesses and customer organizations to ensure that their employees always know what to do next. Through the Einstein cloud platform 889, customers will realize increased efficiency with AI-powered advice and produced outcomes, displayed directly to the customer user devices 899, directly where the business's employees work, giving those employees and salespeople suggestions for cross-selling, up-selling, and making recommendations to decrease attrition, and so forth.

The Einstein cloud platform 889 brings artificial intelligence and machine learning to cloud customers as an on-demand cloud based service. Built into the customer success platform, the Einstein cloud platform enables users to surface those insights in context for business users and enables sales professionals to find better prospects and close more deals through predictive lead scoring and automatic data capture to convert leads into opportunities and opportunities into deals.

AI is only as powerful as the data which powers it, but the Einstein cloud platform 889 has plenty of data, training Einstein predictive models on a range of data collected by Salesforce products. This includes: customer data, activity data from Chatter, email, calendar and ecommerce information, social data streams and even IoT signals. The Einstein cloud platform will continue to adapt to changing user behavior as data comes into the cloud platform.

The Einstein cloud platform 889 provides additional capabilities for App Cloud users and developers to bring AI features, such as predictive or suggested actions, into new or existing apps, based on the consumption of the multi-source data 879.

The Einstein cloud platform 889 is baked deep into the customer success platform, so taking and configuring and extending existing apps with Einstein fields and partners building on the customer success platform means Einstein will make all apps smarter, including those on the exchange.

The Einstein cloud platform 889 provides all of its popular software-as-a-service (SaaS) platforms with intelligent Einstein features with new capabilities to make it easier for admins to build AI-powered apps and chatbots within Salesforce without writing a line of code, called MyEinstein.

The Einstein cloud platform 889 further provides an Einstein Prediction Builder, which allows customers to create custom AI models around predictions for any field that is currently held in Salesforce simply by identifying the field they want to predict and selecting the data they want to use with a simple point and click interface.

For example, someone in the finance team could create an app that leverages the data in Salesforce and a pre-packaged machine learning model to predict which customers will file their invoices late.

The Einstein cloud platform 889 provides Einstein Bots, where customers can create chatbots powered by historical service and CRM data to respond to common customer inquiries and deploy it through Service Cloud. For example, a bot could be set up to track order status or request a refund and trigger the relevant process automatically.

The Einstein cloud platform provides Einstein Forecasting, an out-of-the-box tool for sales staff to make accurate forecasts using all of their historic CRM data. Einstein Forecasting is essentially a bundle of self-learning algorithms that learn individual and team forecasting behaviors to offer objective insights into future sales.

Host organization customers are thus able to leverage Opportunity Scoring to automatically prioritize high-value opportunities and Email Insights, which uses natural language processing to identify the most important emails.

The Einstein cloud platform 889 further enables Predictive Sort, which uses machine learning to personalize the order in which products appear in search and category pages on ecommerce sites, down to the individual shopper depending on their previous browsing habits.

The Einstein cloud platform 889 further enables New Order Management, which allows retailers to connect customer demand with inventory supply by analyzing order and inventory data across stores, warehouses and dropship vendors to support "buy anywhere, fulfill anywhere" scenarios.

The Einstein cloud platform 889 and the Service Cloud Einstein include recommended case classification which will automatically pre-populate key case fields and route them to the right agent predicatively. Recommended responses will push the most likely responses to service agents and the platform will predict close times related to issues.

The Einstein cloud platform 889 and the Marketing Cloud Einstein includes predictive scoring related to the likelihood of a customer engaging with an email, automated send-time optimization and predictive audiences, which will build custom audience segments based on predicted behaviors.

The Einstein cloud platform 889 further provides an AI-powered image recognition tool, called Einstein Vision for Social Studio, to its Marketing Cloud platform. This allows marketers to automate the discovery and identification of images shared on social media, even when they haven't been mentioned specifically, significantly speeding up response times.

Community Cloud Einstein now includes recommended experts, articles and topics, automated service escalation and newsfeed insights. Automated community case escalation and recommended experts, files and groups features are enabled via the Einstein cloud platform.

The Einstein cloud platform 889 and Analytics Cloud Einstein customers may utilize predictive wave apps to uncover future patterns for any business process, smart data discovery which will help users find and explain insights from their data, and automated analytics to prioritize insights.

IoT Cloud Einstein include predictive device scoring, recommend best next actions for service processes and marketing journeys, and automated IoT rules optimization.

Opportunity Insights enabled via the Einstein cloud platform gives financial advisors the ability to uncover opportunities based on client sentiments, competitor mentions and overall engagement by analyzing previous email conversations for which they took part.

The Einstein cloud platform 889 enables a Relationship Groups feature which helps advisors link clients to multiple households, trusts and business groups to ensure they have an up-to-date view of their client's wealth and the Relationship Map gives advisors a visualization of a client's family wealth ecosystem and financial accounts.

The Einstein cloud platform 889 further enables users to obtain insights for every role, function, and industry on a complete artificial intelligence platform.

The Einstein cloud platform 889 permits users to build custom predictions and recommendations with clicks, embed predictive insights into any record or in any app, operationalize AI by adding it to every workflow or business process and to apply machine learning natural language processing computer vision automatic speech recognition to existing data sets.

The Einstein cloud platform 889 provides machine learning which uses past data to predict what will happen in the future with minimal programming. The Einstein Discovery gives CSAT trends and insights alongside a Einstein Analytics dashboard while the Einstein Discovery engine boosts productivity and discover relevant patterns in all your data, whether it lives in Salesforce or outside enabling users to find simple AI insights and recommendations to tough problems. Then, take action on your findings without ever leaving Salesforce's ecosystem.

The Einstein cloud platform 889 and the Einstein Prediction Builder permits users to predict business outcomes, such as churn or lifetime value. Create custom AI models on any Salesforce field or object with clicks, not code. For instance, one step in the process of building a custom prediction model for your data with a generated journey of next best steps to help close a specific account's open opportunity.

The Einstein cloud platform 889 and the Einstein Next Best Action function delivers proven recommendations to employees and customers, right in the apps where they work and permits users to define recommendations, create action strategies, integrate predictive models, display recommendations, and activate automation.

The Einstein cloud platform 889 utilizes natural language processing to extract meaning from every piece of text and utilizes natural language processing (NLP) to find linguistic patterns you can use to answer questions, respond to requests, and identify conversations about your brand across the web.

The Einstein cloud platform 889 utilizes an Einstein Language which permits users to understand how customers feel, automatically route inquiries, and streamline your workflows. Build natural language processing into your apps to classify the underlying intent and sentiment in a body of text. Functions implement Einstein scanning of content and to provide a synopsis for a Salesforce user to follow.

For example, with The Einstein cloud platform 889, entering text into a chatbot permits users to easily build, train, and deploy custom bots on digital channels that are connected to your CRM data. Enhance business processes, empower your employees, and delight your customers.

The Einstein cloud platform 889 provides a computer vision which permits users to get the full picture of their products and brand. Computer vision includes visual pattern identification and data processing to track your products and brand, recognize text in images, and more while Einstein Vision permits users to see the entire conversation about your brand on social media and beyond. Use intelligent image recognition in your apps by training deep learning models to recognize your brand, products, and more.

The Einstein cloud platform 889 provides Einstein synthesizing features of user feedback on a social post by identifying the product in an image.

The Einstein cloud platform 889 provides automatic speech recognition to better engage with your data hands-free and build deeper relationships with customers. Such automatic speech recognition translates spoken language into text. And Einstein takes it a step further, by putting that text into the context of your business.

The Einstein Voice Assistant home screen on mobile and the Einstein Voice permits users to obtain daily briefings, make updates, and drive dashboards by simply speaking to Einstein Voice Assistant and to further create and launch your own custom, branded voice assistants with Einstein Voice Bots.

Over the past few years, there have been great advances in technology in terms of artificial intelligence wherein many different technologies such as NLP, Deep Learning, IoT technologies have become more powerful and getting accurate in terms of prediction creating automated actions.

As the Einstein cloud platform 889 becomes more and more intelligent with Einstein Agents, Einstein Sentiment, Vision, Intent, Einstein Bots and makes more decisions that are fully hands-free and entirely automated, such decisions will become increasingly difficult to track.

Further still, with use of smart contracts which execute via blockchains that might get triggered based on the actions observed or changes observed within the blockchain, it is possible that such process flows could result in an audit mess and due to complex technologies which lead to the decisions and increasingly difficult tracking, especially tracking of those decisions which are made via AI trained models.

Certain high regulations industries require better management and some require legal compliance pursuant to statute, treaties, contractual obligations, or simply best practices.

Compliance, Customer/Consumer transparency, communication, and collaboration all may therefore be further improved through the use of a multi tenant blockchain platform for managing the Einstein platform's output decisions through the use of using distributed ledger technology.

According to a particular embodiment, DLT technologies are utilized, such as a public or a private blockchain, to persist entirely immutable transactions which are fully transparent, trackable, and therefore audit friendly, with such transactions optionally being subjected to consensus based on the particular implementation, industry, and applicable compliance regulations.

According to one embodiment, fully compliant audit records are stored in an immutable format, such that all transactions are permanently recorded along with consensus by participating nodes. Any change to a record is immutably stored, but never removes the prior transaction occurrence, once that transaction is accepted to the blockchain as a consensus approved transaction and thus embedded within an adopted and accepted block on the main chain of the blockchain.

According to another embodiment, multi-tenant support is provided by the immutable and audit compliant record keeping for such transactions. According to such an embodiment, the transactions include data which describes a collection of data descriptors from the following exemplary list: what decision was made by the AI trained model, what version of the AI model made the decision, what decision was made, what collection of training data was utilized to train the AI model, any confidence score or predictive score output by the AI model, what Einstein cloud platform features or GUIs were utilized, and AI intermediate node decision points triggered to lead to the output decision by the Einstein cloud platform.

The problem of audit compliant record keeping for such transactions becomes more difficult in case of multi-tenancy due to the fact that many customers are in fact sub-parts or included participants within multiple distinct tenant orgs.

Consider for example Bank A and Bank B, each tenants of the host organization and each being part of a Blockchain by operating as a participating node on that blockchain. Assume with this example, that each of Bank A and Bank B has data which is then shared based on a consent mechanism.

While the Einstein cloud platform 889 might make a score or decision for a particular consumer based on the shared data, it is very often difficult from a record keeping perspective to understand at a later time, why the Einstein cloud platform 889 made that decision. Was it based on data from Bank A, or Bank B, or both or from some third party provided supplemental data? There may not be a question of whether the decision was valid, yet certain legal requirements and compliance regimes mandate that such results are tracked in terms of the decision made, but also why that decision was made.

It is therefore described, in accordance with one embodiment, that an Einstein Chain or "EinsChain" is provided by the host organization to its customer orgs which provides a decentralized multi-tenant Einstein registration, decision aware, tracking platform that persists data onto the blockchain behind the scenes in an manner which provides immutable transaction record keeping on behalf of the customer orgs, but without burdening the customer orgs with the requirement to interact with the blockchain themselves. Stated differently, the host organization's EinsChain provides a user friendly interface via which customer organizations may interact with the data persisted by the blockchain without having to understand the technical requirements of transacting with the blockchain.

According to a related embodiment, the host organization's EinsChain provides a platform for businesses to register their Einstein services, such as Einstein Bots, Agents, Vision etc, each enabled and provided via the Einstein cloud platform. Once the registration is made by the customer organization, all actions (or all filtered and selected actions pursuant to the customer org's configuration) that are provided to the businesses by the Einstein cloud platform utilizing the Einstein management capabilities are then enabled and made visible from that point forward for the customer organization, with such management features including, for example, fully compliant audit trails, tracking, decisions made by the Einstein cloud platform on behalf of the business and adopted/accepted by the business, actions taken including specifically what actions did the business took pursuant to recommendations by the Einstein cloud platform and why those actions were taken, along with the requisite transparency, immutability, identity management, and skill sharing.

Consider another exemplary scenario where the same Bank A and Bank B, each again being part of Blockchain, have their data once again shared based on a consent mechanism, however, in this instance, the Einstein cloud platform makes a score or decision for a consumer of the bank based on the shared data subsequent to the Banks A and B each having registered with the Einstein cloud platform's EinsChain service, thus enabling full audit tracking and transparency. Now, the decision and action is stored by transacting a new asset onto the blockchain through the blockchain services interface linked with the EinsChain service, thus immutably storing and preserving the decisions, the decision factors, and other relevant information for the purposes of future reference or a future audit. Should the Banks A or B conduct an audit, or be subjected to Audit, then via the Einstein cloud platform's EinsChain service, they can recall that data through an API or through a point and click based GUI to retrieve not just the record of the decision, but the associated data supporting that decision, as noted above, such as the AI model utilized, the training data collection used for training the model, intermediate nodes of the AI model fired in support of that decision, what decision was rendered, confidence scores, predictive scores, etc.

With such information preserved, the audit is made less time consuming, less complex, and more transparent, whereas in the past, it is possible that such information may simply be unattainable for the auditors, regardless of the business's desire for full compliance.

With regard to Einstein cloud platform 889 Bots, agents, or vision, an API is provided by the Einstein cloud platform which permits the EinsChain service to record data output and decision considerations by the Einstein cloud platform, all of which is stored to the blockchain upon which the customer org is a participating node, thus storing all registered data requirements for any Einstein cloud platform features, decisions, and actions recommended by the Einstein cloud platform and adopted/accepted by the business.

While the EinsChain enables the immutable storage and management of Einstein Platform decisions onto the blockchain in a multi-tenant aware format, the EinsChain may be utilized for immutably storing other data streams to the blockchain, such as the host organization's IoT cloud platform and other cloud platforms (e.g., the commerce cloud platform, the customer success platform, etc.) as provided by the host organization.

According to such embodiments, any platform, including those utilizing AI based models or utilizing deep learning, etc., will ultimately make recommendations, predications, decisions, and take actions, which if adopted and accepted by the business using such platforms, generates data which is potentially important to capture and immutably record via the EinsChain service in a distributed ledger, such as the blockchain upon which the businesses are participating nodes. Notably, the information could be written to a blockchain for which the business is not a participating node, so long as the blockchain services interface of the host organization has access to the blockchain due to the host org operating a participating node, however, it is generally contemplated that the blockchain upon which the business is already a participating node is a suitable blockchain to which to immutably persist such audit and tracking information on behalf of the business.

According to certain embodiments, a sub-set of the information immutably recorded to the blockchain is exposed to an end-user to which such information pertains. For example, where the Banks A and B make a consumer lending decision based on shared information available to the banks, and that lending decision pertains to end-user and consumer John Consumer, then a subset of the information may be made accessible to that user via an API, or a GUI, regardless of whether or not the end-user is a known user to the host organization. Such access may require the end-user traverse access restrictions, such as self identifying themselves based on a zero knowledge challenge, etc., but the data is nevertheless made available to the end-user for review. For example, the consumer lending decision may indicate what banks made a decision, when that decision was made, what AI platform (e.g., Einstein, or otherwise) made a recommendation, what data elements were considered by the AI platform, a confidence score in that recommendation, and so forth. According to certain embodiments, such access may be made on behalf of the customer organizations so as to comply with consumer protection regulations or other applicable law. According to other embodiments, the customer organization, tenant, or business (e.g., Banks A and B in this example) may specify what data is made accessible to an end-user, and that customer organization may make that decision based on statutory, contractual, or other legal requirements for data transparency.

While some portion of the data may be helpful to the end-user, other portions of the data may not be helpful to the end-user and may indeed be erroneous and could negatively affect such users.

Problematically, it is known that an AI or deep learning system trained on poor or inaccurate data could result in erroneous decisions and recommendations being output as well as the possibility that data upon which a decision is made (not the training data, but the input data to be evaluated based on a trained AI model) may also be inaccurate, resulting in a bad or incorrect decision, action, or recommendation.

It is in such situations where tracking and transparency is especially important. Historically, such data would not be available for review in the event of an audit or a customer requested review of a decision.

However, through the use of the EinsChain service, in the event that the AI system does recommend something inaccurate, then subsequently, the reasons for why the recommendation was made may be reviewed and understood, and the erroneous recommendation may thus be corrected. Similarly, if inaccurate data inputs were the cause of the erroneous recommendation, then again, the EinsChain will track and immutably record this information to the blockchain and that day may later be retrieved and reviewed by the people needing access to that data, be it an auditor, a regulator, a customer service agent, etc.

For example, consider a wealth manager which utilizes an AI platform to make a decision based on a recommendation by the AI platform. Subsequently, the investment decision turns out to be a bad investment, and the client then demands to know why the wealth manager made a decision to purchase a particular stock based on the recommendation.

Assuming the EinsChain service is utilized and the AI engine's output is registered to be persisted via the blockchain as described above, then wealth manager in this example, can go back in time and determine what recommendation was made, on what criteria that decision was made, and whether the decision to purchase the stock as an investment was accurate at the time the decision was made, notwithstanding the fact that the future performance of that stock purchase was a poor investment. Stated more simply, the wealth manager can determine whether or not the decision was appropriate at the time the decision was made, regardless of what new events occurred in the future, after that decision was made.

As noted above, such information may further be mandated pursuant to compliance requirements, statutory requirements, regulations, auditability requirements, etc.

Consider another example with each of Bank A and Bank B from before. Now, both operate as part of the same blockchain network and have agreed to share data pursuant to a consent agreement. Such data may be shared via blockchain or otherwise. Regardless, consider that Bank A utilizes the data from Bank B as part of a scoring mechanism and makes a decision to decline lending to a consumer based at least in part on data from Bank B.

A subsequent audit challenges the decision and now the underwriter with the Bank A is in potential compliance trouble and requires access to the data upon which the decision was made, especially given the fact that the decision was based in part on the output of a trained AI model. Prior solutions lack the transparency to see such data and also lack the ability to persistently store such information. However, through the use of the EinsChain API or GUI, the underwriter subjected to the audit may now simply recall that consumer's information including the lending decision made and the basis for that decision, including the recommendation by the AI model, which AI model was utilized, what data was evaluated by the AI model (e.g., including data from Bank B), and so forth, thus providing full transparency and auditability.

According to one embodiment, every AI and deep learning cloud platform provided by the host organization permits the user of such services to configure the EinsChain to record the data stream and output of the AI and deep learning cloud platforms for the purposes of at least transparency and audit ability, in which the decisions, recommendations, actions, and factors considered by such AI and deep learning platforms is immutably written to a blockchain for later retrieval via an API or GUI exposed utilizing the EinsChain service.

Because the blockchain provides immutable storage, it is well suited to store such audit data as the records cannot later be changed or fraudulently manipulated. In an alternative embodiment where data is not shared amongst multiple tenants and therefore only utilized by a single tenant, there is no need to utilize blockchain, although the single tenant may elect to do so, or the EinsChain may be configured to do so, regardless of how many tenants' data is involved. Nevertheless, where a single tenant requires audit data to be stored, they may configure EinsChain to persist the data to an immutable database for persistent storage, without utilizing any blockchain or distributed ledger.

According to described embodiments, the Einstein cloud platform 888 incorporates artificial intelligence (AI) via the recommended next steps 893 which customers and business may then incorporate directly into their workflows, thus generating alternative workflows 894 produced, recommended, and output from the Einstein cloud platform 888.

Sometimes these alternative workflows 894 are produced and generated by the AI of the Einstein cloud platform 888 for customer review and acceptance, in which an affirmative action to accept or reject the recommended alternative workflow 894 is required before the alternative workflow 894 is transacted onto the blockchain.

However, in other embodiments, the Einstein cloud platform 888 generates an alternative workflow 894 which is generated and output and then transacted onto the blockchain automatically without human intervention pursuant to a customer organization's configuration parameters.

In such an event, it is quite possible that the Einstein cloud platform 888 generates an AI model which is transacted onto the blockchain and implemented via a smart contract which executes on the blockchain to enforce business rules or other criteria and decision output from the AI model. For example, the AI model may be trained based on partner data and data of the customer organization and then determine to reject credit applications on the basis of data correlations derived from a training dataset by the AI model without human intervention. Stated differently, the AI model trained on such data may establish its own rules and decision making criteria. If this AI model is then output as an alternative workflow 894 from the Einstein cloud platform 888 and then transacted onto the blockchain and enforced via smart contracts executing on the blockchain, then it is very possible that the results of the Einstein cloud platform's 888 trained AI model may affect both the business and the business's customers in a real-world manner, by for example, accepting or rejecting an application for credit.

It is therefore important that the precise details of that AI model be recorded and tracked for the purposes of having an audit trail, in the event that a customer, the business, administrator, etc., seeks to understand what AI model was utilized to make a decision (e.g., such as a credit acceptance or denial decision), as well as precisely what version of that AI model was utilized and further, what training dataset or what version and time-span of training data was utilized in training the AI model, which then led to a particular decision as enforced by the smart contract on the blockchain.

The AI model may therefore be registered with an audit keeping service which operates to track when alternative dataflows 894 are output by the Einstein cloud platform 888 and transacted onto the blockchain for use, as well as what version of the AI model, what training data set was utilized, etc.

In such a way, it then possible for customers, businesses, or administrators to subsequently review and investigate how a particular decision was made, even when that decision was made by an AI model automatically generated, output, and implemented by transacting the AI model onto the blockchain with business rules and criteria enforced by smart contracts executing on the blockchain.

According to certain embodiments, the Einstein cloud platform 888 trains a new AI model, registers the version information for the AI model and the training data set with an audit record keeping service pursuant to a request (e.g., regardless of whether the request is an automatic request from a controlling application or a request from an administrator, etc), and then deploys the AI model by transacting a smart contract to execute at the blockchain and enforce decisions and recommendations made by the AI model.

According to another embodiment, reinforcement learning is further utilized to the trained AI model via a feedback loop which adds decisions to accept or reject transactions to a new reinforcement training data set. For example, the new reinforcement training data may be continuously streamed to the AI model which updates on an ongoing basis or the new reinforcement training may be utilized to re-train the AI model on an as-needed basis, or the new reinforcement training may be utilized to incrementally update the trained AI model based on the incremental new reinforcement training data as it becomes available in small batches.

Feedback loops ensure that the AI model's results do not stagnate. This also has a significant advantage in that this data used to train new versions of the model is of the same real-world distribution that the customer cares about predicting over. Without such feedback loops, the AI model will choose the path of least resistance, even when that path is wrong, causing its performance to deteriorate over time. By incorporating a feedback loop, the AI model's training is reinforced and will improve over time.

Importantly, not all transactions on the blockchain will attain consensus which is consistent with the AI model's recommendations and decisions to accept or reject transactions. These results are very helpful to the AI model's continued training. While most are likely to correspond to the AI model's recommendation, it is nevertheless possible that some transactions will be rejected (that is they will not attain consensus) despite the AI model recommending to accept them. In other circumstances, it is possible that the AI model issues a decision to reject a transaction which is nevertheless transacted onto the blockchain successfully after attaining consensus, notwithstanding the AI model's recommendation. According to one embodiment, the AI model operates as a participating node with consensus voting rights. In certain embodiments, the AI model has equal consensus voting weight to other participating nodes, where as in other embodiments, the consensus voting may be biased in favor of the AI model or against the AI model by granting greater or lesser consensus voting weight to the AI model's participating node.

Many modern businesses operate on the basis of AI-driven workflows derived on the basis of data-driven criteria established by the AI model from, for example, a training data set. Such a training data set may be based on commercially available data, data produced and stored by a particular business, as taught herein, data which is shared amongst two or more business via the customer 360 platform and the Salesforce cloud computing platform (e.g., the AI model may be trained based on a training data set shared between two or more of tenants or customer organizations which subscribe to services of the host organization).

Data provides insights that enable better decisions and processing such data via the training of an AI model provides means by which to extract those insights and take actions.

Previously, industry professionals relied on their highly-tuned intuitions, developed from years of experience, sometimes supported by limited data, to make recommendations and take action on behalf of a business. For example, such actions may be credit making decisions, inventory levels to stock, or the approval of financial investments. Professional expertise often was the result of instinct and was sometimes difficult to quantify the grounds for such decisions.

It goes without saying, however, that a professional's intuition is far from ideal as a basis for decision making Conversely, data-Supported decision making is attainable through an AI trained model utilizing the business's own data or data accessible to the business. With the consumption of multi-source data provided through customer 360, the Einstein cloud platform 888 may consume and analyze previously unthinkable volumes of data, such as data describing literally every transaction, every customer interaction, every micro-transaction, macroeconomic indicators, etc. Such data enables the Einstein cloud platform 888 to provide data-decision making through which such information informs better decisions. With this data-rich environment workflows are may be frequently updated so as to re-train AI models and capture the changing business environment.

Figure 9A:
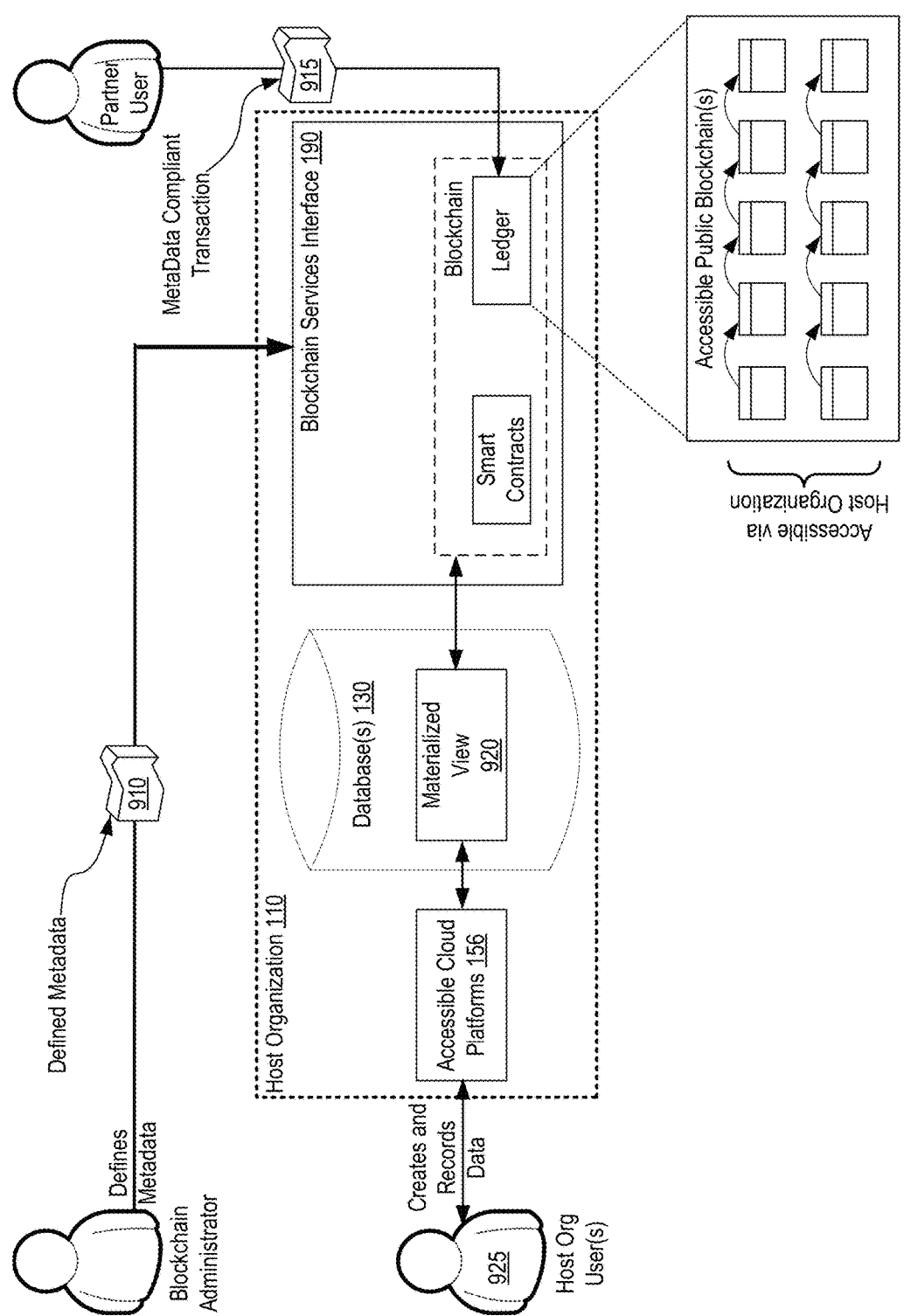
FIG. 9A depicts another exemplary architecture in accordance with described embodiments.

FIG. 9A depicts another exemplary architecture 901 in accordance with described embodiments.

As shown here, the blockchain administrator transacts the defined metadata 910 onto the blockchain, which presumably will be accepted once consensus is reached, and a partner user next transacts a metadata compliant transaction 915 onto the blockchain.

Further depicted here, is the materialized view 920 which permits a host organization user 925 to interact with the data transacted onto the blockchain via the metadata compliant transaction 915 from the accessible cloud platforms 156 available via the host organization 110.

In computing, a materialized view 920 is a database object that contains the results of a query. For example, the materialized view 920 may be a local copy of data located remotely, or may be a subset of the rows and/or columns of a table or join result, or may be a summary using an aggregate function.

The process of setting up a materialized view is sometimes called materialization. In a sense, data materialization is a form of caching the results of a query, similar to other forms of precomputation, in which database administrators leverage materialized views for performance reasons for purposes of optimization.

In any database management system following the relational model, a view is a virtual table representing the result of a database query. Whenever a query or an update addresses an ordinary view's virtual table, the DBMS converts these into queries or updates against the underlying base tables.

Conversely, a materialized view takes a different approach insomuch that the query result is cached as a concrete ("materialized") table that may be updated separate from the original base tables. Such an approach permits for more efficient access, at the cost of extra storage and of some data being potentially out-of-date. Materialized views find use especially in data warehousing scenarios, where frequent queries of the actual base tables can be expensive.

In the example depicted here, the accessible cloud platforms 156 generally utilize information stored within the databases 130 of the host organization 110, however, where certain information is transacted to the blockchain and thus persisted at the blockchain, the materialized view permits the accessible cloud platforms 156 to interact with data stored by the blockchain via the materialized view 920. In such a way, both the host organization user 925 and the accessible cloud platforms may interact with the blockchain data as if it were data stored within the databases 130 of the host organization simply by referencing the materialized view.

Thus, it is in accordance with certain embodiments that any time information is transacted to the blockchain, the smart contract triggers and executes a validation scheme for the data transacted onto the blockchain to ensure it is in compliance with the defined metadata 910 and the smart contract additionally generates the materialized view 920 so as to create a referenceable copy within the database system 130 of the host organization 110, thus permitting the standard query interface of the host organization to reference the information within the materialized view, which in turn corresponds to the information transacted onto the blockchain.

Thus, any entity which is declared and created for the blockchain, and for which data is then written or transacted onto the blockchain, will automatically have an equivalent entity (e.g., a table in a relational database) created within the database of the host organization 110 within the materialized view, and as defined fields are created and accepted onto the blockchain, those corresponding columns will then be created within the host organization database system 130, and then when data is transacted onto the blockchain, that corresponding entity table within the database system 130 of the host organization will then be populated, within the materialized view, such that users and processes interacting with the data from the side of the host organization, may access the information from the materialized view.

Consequently, developers and users may interact with the declared application which utilizes data and defined metadata persisted to the blockchain without any knowledge that they are actually utilizing blockchain and without any requirement that such users have any knowledge of how to interact with blockchain.

According to certain embodiments, a new table is not created within the databases 130 of the host organization and therefore, it is not necessary to synchronize any data between the databases 130 of the host organization and the blockchain. Rather, a channel, pipeline, or view of the data persisted by the blockchain external from the host is represented via the materialized view at the databases 130 of the host organization, but the materialized view, although being referenceable, is not a copy that is synchronized back to the blockchain and does not allow updates or modifications. The materialized view is only permissible for read-only referencing from the databases 130 of the host organization. All modifications, updates, changes, etc., must be transacted onto the blockchain, and a refreshed materialized view will then pull those changes from the blockchain and reflect those modifications at the database system 130. While such an arrangement creates additional overhead, the arrangement expressly negates the need to synchronize data within the materialized view as such data is wholly non-authoritative.

Consequently, developers, programs, processes, and users may utilize standard SQL queries to interact with the blockchain data, by referencing the materialized view 920. For example, specifying SELECT from $Table_Name WHERE . . . when specifying the entity name as the table name for the materialized view 920 will result in a database query result being returned by the host organization's database system 130, despite the fact that the authoritative copy of the data resides within the blockchain itself. While this structure does create some duplicative data, and thus arguably results in wasted storage, the structure has the benefit of greatly simplifying queries originating from any of the accessible cloud platforms 156 which may utilized standard SQL without having to identify the blockchain or construct more complex blockchain transactions to retrieve the data, as the replication of the data to the materialized view 920 is performed automatically by the smart contract triggers. According to such embodiments, SQL commands which update, create, or delete records are not permitted for execution against the materialized view, however, such SQL commands which update, create, or delete records will be accepted and translated to the apex translation engine and Apex code interface 454 (shown at FIG. 4B) into native blockchain executable compliant code to perform the equivalent action of an SQL update, create, or delete command, but as a blockchain transaction which is then transacted against the blockchain, submitted for consensus, and then accepted onto the blockchain assuming voting or consensus is successful. Note also that a smart contract will execute to validate the transaction against the blockchain to enforce data compliance with the defined metadata persisted at the blockchain.

For example, an SQL query submitted from a host organization user may request an update for customer record John Doe for a specified application. Because such information is persisted at the blockchain, the SQL cannot be executed against the database systems 130 of the host organization. Moreover, the blockchain does not accept an SQL query which requests, "Please return all data for customer record John Doe." The information on the blockchain is not human readable and also does not permit this kind of a query.

Consequently, the Apex code interface 454 will translate the SQL code received into native blockchain code to transact updated payload data onto the blockchain for the customer record John Doe for the specified application. Note that when this occurs, the newest and latest information for customer record John Doe will now be reflected at the blockchain as the most up to date information and also at any materialized view of the same data, however, the old information for customer record John Doe remains within the blockchain as the blockchain records are immutable, thus creating an immutable audit trail which may be referenced at any time. Thus, any party with access rights to such data, can look back at prior blocks of the blockchain to determine what information was previously recorded for customer record John Doe, or in the case that customer record John Doe is deleted, such a change will be again reflected by the blockchain, but the old record itself remains immutably within the prior blocks of the blockchain, though the application will understand that such information is indicated as "deleted" and thus, the deleted record will not be referenced as live current data, but it always remains available, as per the inherent design of the DLT blockchain technology.

In alternative embodiments, the Apex code interface 454 (shown at FIG. 4B) is utilized to translate SQL database queries into a native blockchain protocol, permitting the translated SQL query to then be executed against the blockchain and generate a result set, which is then translated back into an SQL compliant format and returned responsive to the SQL queries. In yet other embodiments, a smart contract engine performs transactions against the blockchain to retrieve the defined entities and defined fields and translates those into the materialized view which is then stored within the host organization database 130 system, subsequent to which non-translated SQL queries may be executed to retrieve the blockchain data directly from the materialized view.

Because the application itself is declarative, as are the declared entities and the declared defined fields for those entities, all data constructs are wholly customizable and may be tailored to the particular needs of the business, subject only to consensus on the blockchain by the network participants or the participating nodes which operate on that particular blockchain.

Figure 9B:
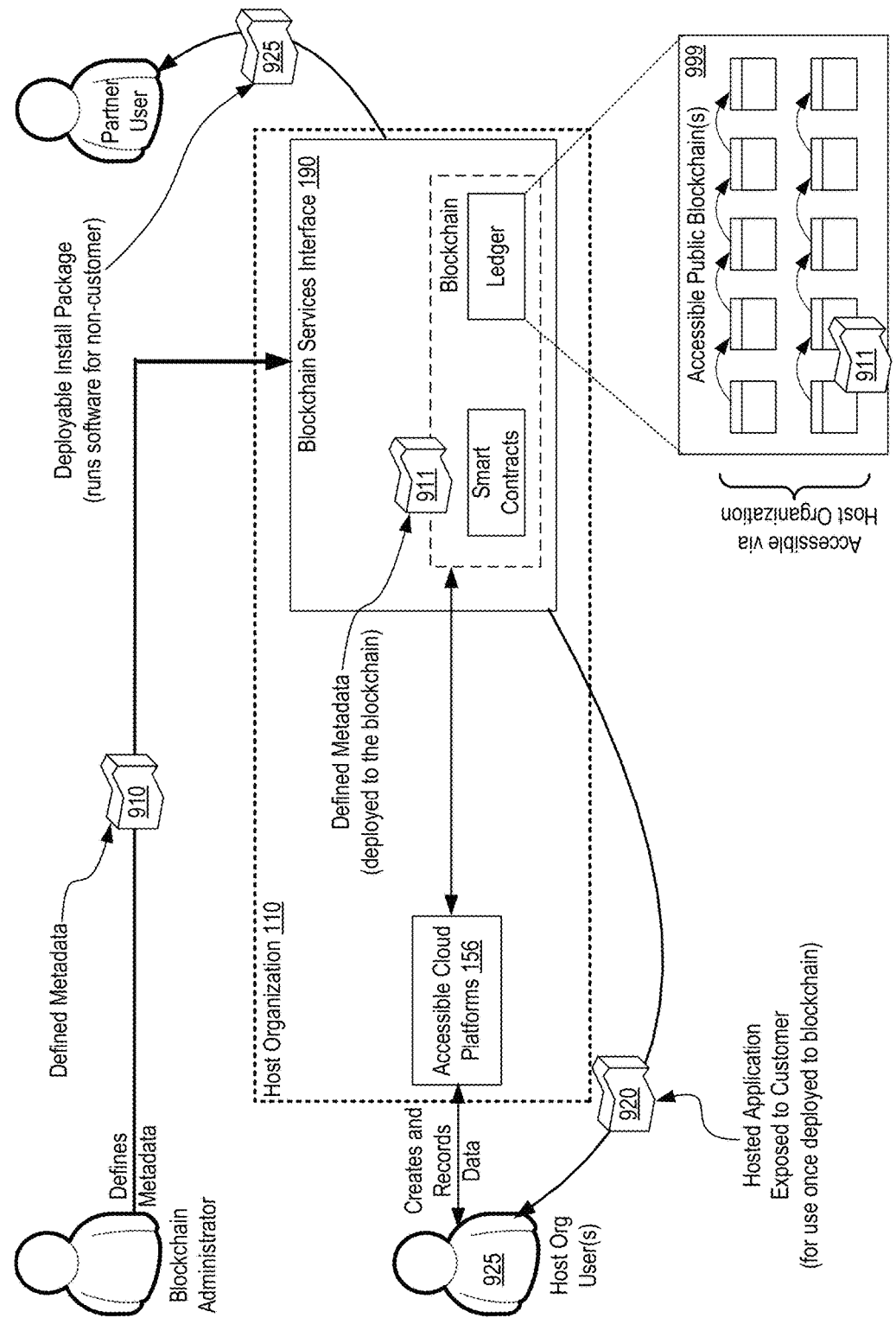
FIG. 9B depicts another exemplary architecture in accordance with described embodiments.

FIG. 9B depicts another exemplary architecture 902 in accordance with described embodiments.

As shown here, the defined metadata 910 has now been deployed to the blockchain as shown at element 911. Consequently, the declaratively defined application, its entities, and field definitions may now be utilized by any authorized network participants. In many circumstances, the authorized network participants will be host organization users 925 which have access to the various cloud services of the host organization 110, and thus, the hosted application 920 is exposed to the customers for use once deployed to the blockchain.

However, there is a need in certain circumstances for a partner user to access the software as an authorized network participant. Problematically, such a partner user having been authorized as a network participant and thus, granted permissions to interact with the declared application is not necessarily a customer of the host organization, and it may not be desirable to force them to become a subscribing customer of the host organization.

Therefore, in accordance with a particular embodiment, a deployable install package 925 is transmitted to the partner user which runs software for the non-customer, allowing them to access the declared application.

Thus, the GUIs permit a blockchain administrator to define an application, define entities, define fields for each of those entities, and define permissible network participants, and then allow both host organization users to access the hosted software in which all the declarative metadata resides within a blockchain which may operate wholly outside of the host organization and even outside of the control of the host organization, so long as the blockchain is accessible to the host organization. In alternative embodiments, the declarative metadata resides within a modified DLT which is operated internally to the host organization and for which the host organization is the single centralized trust authority.

Where the declarative metadata is hosted on an accessible blockchain outside of the host organization, such as blockchains 999 shown here, the declared applications interact with the information on the blockchain by transacting with the blockchain to retrieve payload data from assets, to update assets, to create assets, etc., Notably, however, the authoritative copy of the data is hosted external to the host organization on the accessible blockchain(s) 999 and is not stored by any table within the databases 130 of the host organization. The materialized view discussed above is an optional feature, but even when used, the information within the materialized view is not the authoritative copy. Any transactions making modifications to the data associated with the application, must not only comply with the defined metadata, but must also be updated at the blockchain 999. Where a modified DLT is operated internally, the data associated with the application must be updated within the modified DLT as the authoritative source. Such application data is therefore persisted by an accessible blockchain 999 as the ultimate authoritative copy of the data. Thus, even if the materialized view is deleted or corrupted, or becomes out of synch with the accessible blockchain, there is no affect upon the operations of the declared application because the data for that application and the metadata defining the structure and of such data is stored by the accessible blockchain 999.

In order to deploy the declared application for use by non-customers of the host organization, there are two requirements in accordance with certain embodiments. Firstly, the blockchain administrator must define the permissible network participants, which may be done by defining an Internet Protocol (IP) address for those network participants in accordance with certain embodiments. The IP address may correspond to a host organization user, identified by IP, or the network participant may be a non-customer of the host organization, again identified by IP. In such a way, the participating nodes on the blockchain which may permissibly access the application and utilize the application may be identified and may communicate with one another and share data with one another, assuming they are correctly identifiable by the IP addresses defined by the blockchain administrator as added network participants for that particular application.

In certain embodiments, some or all of the added network participants are non-users or non-subscribers of the host organization, and thus, they cannot authenticate with the host organization and thus cannot identify themselves to the host organization via authentication credentials. It is therefore in accordance with such embodiments that an identified network participant that is a non-customer of the host organization and wishing to utilize the application as a permissible network participant (defined by the blockchain administrator) yet a non-customer of the host organization, proceeds through a two-step authentication process. Firstly, they must provide their IP which must correspond with an added network participant. The non-customer will then be presented with a challenge, responsive to which they need to return a public key. The non-customer will have been given the public key in advance by the blockchain administrator so that they may successfully traverse the authentication challenge.

Once the non-customer provides both their IP and responds to the challenge with the public key, then that public key is utilized every time that non-customer attempts to utilize the declared application to negotiate trust amongst the participating nodes on the blockchain.

FIG. 9C depicts another exemplary architecture 903 in accordance with described embodiments.

As shown here, there is an event listener 960 within the blockchain services interface 190 which accepts defined triggers 961 from the blockchain administrator and then operates to listen for specified events which occur on the blockchain, responsive to which, an event is triggered or fired, shown here as the event triggered 962 so as to push transactions to the host organization or to initiate the execution of a flow or data processing flow, or any defined operations as specified by the blockchain administrator. While this is a similar mechanism to that which is utilized to trigger the smart contract execution automatically to enforce data compliance with the defined metadata, the event listener and the defined triggers 961 permits the blockchain administrator to define any executable operations to occur based on their own customized criteria, regardless of operations performed by the smart contract execution.

Therefore, according to a particular embodiment, any time that any change occurs within the accessible blockchain matching the defined triggers 961 which is in the possession of the event listener 960, the event listener will fire an event or events (event triggered 962) back into the accessible cloud platforms 156, and the blockchain administrator can write any kind of flow via code submitted via the API to the blockchain services interface 190 or via the GUIs (e.g., via the integration builder and associated GUIs) which permits the blockchain administrator to create the flow, for example, create a smart contract to be executed or some other flow as defined by the blockchain administrator, and that flow will then cause updates within the accessible cloud platforms 156 as defined by the event triggered 962 responsive to the change having occurred on the blockchain as monitored by the event listener 960. According to one embodiment, a database transaction is performed within the databases 130 of the host organization or within the accessible cloud platform responsive to an event triggered 962. In another embodiment, a GUI is triggered and pushed to a user client device presenting information based on the change having occurred within the blockchain, as monitored by the event listener 960.

Figure 10A:
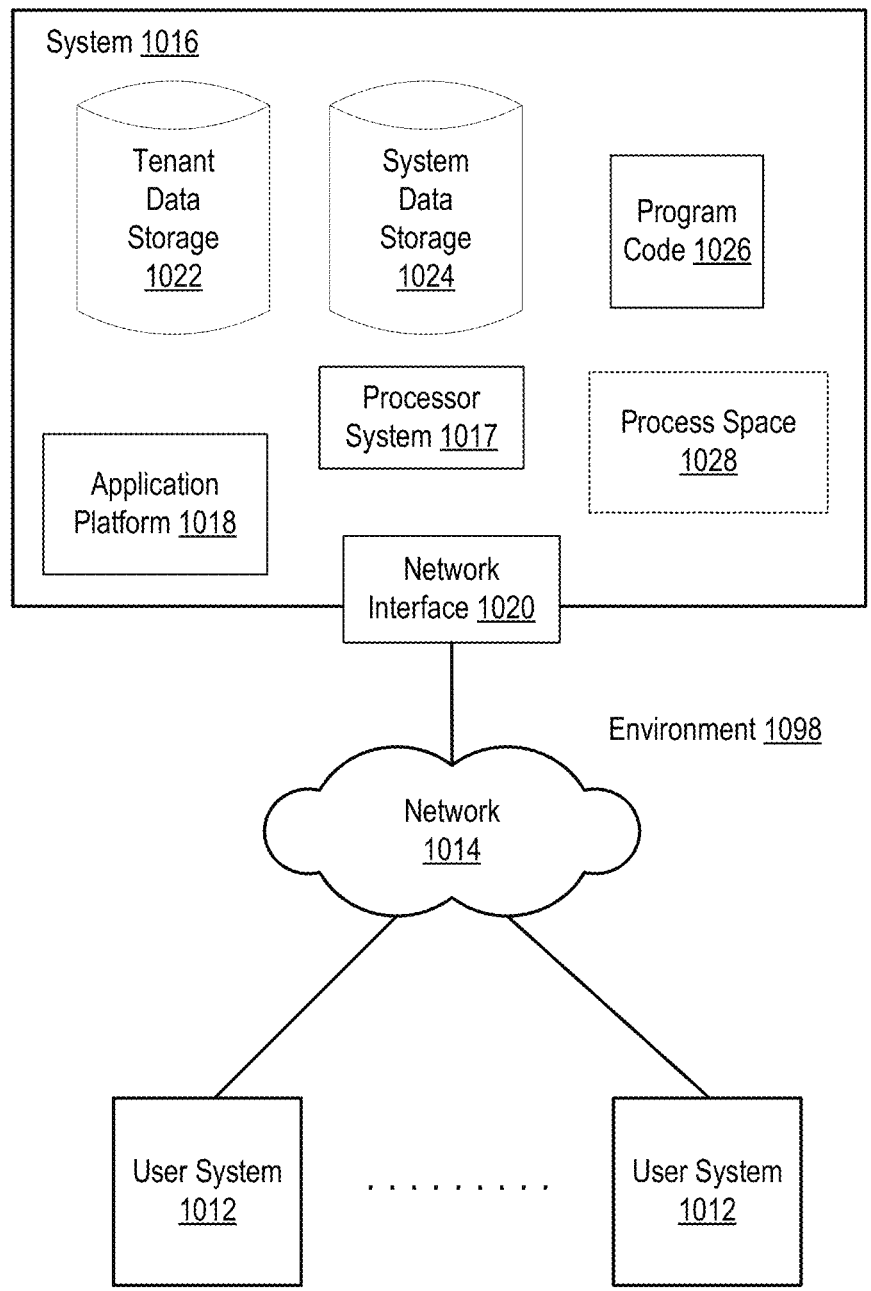
FIG. 10A illustrates a block diagram of an environment in which an on-demand database service may operate in accordance with the described embodiments.

FIG. 10A illustrates a block diagram of an environment 1098 in which an on-demand database service may operate in accordance with the described embodiments. Environment 1098 may include user systems 1012, network 1014, system 1016, processor system 1017, application platform 1018, network interface 1020, tenant data storage 1022, system data storage 1024, program code 1026, and process space 1028. In other embodiments, environment 1098 may not have all of the components listed and/or may have other elements instead of, or in addition to, those listed above.

Environment 1098 is an environment in which an on-demand database service exists. User system 1012 may be any machine or system that is used by a user to access a database user system. For example, any of user systems 1012 may be a handheld computing device, a mobile phone, a laptop computer, a work station, and/or a network of computing devices. As illustrated in FIG. 10A (and in more detail in FIG. 10B) user systems 1012 might interact via a network 1014 with an on-demand database service, which is system 1016.

An on-demand database service, such as system 1016, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1016" and "system 1016" is used interchangeably herein. A database image may include one or more database objects. A relational database management system (RDMS) or the equivalent may execute storage and retrieval of information against the database object(s). Application platform 1018 may be a framework that allows the applications of system 1016 to run, such as the hardware and/or software, e.g., the operating system. In an embodiment, on-demand database service 1016 may include an application platform 1018 that enables creation, managing and executing one or more applications developed by the provider of the on-demand database service, users accessing the on-demand database service via user systems 1012, or third party application developers accessing the on-demand database service via user systems 1012.

The users of user systems 1012 may differ in their respective capacities, and the capacity of a particular user system 1012 might be entirely determined by permissions (permission levels) for the current user. For example, where a salesperson is using a particular user system 1012 to interact with system 1016, that user system has the capacities allotted to that salesperson. However, while an administrator is using that user system to interact with system 1016, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1014 is any network or combination of networks of devices that communicate with one another. For example, network 1014 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 1012 might communicate with system 1016 using TCP/IP and, at a higher network level, use other common Internet protocols to communicate, such as HTTP, FTP, AFS, WAP, etc. In an example where HTTP is used, user system 1012 might include an HTTP client commonly referred to as a "browser" for sending and receiving HTTP messages to and from an HTTP server at system 1016. Such an HTTP server might be implemented as the sole network interface between system 1016 and network 1014, but other techniques might be used as well or instead. In some implementations, the interface between system 1016 and network 1014 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1016, shown in FIG. 10A, implements a web-based Customer Relationship Management (CRM) system. For example, in one embodiment, system 1016 includes application servers configured to implement and execute CRM software applications as well as provide related data, code, forms, webpages and other information to and from user systems 1012 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1016 implements applications other than, or in addition to, a CRM application. For example, system 1016 may provide tenant access to multiple hosted (standard and custom) applications, including a CRM application. User (or third party developer) applications, which may or may not include CRM, may be supported by the application platform 1018, which manages creation, storage of the applications into one or more database objects and executing of the applications in a virtual machine in the process space of the system 1016.

One arrangement for elements of system 1016 is shown in FIG. 10A, including a network interface 1020, application platform 1018, tenant data storage 1022 for tenant data 1023, system data storage 1024 for system data 1025 accessible to system 1016 and possibly multiple tenants, program code 1026 for implementing various functions of system 1016, and a process space 1028 for executing MTS system processes and tenant-specific processes, such as running applications as part of an application hosting service. Additional processes that may execute on system 1016 include database indexing processes.

Several elements in the system shown in FIG. 10A include conventional, well-known elements that are explained only briefly here. For example, each user system 1012 may include a desktop personal computer, workstation, laptop, PDA, cell phone, or any wireless access protocol (WAP) enabled device or any other computing device capable of interfacing directly or indirectly to the Internet or other network connection. User system 1012 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 1012 to access, process and view information, pages and applications available to it from system 1016 over network 1014. Each user system 1012 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1016 or other systems or servers. For example, the user interface device may be used to access data and applications hosted by system 1016, and to perform searches on stored data, and otherwise allow a user to interact with various GUI pages that may be presented to a user. As discussed above, embodiments are suitable for use with the Internet, which refers to a specific global internetwork of networks. However, it is understood that other networks may be used instead of the Internet, such as an intranet, an extranet, a virtual private network (VPN), a non-TCP/IP based network, any LAN or WAN or the like.

According to one embodiment, each user system 1012 and all of its components are operator configurable using applications, such as a browser, including computer code run using a central processing unit such as an Intel Pentium® processor or the like. Similarly, system 1016 (and additional instances of an MTS, where more than one is present) and all of their components might be operator configurable using application(s) including computer code to run using a central processing unit such as processor system 1017, which may include an Intel Pentium® processor or the like, and/or multiple processor units.

According to one embodiment, each system 1016 is configured to provide webpages, forms, applications, data and media content to user (client) systems 1012 to support the access by user systems 1012 as tenants of system 1016. As such, system 1016 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 10B:
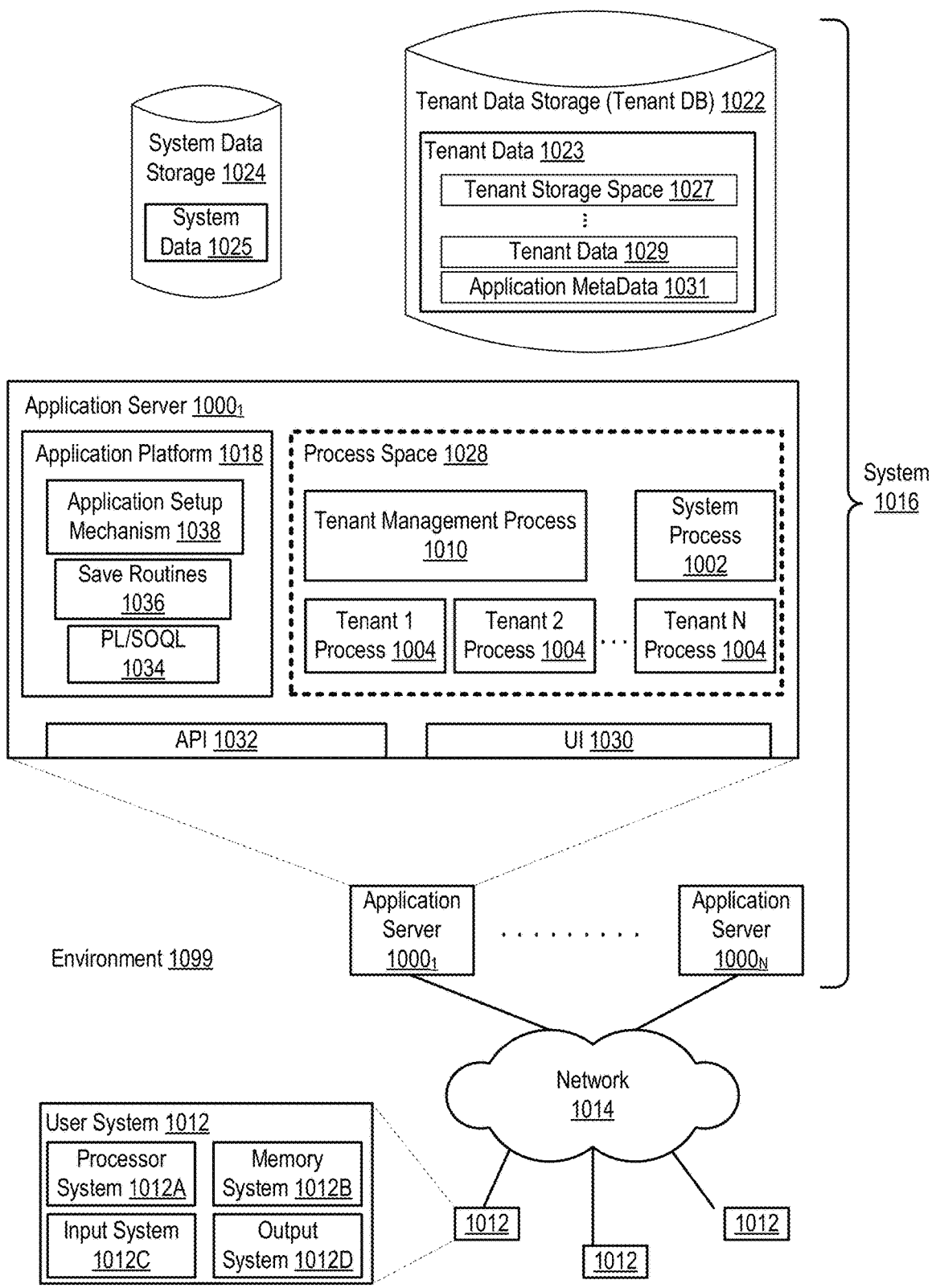
FIG. 10B illustrates another block diagram of an embodiment of elements of FIG. 10A and various possible interconnections between such elements in accordance with the described embodiments.

FIG. 10B illustrates another block diagram of an embodiment of elements of FIG. 10A and various possible interconnections between such elements in accordance with the described embodiments. FIG. 10B also illustrates environment 1099. However, in FIG. 10B, the elements of system 1016 and various interconnections in an embodiment are illustrated in further detail. More particularly, FIG. 10B shows that user system 1012 may include a processor system 1012A, memory system 1012B, input system 1012C, and output system 1012D. FIG. 10B shows network 1014 and system 1016. FIG. 10B also shows that system 1016 may include tenant data storage 1022, having therein tenant data 1023, which includes, for example, tenant storage space 1027, tenant data 1029, and application metadata 1031. System data storage 1024 is depicted as having therein system data 1025. Further depicted within the expanded detail of application servers $1000_{1-N}$ are User Interface (UI) 1030, Application Program Interface (API) 1032, application platform 1018 includes PL/SOQL 1034, save routines 1036, application setup mechanism 1038, process space 1028 includes system process space 1002, tenant 1-N process spaces 1004, and tenant management process space 1010. In other embodiments, environment 1099 may not have the same elements as those listed above and/or may have other elements instead of, or in addition to, those listed above.

User system 1012, network 1014, system 1016, tenant data storage 1022, and system data storage 1024 were discussed above in FIG. 10A. As shown by FIG. 10B, system 1016 may include a network interface 1020 (of FIG. 10A) implemented as a set of HTTP application servers

1000, an application platform 1018, tenant data storage 1022, and system data storage 1024. Also shown is system process space 1002, including individual tenant process spaces 1004 and a tenant management process space 1010. Each application server 1000 may be configured to tenant data storage 1022 and the tenant data 1023 therein, and system data storage 1024 and the system data 1025 therein to serve requests of user systems 1012. The tenant data 1023 might be divided into individual tenant storage areas (e.g., tenant storage space 1027), which may be either a physical arrangement and/or a logical arrangement of data. Within each tenant storage space 1027, tenant data 1029, and application metadata 1031 might be similarly allocated for each user. For example, a copy of a user's most recently used (MRU) items might be stored to tenant data 1029. Similarly, a copy of MRU items for an entire organization that is a tenant might be stored to tenant storage space 1027. A UI 730 provides a user interface and an API 1032 provides an application programmer interface into system 1016 resident processes to users and/or developers at user systems 1012. The tenant data and the system data may be stored in various databases, such as one or more Oracle™ databases.

Application platform 1018 includes an application setup mechanism 1038 that supports application developers' creation and management of applications, which may be saved as metadata into tenant data storage 1022 by save routines 1036 for execution by subscribers as one or more tenant process spaces 1004 managed by tenant management process space 1010 for example. Invocations to such applications may be coded using PL/SOQL 1034 that provides a programming language style interface extension to API 1032. Invocations to applications may be detected by one or more system processes, which manages retrieving application metadata 1031 for the subscriber making the invocation and executing the metadata as an application in a virtual machine.

Each application server 1000 may be communicably coupled to database systems, e.g., having access to system data 1025 and tenant data 1023, via a different network connection. For example, one application server 1000$_1$ might be coupled via the network 1014 (e.g., the Internet), another application server 1000$_{N-1}$ might be coupled via a direct network link, and another application server 1000$_N$ might be coupled by yet a different network connection. Transfer Control Protocol and Internet Protocol (TCP/IP) are typical protocols for communicating between application servers 1000 and the database system. However, it will be apparent to one skilled in the art that other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In one embodiment, therefore, an interface system implementing a load balancing function (e.g., an F5 Big-IP load balancer) is communicably coupled between the application servers 1000 and the user systems 1012 to distribute requests to the application servers 1000. In one embodiment, the load balancer uses a least connections algorithm to route user requests to the application servers 1000. Other examples of load balancing algorithms, such as round robin and observed response time, also may be used. For example, in certain embodiments, three consecutive requests from the same user may hit three different application servers 1000, and three requests from different users may hit the same application server 1000. In this manner, system 1016 is multi-tenant, in which system 1016 handles storage of, and access to, different objects, data and applications across disparate users and organizations.

As an example of storage, one tenant might be a company that employs a sales force where each salesperson uses system 1016 to manage their sales process. Thus, a user might maintain contact data, leads data, customer follow-up data, performance data, goals and progress data, etc., all applicable to that user's personal sales process (e.g., in tenant data storage 1022). In an example of a MTS arrangement, since all of the data and the applications to access, view, modify, report, transmit, calculate, etc., may be maintained and accessed by a user system having nothing more than network access, the user may manage his or her sales efforts and cycles from any of many different user systems. For example, if a salesperson is visiting a customer and the customer has Internet access in their lobby, the salesperson may obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1016 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1016 might also maintain system level data usable by multiple tenants or other data. Such system level data might include industry reports, news, postings, and the like that are sharable among tenants.

In certain embodiments, user systems 1012 (which may be client systems) communicate with application servers 1000 to request and update system-level and tenant-level data from system 1016 that may require sending one or more queries to tenant data storage 1022 and/or system data storage 1024. System 1016 (e.g., an application server 1000 in system 1016) automatically generates one or more SQL statements (e.g., one or more SQL queries) that are designed to access the desired information. System data storage 1024 may generate query plans to access the requested data from the database.

Each database may generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 11 illustrates a diagrammatic representation of a machine 1100 in the exemplary form of a computer system, in accordance with one embodiment, within which a set of instructions, for causing the machine/computer system 1100 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1100 includes a processor 1102, a main memory 1104 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1118 (e.g., a persistent storage device including hard disk drives and a persistent database and/or a multi-tenant database implementation), which communicate with each other via a bus 1130. Main memory 1104 includes a blockchain metadata definition manager 1124 and a smart contract executor (e.g., smart contract validator) 1123 and a blockchain interface 1125. Main memory 1104 and its sub-elements are operable in conjunction with processing logic 1126 and processor 1102 to perform the methodologies discussed herein.

Processor 1102 represents one or more general-purpose processing devices such as a microprocessor, central processing unit, or the like. More particularly, the processor 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1102 may also be one or more special-purpose processing devices such as an application specific integrated circuit (ASIC), a field programmable gate array (FPGA), a digital signal processor (DSP), network processor, or the like. Processor 1102 is configured to execute the processing logic 1126 for performing the operations and functionality which is discussed herein.

The computer system 1100 may further include a network interface card 1108. The computer system 1100 also may include a user interface 1110 (such as a video display unit, a liquid crystal display, etc.), an alphanumeric input device 1112 (e.g., a keyboard), a cursor control device 1114 (e.g., a mouse), and a signal generation device 1116 (e.g., an integrated speaker). The computer system 1100 may further include peripheral device 1136 (e.g., wireless or wired communication devices, memory devices, storage devices, audio processing devices, video processing devices, etc.).

The secondary memory 1118 may include a non-transitory machine-readable storage medium or a non-transitory computer readable storage medium or a non-transitory machine-accessible storage medium 1131 on which is stored one or more sets of instructions (e.g., software 1122) embodying any one or more of the methodologies or functions described herein. The software 1122 may also reside, completely or at least partially, within the main memory 1104 and/or within the processor 1102 during execution thereof by the computer system 1100, the main memory 1104 and the processor 1102 also constituting machine-readable storage media. The software 1122 may further be transmitted or received over a network 1120 via the network interface card 1108.

FIG. 12 depicts a flow diagram illustrating a method 1200 for implementing efficient storage and validation of data and metadata within a blockchain using Distributed Ledger Technology (DLT) in conjunction with a cloud based computing environment such as a database system implementation supported by a processor and a memory to execute such functionality to provide cloud based on-demand functionality to users, customers, and subscribers.

Method 1200 may be performed by processing logic that may include hardware (e.g., circuitry, dedicated logic, programmable logic, microcode, etc.), software (e.g., instructions run on a processing device) to perform various operations such as operating, defining, declaring, associating, writing, receiving, retrieving, adding, transacting, training, distributing, processing, transmitting, analyzing, triggering, pushing, recommending, parsing, persisting, exposing, loading, generating, storing, maintaining, creating, returning, presenting, interfacing, communicating, querying, providing, determining, displaying, updating, sending, etc., in pursuance of the systems and methods as described herein. For example, the hosted computing environment 111, the blockchain services interface 1250, and its database system 130 as depicted at FIG. 1, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 1200 depicted at FIG. 12, at block 1205, processing logic operates a blockchain interface to a blockchain on behalf of a plurality of tenants of the host organization, in which each one of the plurality of tenants operate as a participating node with access to the blockchain.

At block 1210, processing logic receives a transaction for the blockchain requesting the host organization to update a data record persistently stored on the blockchain, the transaction specifying updated values for one or more of a plurality of data elements of the data record.

At block 1215, processing logic executes a smart contract to validate the updated values specified by the transaction before permitting the transaction to be added to the blockchain to update the data record on the blockchain with the updated values.

At block 1220, processing logic writes the updated values for the data record to the blockchain by adding the transaction to a new block on the blockchain pursuant to successful validation of the updated data values by the smart contract.

According to another embodiment, method 1200 further includes: performing a data merge operation for the data record persistently stored on the blockchain, in which the data merge operation includes: retrieving the data record in its entirety from the blockchain to retrieve all of the plurality of data elements of the data record; merging the validated updated values as specified by the transaction for the blockchain into the plurality of data elements of the data record to form a complete data record having the validated updated values embodied therein; in which writing the updated values for the data record to the blockchain by adding the transaction to a new block on the blockchain includes writing the complete data record having the validated updated values embodied therein to the new block of the blockchain; in which the complete data record deprecates all prior versions of the data record stored on the blockchain and does not reference any prior version of the data record stored on the blockchain.

For example, the data merge operation permits data of a data record to be retrieved from a single block of the blockchain, regardless of how many updates the data record has previously undergone. While some data is thus duplicated (e.g., the non-updated values will now be present in a prior block and also the new block to which the complete record having been merged is written). Notwithstanding the data-redundancy, data retrieval is made more efficient and faster.

According to another embodiment of method 1200, writing the updated values for the data record to the blockchain by adding the transaction to a new block on the blockchain includes: writing the updated values into the new block on the blockchain with a reference to a prior block on the blockchain; in which retrieval of a complete and current version of the data record requires any data elements of the stored data record which are not modified by the updated values to be retrieved from the prior block on the blockchain based on the reference and retrieval of the updated values from the new block on the blockchain.

For example, rather than performing a data merge operation which improves retrieval but results in redundancy of stored data, the stored data record is instead represented by multiple blocks on the blockchain, with newer updated information being stored within a new block of the blockchain along with a reference pointer to a prior location on the blockchain from which the non-updated values of the stored data record may be retrieved.

According to another embodiment, method 1200 further includes: performing a data merge operation and a data serialization for the data record persistently stored on the blockchain; in which the data merge operation includes (i) retrieving the data record in its entirety from the blockchain and (ii) merging the updated values into the retrieved data record form a complete data record having the updated values embodied therein; in which the data serialization operation includes converting the complete data record formed by the data merge operation and having the updated values embodied therein into a serialized byte stream; and in which writing the updated values for the data record to the blockchain by adding the transaction to the new block on the blockchain includes writing the serialized byte stream to the new block on the blockchain.

For example, the updated record resulting from the data merge operation may be serialized (e.g., via a protobuf generator or other serialization means) to form a smaller and more efficient record to be stored to the blockchain, and potentially providing a layer of data security through abstraction resulting from the serialization and optionally permitting further encryption of the serialized updated record where a high degree of data security is warranted.

According to another embodiment, method 1200 further includes: executing a protobuf generator to convert the complete data record formed by the data merge operation and having the updated values embodied therein into the serialized byte stream.

According to another embodiment of method 1200, the serialized byte stream forms at least one of: a binary format serialized byte stream; a JavaScript Object Notation (JSON) compatible format serialized byte stream; an plain text or American Standard Code for Information Interchange (ASCII) compatible format serialized byte stream; an encrypted serialized byte stream; a protobuffed serialized byte stream; and a hexadecimal format serialized byte stream.

For example, the data serialization operation may produce any of a variety of formats depending upon the needs of the application developer's needs with respect to security and ease of interoperability of the serialized data.

According to another embodiment, method 1200 further includes: receiving a first transaction for the blockchain requesting the host organization to store the data record on the blockchain as a new stored data record, in which the new stored data record includes a plurality of data elements embedded therein as specified by the first transaction; and in which receiving the transaction for the blockchain requesting the host organization to update the data record persistently stored on the blockchain includes receiving a second transaction for the blockchain, in which the second transaction specifies the updated values for the new stored data record previously transacted onto the blockchain.

For example, an original and new record to be stored to the blockchain is still subjected to data validation, however, there is no need to update an original and new data record. Subsequently, updates to the original data record may be applied and stored on the blockchain subject to data validation.

According to another embodiment, method 1200 further includes: receiving a first transaction for the blockchain requesting the host organization to store metadata on the blockchain, the metadata defining a valid format for the data record and the plurality of data elements stored by the data record; in which receiving the transaction for the blockchain requesting the host organization to update the data record persistently stored on the blockchain includes receiving a second transaction for the blockchain, in which the second transaction specifies the updated values for the stored data record as previously transacted onto the blockchain; and in which executing the smart contract to validate the updated values specified by the transaction includes retrieving the metadata from the blockchain stored pursuant to the first transaction and validating the updated values using the retrieved metadata.

For example, the metadata defining the appropriate format for the record may be permissibly stored onto the blockchain and then retrieved for use by the executed smart contract in performing the data validation. Additionally, it is further permissible to protobuf or serialize the metadata stored to the blockchain if desired.

According to another embodiment, method 1200 further includes: rejecting the transaction and prohibiting the updated values from being written to the data record persistently stored to the blockchain upon a failed validation of the updated values specified by the transaction.

According to another embodiment, method 1200 further includes: determining a transaction type based on the transaction received; identifying the smart contract to be executed based on the determined transaction type; and in which executing the smart contract to validate the updated values includes executing the smart contract identified based on the transaction type.

For example, transactions with the blockchain may be "typed" such that different transactions correspond to different transaction types. According to such an embodiment, based on the transaction type, a smart contract may be identified or looked up according to the determined transaction type. Subsequently, execution of the smart contract is based on the determined transaction type and smart contract identification. In certain embodiments, the transaction type is expressly specified with the transaction whereas in other embodiments the transaction type is derived based on the contents of the transaction.

According to another embodiment of method 1200, in which executing the smart contract to validate the updated values specified by the transaction includes: retrieving metadata defining a valid format for the data record persistently stored on the blockchain; validating the updated values specified by the transaction using the metadata retrieved; and issuing a successful validation result or a failed validation result based on the validation, in which the transaction is prohibited from being added to the blockchain pursuant to the failed validation result and in which the transaction is permitted to be added to the blockchain pursuant to the successful validation result.

For example, execution of the smart contract acts as a quality control and may be utilized to ensure that corrupted, malicious, or malformed data is not transacted onto the blockchain.

According to another embodiment of method 1200, the data record is stored on the blockchain within an asset's payload portion via a CREATE asset command term for the blockchain; and in which the data record is associated with a transaction type for stored data records which are to be stored in their entirety with any update within a new block of the blockchain deprecating any prior version of the data record.

According to another embodiment of method 1200, the data record is stored on the blockchain within an asset's payload portion via a CREATE asset command term for the blockchain; and in which the data record is associated with a transaction type for stored data records which are to be stored incrementally; in which any update to the stored data record writes the updated values specified by the transaction to a new block on the blockchain with a reference to a prior block on the blockchain within which the stored data record was previously stored; and in which retrieval of the stored data record from the blockchain requires retrieval of the updated values from the new block on the blockchain and retrieval of any remaining values not modified by the updated values from the prior block on the blockchain.

For example, storing records on the blockchain may leverage the CREATE asset command term to transact new assets onto the blockchain, within which the stored data record is then encoded or embodied, for instance, within a payload portion of the new asset. Subsequent updates to the stored data record may then update the asset using the UPDATE asset command function or generate an entirely new asset for a complete record with updated information generated via the data merge operation discussed above, in which case either the UPDATE asset command function may be utilized in which case the new version is created in its entirety but with a reference to a prior deprecated version of the stored data record or the CREATE asset command term may be utilized to simply remove all reference to any prior version and write the complete updated record to the blockchain as a new asset, depending on the blockchain protocol and the considerations of the application developer.

According to another embodiment, method 1200 further includes: receiving a second transaction for the blockchain requesting the host organization to store a related entity, the related entity to be persistently stored to the blockchain via a second asset separate and distinct from a first asset within which the stored data record is persistently stored on the blockchain; transacting with the blockchain via a CREATE asset transaction to add the second asset to the blockchain and storing the related entity within a payload portion of the second asset; and relating the related entity stored within the second asset to the stored data record within the first asset via a universally unique identifier (UUID) assigned to the related entity.

According to another embodiment, method 1200 further includes: retrieving the stored data record from the blockchain; updating the stored data record to include the UUID assigned to the related entity; and writing the updated stored data record having the UUID included therein to the blockchain.

According to another embodiment of method 1200, the stored data record includes a student record having embedded therein via the plurality of data elements at least a student first name, a student last name, and a student ID; in which the related entity includes a student transcript; relating the related entity stored within the second asset to the stored data record within the first asset via a universally unique identifier (UUID) assigned to the related entity includes linking the student transcript with the student record via the UUID assigned to the student transcript; in which updating the stored data record to include the UUID includes updating the student record to include the UUID linking the student record with the student transcript; and in which writing the updated stored data record having the UUID included therein to the blockchain includes writing the student record to the blockchain having embedded therein the student first name, the student last name, the student ID and the UUID assigned to the student transcript stored on the blockchain via a separate and distinct second asset.

For example, storage of other information which is not part of one of the data elements of the stored data record may nevertheless be stored onto the blockchain via the related entity functionality in which the related entity (such as a student transcript or a student medical record, etc.) is written to the blockchain as metadata stored within a separate asset from the stored data record and then linked with the stored data record by including a UUID assigned automatically to the related entity in the plurality of data elements of the stored data record, thus requiring an update to the stored data record to effectuate the link.

According to another embodiment of method 1200, metadata defining a valid format for the data record is stored on the blockchain within an asset's payload portion via a CREATE asset command term for the blockchain; and in which the metadata is associated with a transaction type for stored metadata.

For example, storage of metadata may also leverage the CREATE asset command term, although it is different in terms of its transaction type and also stored contents.

According to another embodiment of method 1200, the added transaction is subjected to a consensus protocol by the participating nodes of the blockchain prior to the added transaction being accepted as part of a primary chain of the blockchain by the participating nodes of the blockchain.

For example, transacting on the blockchain retains consensus schemes required for that blockchain so as to ensure transaction validity.

According to another embodiment of method 1200, the metadata is accessible only to one of the plurality of tenants of the host organization having defined and transacted the metadata onto the blockchain; or in which alternatively the metadata is accessible all of the plurality of tenants operating as one of the participating nodes with access to the blockchain regardless of which one of the plurality of tenants defined and transacted the metadata onto the blockchain.

For example, it is possible to define and store metadata to the blockchain with the intention that it remain domain-specific to the particular tenant organization that created the metadata for their specific application. However, there may be instances in which an administrator for the host organization wishes to create non-domain-specific metadata which is then made accessible to any tenant organization operating as a participating node within the blockchain or in certain instances, a tenant organization may wish to create such metadata for a particular application which is then made accessible to other tenant organizations.

According to another embodiment of method 1200, modification of the metadata transacted onto the blockchain is under the exclusive control of the one of the plurality of tenants having transacted the metadata onto the blockchain for persistent storage via the blockchain; in which a new consensus is required to write changes to the metadata onto the blockchain when the metadata is accessible to any of the plurality of tenants operating as one of the participating nodes with access to the blockchain; and in which no consensus is required to write changes to the metadata onto the blockchain when the metadata is accessible for exclusive use by only the one of the one of the plurality of tenants having originally transacted the metadata onto the blockchain.

For example, where the metadata is accessible to other tenant organizations, then modifications are subjected to consensus controls, however, if the metadata is domain specific and limited to the exclusive use by the tenant organization having created it and stored it on the blockchain originally, then it is not necessary to enforce consensus of such modifications, though optionally, the blockchain protocol may require the consensus operation regardless.

According to another embodiment of method 1200, the blockchain protocol for the blockchain is defined by the host organization and further in which the host organization permits access to the blockchain for the plurality of tenants of the host organization operating as participating nodes on the blockchain; or alternatively in which the blockchain protocol for the blockchain is defined by a third party blockchain provider other than the host organization and further in which the host organization also operates as a participating node on the blockchain via which the host organization has access to the blockchain.

For example, certain blockchains are implemented by the host organization itself, in which the host organization defines the blockchain protocol and facilitates access to the blockchain on behalf of its tenant organizations who then operate as participating nodes on the host org provided blockchain, optionally with non-tenant orgs also permitted as participating nodes at the discretion of the host organization. However, there are also existing blockchain implementations which are not defined by or implemented by the host organization and thus, operate external from the host organization with such blockchain protocols having been defined by a third party or an outside consortium or standards body. In such an event, the host organization may nevertheless facilitate access to the blockchain by operating as a participating node itself on the blockchain, via which the host organization may then have access to the functions of the blockchain. In such an event, permissions and access rights may be granted by the tenant orgs to the host organization to act on their behalf as a proxy, or the host organization may implement virtual participating nodes on the blockchain within which each tenant org may operate as a participating node, thus providing a 1:1 correspondence between the tenant orgs and the virtual nodes implemented by the host organization or the host organization may execute the associated smart contract and perform validation of stored data record update transactions for the blockchain, but then permit the tenant organization's own participating node to self-authenticate with and then actually transact with the blockchain, for instance, via the host organization provided API. In such a way, tenant orgs may add transactions to the blockchain (subject to consensus) regardless of which the blockchain is implemented by the host organization or a third party.

According to another embodiment, method 1200 further includes: maintaining an index for a plurality of data records persistently stored to the blockchain; in which the index defines at least a location for each of the plurality of data records persistently stored to the blockchain, the location defining one addressable block of the blockchain from which to retrieve a respective data record persistently stored to the blockchain.

According to another embodiment of method 1200, the index includes a Merkle Tree compatible index; and in which the index is persistently stored at the host organization or persistently stored to the blockchain or persistently stored at both the host organization and the blockchain.

For example, such an index may be utilized to improve retrieval speeds, with the index being maintained within one or both of the host organization and the blockchain. While duplicative data is persistently stored, the retrieval time for fetching records indexed is greatly reduced due to the index defining a specific location of the data within the blockchain, such as at which block such data is stored.

According to another embodiment of method 1200, the index defines for each of the plurality of data records persistently stored to the blockchain, both (i) the location for each of the plurality of records persistently stored to the blockchain and (ii) a copy of any contents of the plurality of record records persistently stored to the blockchain; and in which maintaining the index includes writing the updated values for the data record to the index when the updated values for the data record are written to the blockchain pursuant to successful validation of the updated values.

According to another embodiment, method 1200 further includes: receiving a second transaction requesting retrieval, from the blockchain, of the updated data record previously written to the blockchain; retrieving the updated data record from the index without interacting with the blockchain; and returning the updated data record retrieved from the index responsive to the second transaction requesting the retrieval.

For example, in addition to indexing location information, contents of the records may also be retrieved, wholly negating the need to transact with the blockchain for a read-only retrieval request which has been previously indexed. Where the contents of such stored records are indexed in this way retrieval speed will be increased dramatically over conventional blockchain retrieval transactions, especially when the index is persisted and maintained at the host organization, thus eliminating any interaction with the blockchain whatsoever for a read-only retrieval.

According to another embodiment of method 1200, nodes and leafs of the index are retrievable via full or partial addresses as defined by an addressing structure for the index; in which the method further includes maintaining the addressing structure for the index, in which the addressing structure includes at least: a first portion of the addressing structure defining an application namespace; a second portion of the addressing structure defining an entity type identifier; and a third portion of the addressing structure defining a name for an entity or a data record stored by the blockchain and indexed by the index.

For example, any node or leaf or sub-tree 654 below a node may be directly referenced and retrieved from the index without having to walk, traverse, or search the index when the address is known, thus further increasing retrieval speeds.

According to another embodiment of method 1200, referencing the index with a fully qualified address will return contents of leaf from the index, the contents of the leaf; and in which referencing the index with a partial address will return a sub-tree beneath a node of the index matching the partial address, in which the sub-tree includes multiple leafs of the index structured below the node of the index matching the partial address.

For example, contents of any leaf may be returned by a call to the index with the full addresses, specifying the application namespace, the entity type identifier and the name of the entity or record, however, use of a partial address may be extremely beneficial as it permits the return of all matching records within a sub-tree beneath a node. For example, if desired, an application which stores student records may return all metadata for the application by specifying a partial address with the application namespace and the entity type identifier, but lacking specification of any specific entity name. Similarly, all student records may be returned using a partial address specifying the application namespace code and specifying the entity type identifier for the student data records, but lacking specification of any specific entity name.

According to another embodiment, method 1200 further includes: receiving multiple subsequent transactions specifying additional updated values for one or more of a plurality of data elements of the data record persistently stored to the blockchain; buffering the multiple subsequent transactions specifying the additional updated values to the index by updating the index with each of the multiple subsequent transactions upon receipt without writing corresponding updates to the blockchain; and incrementally updating the data record persistently stored to the blockchain by periodically adding a single incremental update transaction to the blockchain representing all of the additional updated values received via the multiple subsequent transactions.

For example, certain applications, such as a data stream from a group of IoT devices (Information of Things) results in updates with too high of frequency of changes and updates due to the endless stream of data to be practical for storage within a blockchain. However, buffering such information via the index and then periodically flushing such data to the blockchain via a single incremental update transaction overcomes this problem, thus permitting such high-frequency data record updates to nevertheless be transacted to and stored on the blockchain.

According to a particular embodiment, there is non-transitory computer readable storage media having instructions stored thereon that, when executed by a system of a host organization having at least a processor and a memory therein, the instructions cause the system to perform the following operations: operating a blockchain interface to a blockchain on behalf of a plurality of tenants of the host organization, in which each one of the plurality of tenants operate as a participating node with access to the blockchain; receiving a transaction for the blockchain requesting the host organization to update a data record persistently stored on the blockchain, the transaction specifying updated values for one or more of a plurality of data elements of the data record; executing a smart contract to validate the updated values specified by the transaction before permitting the transaction to be added to the blockchain to update the data record on the blockchain with the updated values; and writing the updated values for the data record to the blockchain by adding the transaction to a new block on the blockchain pursuant to successful validation of the updated data values by the smart contract.

Figure 13:
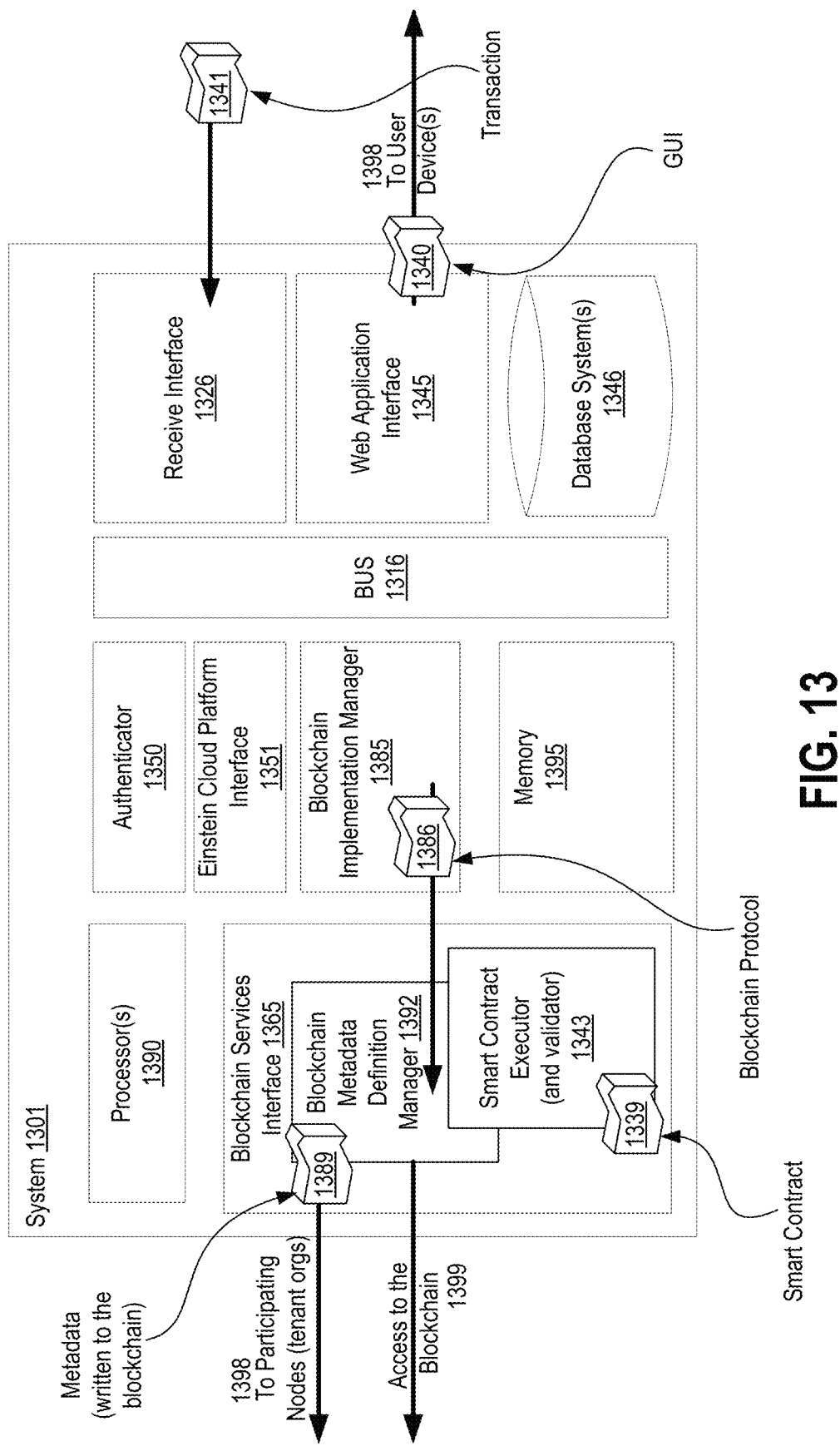
FIG. 13 shows a diagrammatic representation of a system within which embodiments may operate, be installed, integrated, or configured, in accordance with one embodiment.

FIG. 13 shows a diagrammatic representation of a system 1301 within which embodiments may operate, be installed, integrated, or configured. In accordance with one embodiment, there is a system 1301 having at least a processor 1390 and a memory 1395 therein to execute implementing application code for the methodologies as described herein. Such a system 1301 may communicatively interface with and cooperatively execute with the benefit of a hosted computing environment, such as a host organization, a multi-tenant environment, an on-demand service provider, a cloud based service provider, a client-server environment, etc.

According to the depicted embodiment, system 1301, which may operate within a host organization, includes the processor 1390 and the memory 1395 to execute instructions at the system 1301. According to such an embodiment, the processor 1390 is to execute a blockchain services interface 1365 on behalf of a plurality of tenants 1398 of the host organization, in which each one of the plurality of tenants 1398 operate as a participating node with access to the blockchain 1399. Internal to the blockchain services interface 1365, there is depicted the blockchain metadata definition manager 1392, depicted here as writing metadata onto the blockchain via its access to the blockchain 1399 as provided by the blockchain services interface 1365.

A receive interface 1326 of the system 1301 is to receive a transaction 1341 for the blockchain requesting the host organization to update a data record persistently stored on the blockchain, in which the transaction specifies updated values for one or more of a plurality of data elements of the data record. Such a system further includes a smart contract 1339 executable via the processor 1390 and the smart contract executor and validator 1343 via which to validate the updated values specified by the transaction 1341 before permitting the transaction to be added to the blockchain to update the data record on the blockchain with the updated values. A blockchain services interface 1365 is further provided via which to the system 1301 is to write the updated values for the data record to the blockchain by adding the transaction 1341 to a new block on the blockchain pursuant to successful validation of the updated data values by the smart contract 1339.

A blockchain protocol 1386 for the blockchain defines a group of functions for the blockchain (e.g., as provided by the blockchain implementation manager 1385), in which the group of base functions are accessible to any participating node 1398 of the blockchain. The system 1301 may further persist metadata 1389 onto the blockchain; in which the receive interface 1326 is to further receive a transaction 1341 requesting such metadata 1389 to be stored to the blockchain, sometimes for use with validating updated values of a received transaction 1341. According to such a system 1301, the blockchain services interface 1365 is further to add the transaction 1341 to a new block on the blockchain pursuant to successful validation by the smart contract 1339. The Web Application Interface 1345 may be utilized to interface with user devices 1398 including sending and transmitting GUIs to such user devices. Authenticator 1350 operates to perform authentication services of tenants, users, administrators, user devices, and other people, systems, applications, and APIs interacting with the system 1301 of the host organization.

According to such an embodiment of the system 1301, the receive interface 1326 may pass the transaction data contents of the transaction 1341 to be stored within in index persisted by the database system(s) 1346.

According to such an embodiment of the system 1301, a GUI 1340 may be pushed to the user devices 1398 via which the user devices or admin computing devices may interact with the blockchain metadata definition manager 1392.

According to another embodiment of the system 1301, the blockchain services interface 1365 is to interact with and provide access to the blockchain 1399.

According to another embodiment of the system 1301, the receive interface 1326 communicates with a user client device 1398 remote from the system and communicatively links the user device with the system via a public Internet. According to such an embodiment, the system operates at a host organization as a cloud based service provider to the user device 1399; in which the cloud based service provider hosts a receive interface 1326 exposed to the user client device via the public Internet, and further in which the receive interface receives inputs from the user device as a request for services from the cloud based service provider.

Bus 1316 interfaces the various components of the system 1301 amongst each other, with any other peripheral(s) of the system 1301, and with external components such as external network elements, other machines, client devices, cloud computing services, etc. Communications may further include communicating with external devices via a network interface over a LAN, WAN, or the public Internet.

According to another embodiment, system 1301 is specially configured to execute at a host organization, in which the system 1301 includes: a memory 1395 to store instructions; a processor 1390 to execute instructions; in which the processor is to execute a blockchain services interface 1365 to a blockchain 1399 on behalf of a plurality of tenants of the host organization, in which each one of the plurality of tenants operate as one of a plurality of participating nodes 1398 on the blockchain having access to the blockchain 1399; and in which the system is configurable to execute instructions via the processor to perform further operations including: configuring the blockchain to share a training data set between two or more of the plurality of tenants pursuant to a consent agreement to share the training data set. According to such an embodiment, an Einstein cloud platform interface 1385 executes instructions via the processor for training an AI model to make recommendations based on the training data set shared between the two or more of the plurality of tenants; and the Einstein cloud platform interface 1385 further receives a request to register the AI model with an audit record keeping service and registers the AI model with the record keeping service. According to such an embodiment, the system 1301 is further operable to execute instructions for receiving a transaction at the blockchain; issuing a decision by the AI model to accept or reject the transaction; and transacting a new asset onto the blockchain recording the decision to accept or reject the transaction and the data set utilized to train the AI model and a version of the AI model.

According to one embodiment, an Einstein cloud platform interface 1385 is configurable to issue the decision by the AI model. For example, an Einstein Chain (EinsChain) service operating within the host organization and implements the audit record keeping service on behalf of the plurality of tenants.

Figure 14:
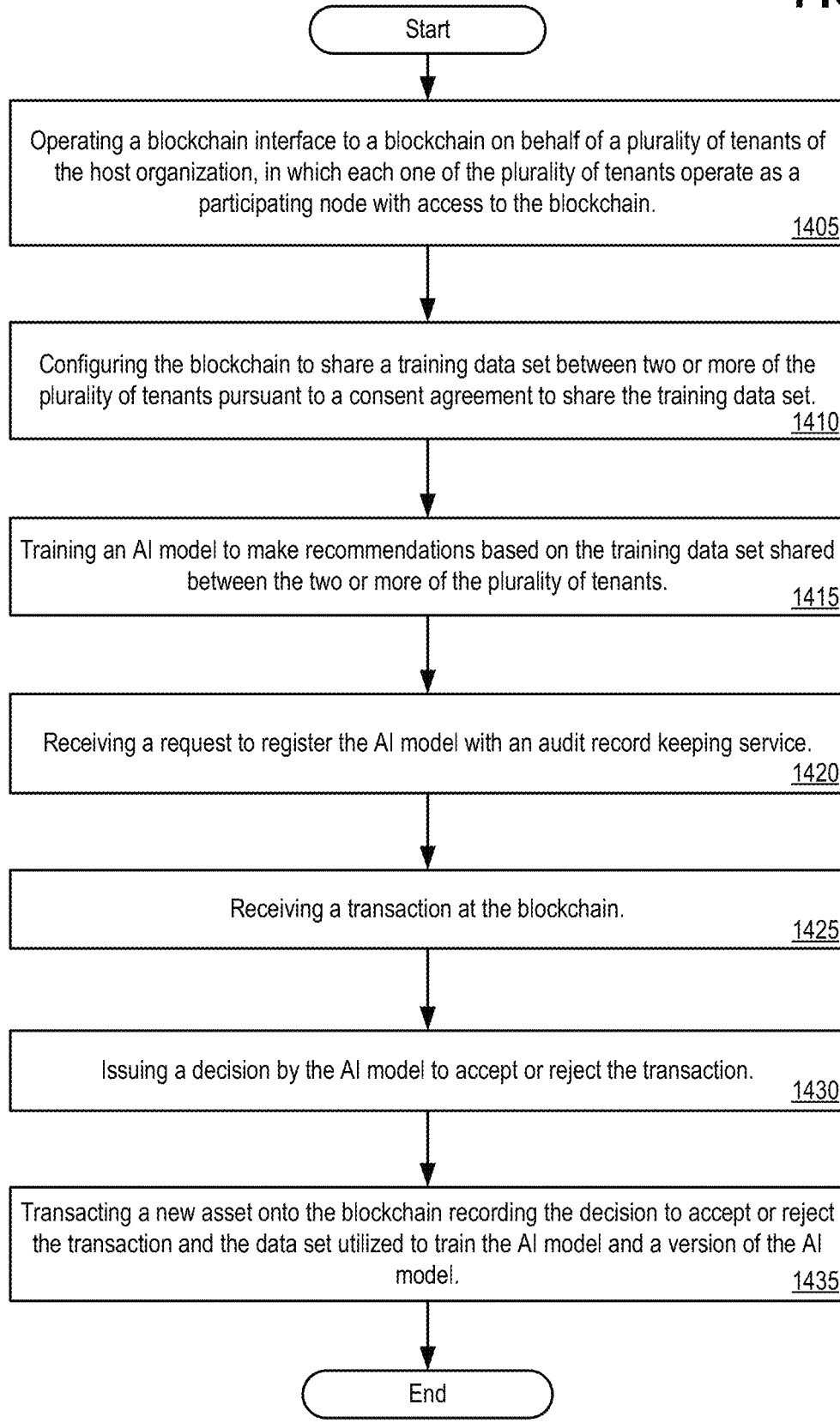
FIG. 14 depicts a flow diagram illustrating a method for implementing a multi tenant blockchain platform for managing the Einstein cloud platform's decisions using Distributed Ledger Technology (DLT) in conjunction with a cloud based computing environment, according to one embodiment.

FIG. 14 depicts a flow diagram illustrating a method 1400 for implementing a multi tenant blockchain platform for managing the Einstein cloud platform's decisions using Distributed Ledger Technology (DLT) in conjunction with a cloud based computing environment such as a database system implementation supported by a processor and a memory to execute such functionality to provide cloud based on-demand functionality to users, customers, and subscribers.

Method 1400 may be performed by processing logic that may include hardware (e.g., circuitry, dedicated logic, programmable logic, microcode, etc.), software (e.g., instructions run on a processing device) to perform various operations such as operating, defining, declaring, associating, writing, receiving, retrieving, adding, transacting, training, distributing, processing, transmitting, analyzing, triggering, pushing, recommending, parsing, persisting, exposing, loading, generating, storing, maintaining, creating, returning, presenting, interfacing, communicating, querying, providing, determining, displaying, updating, sending, etc., in pursuance of the systems and methods as described herein. For example, the hosted computing environment 111, the blockchain services interface 1450, and its database system 130 as depicted at FIG. 1, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 1400 depicted at FIG. 14, at block 1405, processing logic operates a blockchain interface to a blockchain on behalf of a plurality of tenants of the host organization, in which each one of the plurality of tenants operate as a participating node with access to the blockchain.

At block 1410, processing logic configures the blockchain to share a training data set between two or more of the plurality of tenants pursuant to a consent agreement to share the training data set.

At block 1415, processing logic trains an AI model to make recommendations based on the training data set shared between the two or more of the plurality of tenants.

At block 1420, processing logic receives a request to register the AI model with an audit record keeping service.

At block 1425, processing logic receives a transaction at the blockchain.

At block 1430, processing logic issues a decision by the AI model to accept or reject the transaction.

At block 1435, processing logic transacts a new asset onto the blockchain recording the decision to accept or reject the transaction and the data set utilized to train the AI model and a version of the AI model.

According to another embodiment of method 1400, the audit record keeping service writes an immutable audit record onto the blockchain providing auditability and transparency of any decision and factors considered by the AI model specified by the version of the AI model and the training data set utilized to train the AI model.

According to another embodiment of method 1400, the audit record keeping service provides auditability compliance with the U.S. Federal Consumer Credit Protection Act on behalf of customer organization's.

According to another embodiment of method 1400, issuing the decision by the AI model to accept or reject the transaction includes: extracting one or more parameters from the transaction received at the blockchain; consuming the one or more parameters as factors by the AI model to issue the decision to accept or reject the transaction; and further identifying within the new asset the one or more parameters consumed by the AI model in support of the AI model's decision to accept or reject the transaction.

According to another embodiment, method 1400 further includes: generating a smart contract to enforce one or more business rules as defined by the AI model as criteria by which to accept or reject transactions on the blockchain; and transacting the smart contract onto the blockchain to enforce the transactions on the blockchain.

According to another embodiment of method 1400, generating the smart contract to enforce one or more business rules as defined by the AI model includes: auto-generating a metadata rule definition for each one of the one or more business rules as defined by the AI model; auto-generating code for the smart contract representing one or more business rules via the metadata rule definition auto-generated for each one of the one or more business rules; adding the smart contract having the code representing the metadata rule definition onto the blockchain by writing the metadata rule definition into an asset of a new block on the blockchain.

According to another embodiment of method 1400, transacting the smart contract onto the blockchain to enforce the transactions on the blockchain includes: adding the smart contract onto the blockchain via a blockchain put transaction; in which the smart contract is written into a new asset of the new block on the blockchain; in which the new block of the blockchain is automatically subjected to a consensus protocol defined by a blockchain protocol for the blockchain; and in which the new block of the blockchain having the smart contract embedded within the new asset of the new block is accepted as part of a primary chain of the blockchain after the new block is validated and attains consensus.

According to another embodiment, method 1400 further includes: associating the smart contract with a specified transaction type; and in which receiving the transaction at the blockchain further includes: determining a transaction type for the received transaction matches the specified transaction type associated with the smart contract; and triggering the smart contract to execute at the blockchain, in which the smart contract is to execute and issue the decision to accept or reject the transaction pursuant to the one or more business rules as defined by the AI model which are enforced at the blockchain by the smart contract.

According to another embodiment, method 1400 further includes: auto-generating code for a smart contract representing one or more business rules as defined by the AI model as criteria by which to accept or reject transactions on the blockchain; submitting the smart contract having the code therein to the blockchain for consensus by the two or more of the plurality of tenants operating as participating nodes of the blockchain; and adding the smart contract having the code therein onto the blockchain by writing the one or more business rules into an asset of a new block on the blockchain pursuant to the smart contract attaining consensus from two or more of the plurality of tenants operating as participating nodes of the blockchain.

According to another embodiment of method 1400, configuring the blockchain to share the training data set between two or more of the plurality of tenants pursuant to the consent agreement to share the training data set includes: transacting metadata to the blockchain specifying an indication of consent by each of the two or more of the two or more of the plurality of tenants pursuant to share the training data set.

According to another embodiment of method 1400, the training data set includes data stored on the blockchain; in which a first portion of the training data set is exclusively owned and controlled by a first one of the plurality of tenants; in which a second portion of the training data set is exclusively owned and controlled by a second one of the plurality of tenants; and in which the indication of consent permits each of the plurality of tenants participating in the consent agreement to access the training data set via the blockchain including accessing any portion of the training data set exclusively owned and controlled by any other tenant which is restricted from access by non-owner tenants in the absence of the consent agreement.

According to another embodiment of method 1400, the host organization executes instructions via the processor to operate an Einstein Chain (EinsChain) service within the host organization; and in which the EinsChain service of the host organization implements the audit record keeping service on behalf of the plurality of tenants.

According to another embodiment of method 1400, receiving the request to register the AI model includes one of the plurality of tenants of the blockchain configuring the audit record keeping service to record data describing any decisions, actions, and recommendations made by the EinsChain audit record keeping service.

According to another embodiment of method 1400, the decision issued by the AI model to accept or reject the transaction includes a decision selected from the group including: a credit approval or credit rejection decision; a credit scoring decision; a bot authentication decision permitting or denying a requested action by a bot operating within the hot organization; a service escalation decision to escalate a customer inquiry to a human service operator; a financial investment approval or rejection decision; a blockchain consensus approval or rejection decision; a sales forecasting approval or rejection decision; a budgeting approval or rejection decision; a sales recommendation approval or rejection decision; a customer return approval or rejection decision; and a marketing campaign approval or rejection decision.

According to another embodiment, method 1400 further includes: applying reinforcement learning to the trained AI model via a feedback loop which adds decisions to accept or reject transactions to a new reinforcement training data set; re-training the AI model based on the training data set shared between the two or more of the plurality of tenants and based further on the new reinforcement training data set having the AI model's own decisions to accept or reject prior transactions embodied therein.

According to another embodiment, method 1400 further includes: supplementing the new reinforcement training data set with final consensus results corresponding to the transactions for which the AI model issued decisions to accept or reject the transactions; wherein the final consensus results include (i) consensus results for transactions in agreement with the AI model's decision and (ii) consensus results for transactions in conflict with the AI model's decision.

According to a particular embodiment, there is a non-transitory computer-readable storage medium having instructions stored thereupon that, when executed by a processor of a system having at least a processor and a memory therein, the instructions cause the system to perform operations including: executing the instructions via the processor to operate a blockchain interface to the blockchain on behalf of a plurality of tenants of the host organization, in which each one of the plurality of tenants operate as a participating node with access to the blockchain; configuring the blockchain to share a training data set between two or more of the plurality of tenants pursuant to a consent agreement to share the training data set; training an AI model to make recommendations based on the training data set shared between the two or more of the plurality of tenants; receiving a request to register the AI model with an audit record keeping service; receiving a transaction at the blockchain; issuing a decision by the AI model to accept or reject the transaction; and transacting a new asset onto the blockchain recording the decision to accept or reject the transaction and the data set utilized to train the AI model and a version of the AI model.

None of the claims in the are intended to invoke paragraph six of 35 U.S.C. § 112 unless the exact words "means for" are followed by a participle. While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a system of a host organization having at least a processor and a memory therein to execute instructions, wherein the method comprises:
   operating a blockchain interface to a blockchain on behalf of a plurality of tenants of the host organization of a multi-tenant database system, wherein the host organization operates as a participating node on the blockchain to enable interactions between the host organization and the blockchain such that a hierarchy of entities within the host organization operate as participating nodes on the blockchain;
   executing instructions at via the processor to cause the host organization to configure the blockchain to share a training data set between two or more of the plurality of tenants pursuant to a consent agreement to share the training data set, the training data set being generated based on data stored by the two or more of the plurality of tenants associated with the consent agreement;
   training an AI model to make recommendations to accept or reject transactions represented on the blockchain based on the training data set shared between the two or more of the plurality of tenants;
   receiving, at the host organization, a request to register the AI model with an audit record keeping service;
   participating in consensus via the participating node of the host organization for a transaction received at the blockchain using the AI model, wherein the AI model provides an output to the blockchain interface to participate in consensus;
   issuing a decision by the AI model to accept or reject the transaction; and
   transacting, from the host organization, a new asset onto the blockchain recording the decision to accept or reject the transaction and the data set utilized to train the AI model and a version of the AI model.

2. The method of claim 1, wherein the audit record keeping service writes an immutable audit record onto the blockchain providing auditability and transparency of any decision and factors considered by the AI model specified by the version of the AI model and the training data set utilized to train the AI model.

3. The method of claim 1, wherein the audit record keeping service provides auditability compliance with the U.S. Federal Consumer Credit Protection Act on behalf of customer organization's.

4. The method of claim 1, wherein issuing the decision by the AI model to accept or reject the transaction includes:
   extracting one or more parameters from the transaction received at the blockchain;
   consuming the one or more parameters as factors by the AI model to issue the decision to accept or reject the transaction; and
   further identifying within the new asset the one or more parameters consumed by the AI model in support of the AI model's decision to accept or reject the transaction.

5. The method of claim 1, further comprising:
   generating a smart contract to enforce one or more business rules as defined by the AI model as criteria by which to accept or reject transactions on the blockchain; and
   transacting the smart contract onto the blockchain to enforce the transactions on the blockchain.

6. The method of claim 5, wherein generating the smart contract to enforce one or more business rules as defined by the AI model comprises:
   auto-generating a metadata rule definition for each one of the one or more business rules as defined by the AI model;
   auto-generating code for the smart contract representing one or more business rules via the metadata rule definition auto-generated for each one of the one or more business rules; and
   adding the smart contract having the code representing the metadata rule definition onto the blockchain by writing the metadata rule definition into an asset of a new block on the blockchain.

7. The method of claim 5, wherein transacting the smart contract onto the blockchain to enforce the transactions on the blockchain comprises:
   adding the smart contract onto the blockchain via a blockchain put transaction;

wherein the smart contract is written into a new asset of the new block on the blockchain;

wherein the new block of the blockchain is automatically subjected to a consensus protocol defined by a blockchain protocol for the blockchain; and wherein the new block of the blockchain having the smart contract embedded within the new asset of the new block is accepted as part of a primary chain of the blockchain after the new block is validated and attains consensus.

8. The method of claim 5, further comprising:

associating the smart contract with a specified transaction type; and wherein receiving the transaction at the blockchain further comprises:

determining a transaction type for the received transaction matches the specified transaction type associated with the smart contract; and triggering the smart contract to execute at the blockchain, wherein the smart contract is to execute and issue the decision to accept or reject the transaction pursuant to the one or more business rules as defined by the AI model which are enforced at the blockchain by the smart contract.

9. The method of claim 1, further comprising:

auto-generating code for a smart contract representing one or more business rules as defined by the AI model as criteria by which to accept or reject transactions on the blockchain;

submitting the smart contract having the code therein to the blockchain for consensus by the two or more of the plurality of tenants operating as participating nodes of the blockchain; and adding the smart contract having the code therein onto the blockchain by writing the one or more business rules into an asset of a new block on the blockchain pursuant to the smart contract attaining consensus from two or more of the plurality of tenants operating as participating nodes of the blockchain.

10. The method of claim 1, wherein configuring the blockchain to share the training data set between two or more of the plurality of comprises:

transacting metadata to the blockchain specifying an indication of consent by each of the two or more of the plurality of tenants having provided consent to share the training data set.

11. The method of claim 10:

wherein the training data set includes data stored on the blockchain;

wherein a first portion of the training data set is exclusively owned and controlled by a first one of the plurality of tenants;

wherein a second portion of the training data set is exclusively owned and controlled by a second one of the plurality of tenants; and wherein the indication of consent permits each of the plurality of tenants participating in the consent agreement to access the training data set via the blockchain including accessing any portion of the training data set exclusively owned and controlled by any other tenant which is restricted from access by non-owner tenants in the absence of the consent agreement.

12. The method of claim 1:

wherein the host organization executes instructions via the processor to operate an Einstein Chain (EinsChain) service within the host organization; and wherein the EinsChain service of the host organization implements the audit record keeping service on behalf of the plurality of tenants.

13. The method of claim 1, wherein receiving the request to register the AI model comprises one of the plurality of tenants of the blockchain configuring the audit record keeping service to record data describing any decisions, actions, and recommendations made by the EinsChain audit record keeping service.

14. The method of claim 1, wherein the decision issued by the AI model to accept or reject the transaction comprises a decision selected from the group comprising:

a credit approval or credit rejection decision;

a credit scoring decision;

a bot authentication decision permitting or denying a requested action by a bot operating within the hot organization;

a service escalation decision to escalate a customer inquiry to a human service operator;

a financial investment approval or rejection decision;

a blockchain consensus approval or rejection decision;

a sales forecasting approval or rejection decision;

a budgeting approval or rejection decision;

a sales recommendation approval or rejection decision;

a customer return approval or rejection decision; and a marketing campaign approval or rejection decision.

15. The method of claim 1, further comprising:

applying reinforcement learning to the trained AI model via a feedback loop which adds decisions to accept or reject transactions to a new reinforcement training data set;

re-training the AI model based on the training data set shared between the two or more of the plurality of tenants and based further on the new reinforcement training data set having the AI model's own decisions to accept or reject prior transactions embodied therein.

16. The method of claim 15, further comprising:

supplementing the new reinforcement training data set with final consensus results corresponding to the transactions for which the AI model issued decisions to accept or reject the transactions;

wherein the final consensus results include (i) consensus results for transactions in agreement with the AI model's decision and (ii) consensus results for transactions in conflict with the AI model's decision.

17. Non-transitory computer-readable storage media having instructions stored thereupon that, when executed by a processor of a system having at least a processor and a memory therein, the instructions cause the system to perform operations comprising:

executing the instructions via the processor to operate a blockchain interface to a blockchain on behalf of a plurality of tenants of the host organization of a multi-tenant database system, wherein the host organization operates as a participating node on the blockchain to enable interactions between the host organization and the blockchain such that a hierarchy of entities within the host organization operate as participating nodes on the blockchain;

executing instructions at via the processor to cause the host organization to configure the blockchain to share a training data set between two or more of the plurality of tenants pursuant to a consent agreement to share the training data set, the training data set being generated based on data stored by the two or more of the plurality of tenants associated with the consent agreement;

training an AI model to make recommendations to accept or reject transactions represented on the blockchain based on the training data set shared between the two or more of the plurality of tenants;

receiving, at the host organization, a request to register the AI model with an audit record keeping service;

participating in consensus via the participating node of the host organization for a transaction received at the blockchain using the AI model, wherein the AI model provides an output to the blockchain interface to participate in consensus;

issuing a decision by the AI model to accept or reject the transaction; and transacting, from the host organization, a new asset onto the blockchain recording the decision to accept or reject the transaction and the data set utilized to train the AI model and a version of the AI model.

18. The non-transitory computer readable storage medium of claim 17:
wherein the audit record keeping service writes an immutable audit record onto the blockchain providing auditability and transparency of any decision and factors considered by the AI model specified by the training version of the AI model and the training data set utilized to train the AI model.

19. The non-transitory computer readable storage medium of claim 17, wherein issuing the decision by the AI model to accept or reject the transaction includes:
extracting one or more parameters from the transaction received at the blockchain;
consuming the one or more parameters as factors by the AI model to issue the decision to accept or reject the transaction; and
further identifying within the new asset the one or more parameters consumed by the AI model in support of the AI model's decision to accept or reject the transaction.

20. The non-transitory computer readable storage medium of claim 17, wherein the instructions when executed by the processor cause the system to perform operations further including:
generating a smart contract to enforce one or more business rules as defined by the AI model as criteria by which to accept or reject transactions on the blockchain; and
transacting the smart contract onto the blockchain to enforce the transactions on the blockchain.

21. A system to execute at a host organization, wherein the system comprises:
a memory to store instructions;
a set of one or more processors to execute instructions;
a non-transitory machine-readable storage medium that provides instructions that, when executed by the set of one or more processors, the instructions stored in the memory are configurable to cause the system to perform operations comprising:
executing the instructions via the set of one or more processors to operate a blockchain interface to a blockchain on behalf of a plurality of tenants of the host organization of a multi-tenant database system, wherein the host organization operates as a participating node on the blockchain to enable interactions between the host organization and the blockchain such that a hierarchy of entities within the host organization operate as participating nodes on the blockchain;
executing instructions at via the processor to cause the host organization to configure the blockchain to share a training data set between two or more of the plurality of tenants pursuant to a consent agreement to share the training data set, the training data set being generated based on data stored by the two or more of the plurality of tenants associated with the consent agreement;
training an AI model to make recommendations to accept or reject transactions represented on the blockchain based on the training data set shared between the two or more of the plurality of tenants;
receiving, at the host organization, a request to register the AI model with an audit record keeping service;
participating in consensus via the participating node of the host organization for a transaction received at the blockchain using the AI model, wherein the AI model provides an output to the blockchain interface to participate in consensus;
issuing a decision by the AI model to accept or reject the transaction; and
transacting, from the host organization, a new asset onto the blockchain recording the decision to accept or reject the transaction and the data set utilized to train the AI model and a version of the AI model.

22. The system of claim 21:
wherein the audit record keeping service writes an immutable audit record onto the blockchain providing auditability and transparency of any decision and factors considered by the AI model specified by the training version of the AI model and the training data set utilized to train the AI model.

23. The system of claim 21, wherein issuing the decision by the AI model to accept or reject the transaction includes:
extracting one or more parameters from the transaction received at the blockchain;
consuming the one or more parameters as factors by the AI model to issue the decision to accept or reject the transaction; and
further identifying within the new asset the one or more parameters consumed by the AI model in support of the AI model's decision to accept or reject the transaction.

* * * * *